(12) United States Patent
Steenblik et al.

(10) Patent No.: US 8,310,760 B2
(45) Date of Patent: Nov. 13, 2012

(54) MICRO-OPTIC SECURITY AND IMAGE PRESENTATION SYSTEM PRESENTING A SYNTHETICALLY MAGNIFIED IMAGE THAT APPEARS TO LIE ABOVE A GIVEN PLANE

(75) Inventors: Richard A. Steenblik, Alpharetta, GA (US); Mark J. Hurt, Duluth, GA (US); Gregory R. Jordan, Cumming, GA (US)

(73) Assignee: Visual Physics, LLC, Alpharetta, GA (US)

( * ) Notice: Subject to any disclaimer, the term of this patent is extended or adjusted under 35 U.S.C. 154(b) by 41 days.

(21) Appl. No.: 13/045,854

(22) Filed: Mar. 11, 2011

(65) Prior Publication Data
US 2011/0209328 A1 Sep. 1, 2011

Related U.S. Application Data

(62) Division of application No. 11/932,642, filed on Oct. 31, 2007, now Pat. No. 8,009,360, which is a division of application No. 10/995,859, filed on Nov. 22, 2004, now Pat. No. 7,333,268.

(60) Provisional application No. 60/524,281, filed on Nov. 21, 2003, provisional application No. 60/538,392, filed on Jan. 22, 2004, provisional application No. 60/627,234, filed on Nov. 12, 2004.

(51) Int. Cl.
*G02B 27/10* (2006.01)
(52) U.S. Cl. .................... 359/619; 359/622; 359/627
(58) Field of Classification Search .......... 359/619–623, 359/627, 633
See application file for complete search history.

(56) References Cited

U.S. PATENT DOCUMENTS
992,151 A 5/1911 Berthon
1,824,353 A 9/1931 Jensen
(Continued)

FOREIGN PATENT DOCUMENTS
DE 19804858 8/1999
(Continued)

OTHER PUBLICATIONS

Extended European Search Report dated Jan. 11, 2012 for European Divisional Patent Publication No. 2335944.
(Continued)

*Primary Examiner* — Thomas K Pham
*Assistant Examiner* — Brandi Thomas
(74) *Attorney, Agent, or Firm* — Holland & Bonzagni, P.C.; Mary R. Bonzagni, Esq.

(57) ABSTRACT

A film material utilizing a regular two-dimensional array of non-cylindrical lenses to enlarge micro-images, called icons, to form a synthetically magnified image through the united performance of a multiplicity of individual lens/icon image systems. The synthetic magnification micro-optic system includes one or more optical spacers (5), a micro-image formed of a periodic planar array of a plurality of image icons (4) having an axis of symmetry about at least one of its planar axes and positioned on or next to the optical spacer (5), and a periodic planar array of image icon focusing elements (1) having an axis of symmetry about at least one of its planar axes, the axis of symmetry being the same planar axis as that of the micro-image planar array (4). A number of distinctive visual effects, such as three-dimensional and motion effects, can be provided by the present system.

66 Claims, 29 Drawing Sheets

U.S. PATENT DOCUMENTS

| | | |
|---|---|---|
| 1,849,036 A | 3/1932 | Ernst |
| 1,942,841 A | 1/1934 | Shimizu |
| 2,268,351 A | 12/1941 | Tanaka |
| 2,432,896 A | 12/1947 | Hotchner |
| 2,888,855 A | 6/1959 | Tanaka |
| 2,992,103 A | 7/1961 | Land et al. |
| 3,122,853 A | 3/1964 | Koonz |
| 3,241,429 A | 3/1966 | Rice et al. |
| 3,264,164 A | 8/1966 | Jerothe |
| 3,312,006 A | 4/1967 | Rowland |
| 3,357,772 A | 12/1967 | Rowland |
| 3,463,581 A | 8/1969 | Clay |
| 3,609,035 A | 9/1971 | Ataka |
| 3,643,361 A | 2/1972 | Eaves |
| 3,704,068 A | 11/1972 | Waly |
| 3,811,213 A | 5/1974 | Eaves |
| 4,073,650 A | 2/1978 | Yevick |
| 4,185,191 A | 1/1980 | Stauffer |
| 4,417,784 A * | 11/1983 | Knop et al. ............... 359/568 |
| 4,498,736 A | 2/1985 | Griffin |
| 4,507,349 A | 3/1985 | Fromson et al. |
| 4,634,220 A | 1/1987 | Hockert et al. |
| 4,645,301 A | 2/1987 | Orensteen et al. |
| 4,688,894 A | 8/1987 | Hockert |
| 4,691,993 A | 9/1987 | Porter et al. |
| 4,756,972 A | 7/1988 | Kloosterboer et al. |
| 4,765,656 A | 8/1988 | Becker et al. |
| 4,814,594 A | 3/1989 | Drexler |
| 4,892,336 A | 1/1990 | Kaule et al. |
| 4,892,385 A | 1/1990 | Webster, Jr. et al. |
| 4,920,039 A | 4/1990 | Fotland et al. |
| 5,074,649 A | 12/1991 | Hamanaka |
| 5,085,514 A | 2/1992 | Mallik et al. |
| 5,232,764 A | 8/1993 | Oshima |
| 5,254,390 A | 10/1993 | Lu |
| 2,355,902 A | 8/1994 | Berg |
| 5,359,454 A | 10/1994 | Steenblik et al. |
| 5,384,861 A | 1/1995 | Mattson et al. |
| 5,461,495 A | 10/1995 | Steenblik et al. |
| 5,464,690 A | 11/1995 | Boswell |
| 5,468,540 A | 11/1995 | Lu |
| 5,479,507 A | 12/1995 | Anderson |
| 5,492,370 A | 2/1996 | Chatwin et al. |
| 5,555,476 A | 9/1996 | Suzuki et al. |
| 5,568,313 A | 10/1996 | Steenblik et al. |
| 5,575,507 A | 11/1996 | Yamauchi et al. |
| 5,598,281 A | 1/1997 | Zimmerman et al. |
| 5,623,347 A | 4/1997 | Pizzanelli |
| 5,623,368 A | 4/1997 | Calderini et al. |
| 5,643,678 A | 7/1997 | Boswell |
| 5,670,003 A | 9/1997 | Boswell |
| 5,674,580 A | 10/1997 | Boswell |
| 5,688,587 A | 11/1997 | Burchard et al. |
| 5,695,346 A | 12/1997 | Sekiguchi et al. |
| 5,712,731 A | 1/1998 | Drinkwater et al. |
| 5,723,200 A | 3/1998 | Oshima |
| 5,737,126 A | 4/1998 | Lawandy |
| 5,753,349 A | 5/1998 | Boswell |
| 5,759,683 A | 6/1998 | Boswell |
| 5,783,017 A | 7/1998 | Boswell |
| 5,800,907 A | 9/1998 | Yumoto |
| 5,810,957 A | 9/1998 | Boswell |
| 5,812,313 A | 9/1998 | Johansen |
| 5,886,798 A | 3/1999 | Staub et al. |
| 5,933,276 A | 8/1999 | Magee |
| 5,995,638 A | 11/1999 | Amidror |
| 6,060,143 A | 5/2000 | Tompkin |
| 6,089,614 A | 7/2000 | Howland |
| 6,176,582 B1 | 1/2001 | Grasnick |
| 6,179,338 B1 | 1/2001 | Bermann et al. |
| 6,195,150 B1 | 2/2001 | Silverbrook |
| 6,256,149 B1 | 7/2001 | Rolfe |
| 6,288,842 B1 | 9/2001 | Florczak et al. |
| 6,301,363 B1 | 10/2001 | Mowry, Jr. |
| 6,328,342 B1 | 12/2001 | Belousov et al. |
| 6,329,040 B1 | 12/2001 | Oshima et al. |
| 6,345,104 B1 | 2/2002 | Rhoads |
| 6,381,071 B1 | 4/2002 | Dona et al. |
| 6,414,794 B1 | 7/2002 | Rosenthal |
| 6,424,467 B1 | 7/2002 | Goggins |
| 6,450,540 B1 | 9/2002 | Kim |
| 6,467,810 B2 | 10/2002 | Taylor et al. |
| 6,473,238 B1 | 10/2002 | Daniell |
| 6,500,526 B1 | 12/2002 | Hannington |
| 6,587,276 B2 | 7/2003 | Daniell |
| 6,616,803 B1 | 9/2003 | Isherwood et al. |
| 6,641,270 B2 | 11/2003 | Hannington et al. |
| 6,712,399 B1 | 3/2004 | Drinkwater et al. |
| 6,721,101 B2 | 4/2004 | Daniell |
| 6,724,536 B2 | 4/2004 | Magee |
| 6,726,858 B2 | 4/2004 | Andrews |
| 6,751,024 B1 | 6/2004 | Rosenthal |
| 6,761,377 B2 | 7/2004 | Taylor et al. |
| 6,795,250 B2 | 9/2004 | Johnson et al. |
| 6,803,088 B2 | 10/2004 | Kaminsky et al. |
| 6,819,775 B2 | 11/2004 | Amidror et al. |
| 6,833,960 B1 | 12/2004 | Scarbrough et al. |
| 6,856,462 B1 | 2/2005 | Scarbrough et al. |
| 6,870,681 B1 | 3/2005 | Magee |
| 6,900,944 B2 | 5/2005 | Tomczyk |
| 6,935,756 B2 | 8/2005 | Sewall et al. |
| 7,058,202 B2 | 6/2006 | Amidror |
| 7,068,434 B2 | 6/2006 | Florczak et al. |
| 7,114,750 B1 | 10/2006 | Alasia et al. |
| 7,194,105 B2 | 3/2007 | Hersch et al. |
| 7,254,265 B2 | 8/2007 | Naske et al. |
| 7,288,320 B2 | 10/2007 | Steenblik et al. |
| 7,422,781 B2 | 9/2008 | Gosselin |
| 7,457,038 B2 | 11/2008 | Dolgoff |
| 7,545,567 B2 | 6/2009 | Tomczyk |
| 2001/0048968 A1 | 12/2001 | Cox et al. |
| 2002/0185857 A1 | 12/2002 | Taylor et al. |
| 2003/0002160 A1* | 1/2003 | Johnson et al. ............... 359/619 |
| 2003/0031861 A1 | 2/2003 | Reiter et al. |
| 2003/0103189 A1 | 6/2003 | Neureuther et al. |
| 2003/0112523 A1 | 6/2003 | Daniell |
| 2003/0179364 A1 | 9/2003 | Steenblik et al. |
| 2003/0183695 A1 | 10/2003 | Labrec et al. |
| 2003/0228014 A1 | 12/2003 | Alasia et al. |
| 2003/0232179 A1 | 12/2003 | Steenblik et al. |
| 2004/0020086 A1 | 2/2004 | Hudson |
| 2004/0100707 A1 | 5/2004 | Kay et al. |
| 2004/0140665 A1 | 7/2004 | Scarbrough et al. |
| 2005/0094274 A1 | 5/2005 | Souparis |
| 2006/0017979 A1 | 1/2006 | Goggins |
| 2006/0018021 A1 | 1/2006 | Tomkins et al. |
| 2007/0183047 A1 | 8/2007 | Phillips et al. |
| 2007/0284546 A1 | 12/2007 | Ryzi et al. |
| 2008/0130018 A1 | 6/2008 | Steenblik et al. |
| 2010/0068459 A1 | 3/2010 | Wang et al. |

FOREIGN PATENT DOCUMENTS

| | | |
|---|---|---|
| DE | 19932240 | 1/2001 |
| EP | 0118222 | 9/1984 |
| EP | 0203752 | 12/1986 |
| EP | 0318717 | 6/1989 |
| EP | 0930174 | 7/1999 |
| GB | 1095286 | 12/1967 |
| GB | 2362493 | 11/2001 |
| JP | 41-004953 | 3/1966 |
| JP | 46-022600 | 8/1971 |
| JP | 11189000 | 7/1999 |
| JP | 2000-256994 | 9/2000 |
| JP | 2001-055000 | 2/2001 |
| JP | 2003039583 | 2/2003 |
| JP | 2003-165289 | 6/2003 |
| JP | 2004-262144 | 9/2004 |
| JP | 2004-2621441 | 9/2004 |
| KR | 10-0194536 | 6/1999 |
| RU | 2111125 | 5/1998 |
| WO | WO 97/19820 | 6/1997 |
| WO | WO 97/44769 | 11/1997 |
| WO | WO 98/13211 | 4/1998 |
| WO | WO 98/15418 | 4/1998 |
| WO | WO 98/26373 | 6/1998 |
| WO | WO 99/26793 | 6/1999 |
| WO | WO 99/66356 | 12/1999 |

| WO | WO 01/11591 | 2/2001 |
| WO | WO 01/39138 | 5/2001 |
| WO | WO 01/63341 | 8/2001 |
| WO | WO 02/40291 | 5/2002 |
| WO | WO 03/005075 | 1/2003 |
| WO | WO 03/007276 | 1/2003 |
| WO | WO 03/022598 | 3/2003 |
| WO | WO 03/053713 | 7/2003 |
| WO | WO 03/061980 | 7/2003 |
| WO | WO 03/082598 | 10/2003 |
| WO | WO 03/098188 | 11/2003 |
| WO | WO 2004/036507 | 4/2004 |
| WO | WO 2004/087430 | 10/2004 |
| WO | WO 2005/106601 | 11/2005 |

OTHER PUBLICATIONS

Fletcher, D.A., et al., "Near-field infrared imaging with a microfabricated solid immersion lens", Applied Physics Letters, Oct. 2, 2000, pp. 2109-2111, vol. 77, No. 14.
Hutley, M.C., et al., "The Moiré Magnifier", Pure Appl. Opt. 3, 1994, pp. 133-142, IOP Publishing Ltd., UK.
Hutley, M.C., "Integral Photography, Superlenses and the Moiré Magnifier", European Optical Society, 1993, pp. 72-75, vol. 2, UK.
Hutley, M., et al., "Microlens Arrays", Physics World, Jul. 1991, pp. 27-32.
Kamal, H., et al., "Properties of Moiré Magnifiers", Opt. Eng., Nov. 1998, pp. 3007-3014, vol. 37, No. 11.
Lippmann, G., "Photgraphie—Épreuves Réversibles, Photographies Intégrals", Académie des Sciences, 1908, pp. 446-451, vol. 146, Paris.
Liu, S., et al., "Artistic Effects and Application of Moiré Patterns in Security Holograms", Applied Optics, Aug. 1995, pp. 4700-4702, vol. 34, No. 22.
Zhang, X., et al., "Concealed Holographic Coding for Security Applications by Using a Moiré Technique", Applied Optics, Nov. 1997, pp. 8096-8097, vol. 36, No. 31.
U.S. Appl. No. 11/771,623—Non-Final Rejection mailed Aug. 5, 2009.
U.S. Appl. No. 11/771,623—Examiner Interview Summary Record (PTOL-413) dated Dec. 16, 2009.
U.S. Appl. No. 11/771,623—Applicants' Response and Amendment dated Jan. 1, 2010.
U.S. Appl. No. 11/771,623—Final Rejection mailed Apr. 27, 2010.
U.S. Appl. No. 11/771,623—Request for Continued Examination and Amendment dated Jul. 23, 2010.
U.S. Appl. No. 11/771,623—Non-Final Rejection mailed Nov. 12, 2010.
U.S. Appl. No. 11/771,623—Applicants' Response and Amendment dated Feb. 4, 2011.
U.S. Appl. No. 11/771,623—Non-Final Rejection mailed Apr. 25, 2011.
U.S. Appl. No. 11/771,623—Applicants' Response dated Jul. 22, 2011.
U.S. Appl. No. 11/932,468—Non-Final Rejection mailed Sep. 4, 2009.
U.S. Appl. No. 11/932,468—Examiner Interview Summary Record (PTOL-413) dated Dec. 16, 2009.
U.S. Appl. No. 11/932,468—Applicants' Response and Amendment dated Jan. 8, 2010.
U.S. Appl. No. 11/932,468—Non-Final Rejection mailed Apr. 1, 2010.
U.S. Appl. No. 11/932,468—Applicants' Response and Amendment dated Jul. 1, 2010.
U.S. Appl. No. 11/932,468—Non-Final Rejection mailed Oct. 15, 2010.
U.S. Appl. No. 11/932,468—Applicants' Response and Amendment dated Jan. 18, 2011.
U.S. Appl. No. 11/932,468—Non-Final Rejection mailed Apr. 7, 2011.
U.S. Appl. No. 11/932,468—Applicants' Response and Amendment dated Jul. 6, 2011.
U.S. Appl. No. 11/932,515—Non-Final Rejection mailed Oct. 2, 2009.
U.S. Appl. No. 11/932,515—Examiner Interview Summary Record (PTOL-413) dated Dec. 15, 2009.
U.S. Appl. No. 11/932,515—Applicants' Response and Amendment dated Jan. 13, 2010.
U.S. Appl. No. 11/932,515—Final Rejection mailed Apr. 1, 2010.
U.S. Appl. No. 11/932,515—Applicants' Amendment After Final dated Jun. 18, 2010.
U.S. Appl. No. 11/932,515—Advisory Action mailed Jul. 1, 2010.
U.S. Appl. No. 11/932,515—Applicants' Supplemental Amendment After Final dated Sep. 10, 2010.
U.S. Appl. No. 11/932,515—Examiner Interview Summary Record (PTOL-413) dated Sep. 13, 2010.
U.S. Appl. No. 11/932,515—Advisory Action mailed Sep. 28, 2010.
U.S. Appl. No. 11/932,515—Notice of Appeal dated Sep. 29, 2010.
U.S. Appl. No. 11/932,515—Amended Appeal Brief dated Dec. 20, 2010.
U.S. Appl. No. 11/932,515—Notice of Allowance mailed Apr. 12, 2011.
U.S. Appl. No. 11/932,642—Non-Final Rejection mailed Jun. 23, 2010.
U.S. Appl. No. 11/932,642—Applicants' Response and Amendment dated Sep. 13, 2010.
U.S. Appl. No. 11/932,642—Notice of Allowance mailed Dec. 14, 2010.
U.S. Appl. No. 11/932,716—Non-Final Rejection mailed Mar. 6, 2009.
U.S. Appl. No. 11/932,716—Applicants' Response and Amendment dated Jun. 10, 2009.
U.S. Appl. No. 11/932,716—Non-Final Rejection mailed Oct. 5, 2009.
U.S. Appl. No. 11/932,716—Examiner Interview Summary Record (PTOL-413) dated Dec. 15, 2009.
U.S. Appl. No. 11/932,716—Applicants' Response and Amendment dated Jan. 5, 2010.
U.S. Appl. No. 11/932,716—Final Rejection mailed Apr. 30, 2010.
U.S. Appl. No. 11/932,716—Examiner Interview Summary Record (PTOL-413) dated Jun. 16, 2010.
U.S. Appl. No. 11/932,716—Request for Continued Examination and Amendment dated Jul. 26, 2010.
U.S. Appl. No. 11/932,716—Applicants' Supplemental Amendment dated Sep. 7, 2010.
U.S. Appl. No. 11/932,716—Non-Final Rejection mailed Mar. 18, 2011.
U.S. Appl. No. 11/932,716—Applicants' Response and Amendment dated Jun. 17, 2011.
Phillips, Roger W., et al., Security Enhancement of Holograms with Interference Coatings, Optical Security and Counterfeit Deterrence Techniques III, 2000, pp. 304-316, vol. 3973, San Jose, CA.
Gale, M. T., et al., Chapter 6—Replication, Micro Optics: Elements, Systems and Applications, 1997, pp. 153-177.
Leech, Patrick W. et al., Printing via hot embossing of optically variable images in thermoplastic acrylic lacquer, Microelectronic Engineering, 2006, pp. 1961-1965, vol. 83, No. 10, Elsevier Publishers BV, Amsterdam, NL.
European Partial Search Report dated May 7, 2012 for European Divisional Patent Application No. 11008302.9.
European Partial Search Report dated Apr. 24, 2012 for European Divisional Patent Application No. 12001223.2.
European Partial Search Report dated Apr. 24, 2012 for European Divisional Patent Application No. 12000103.7.

* cited by examiner

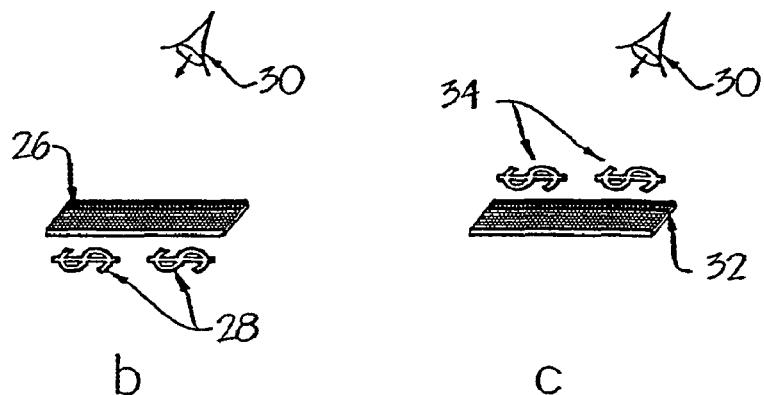
Figs 2b,c
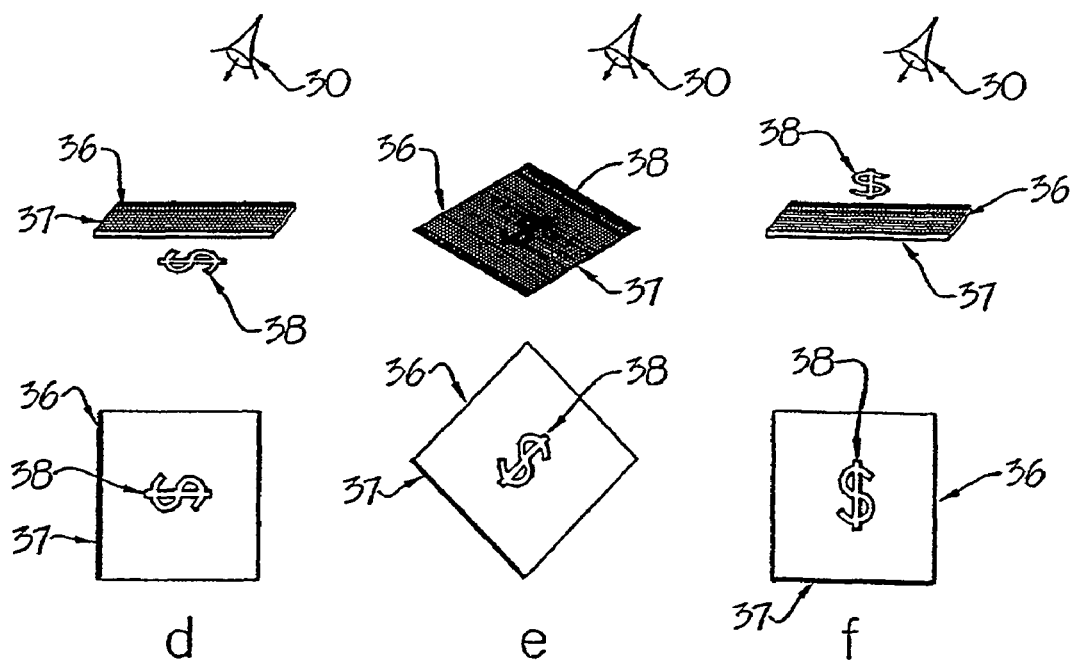
Figs 2d,e,f

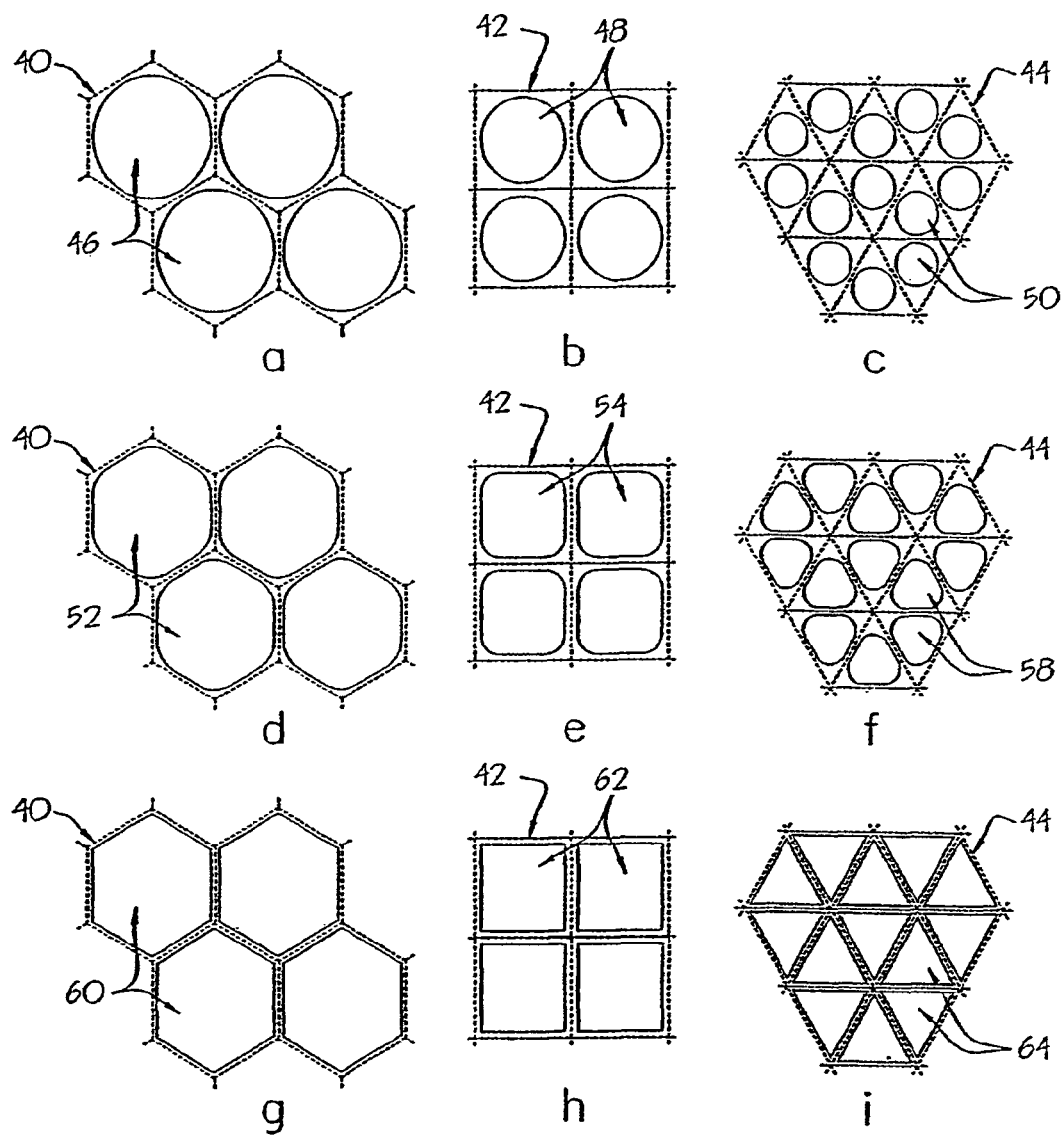
Figs 3a-i

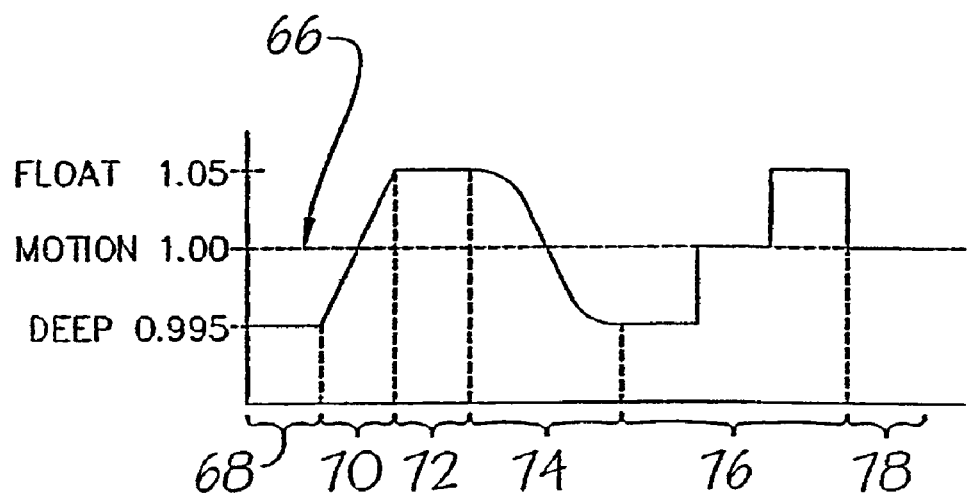
Fig. 4
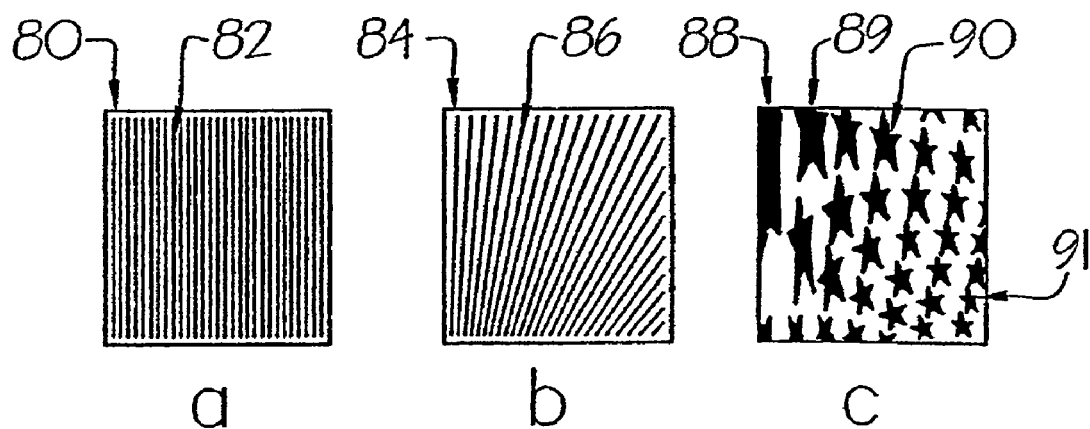
Figs. 5a–c

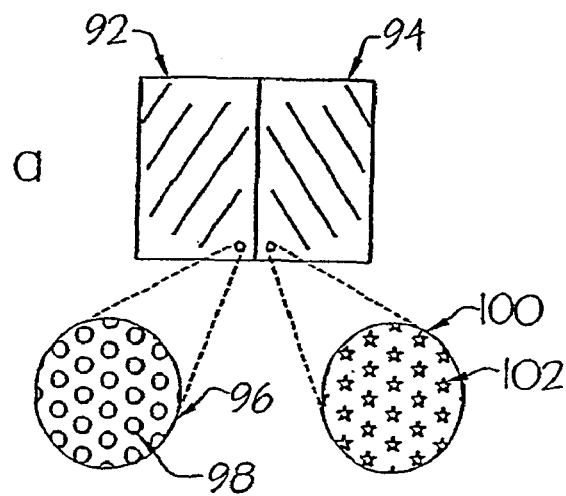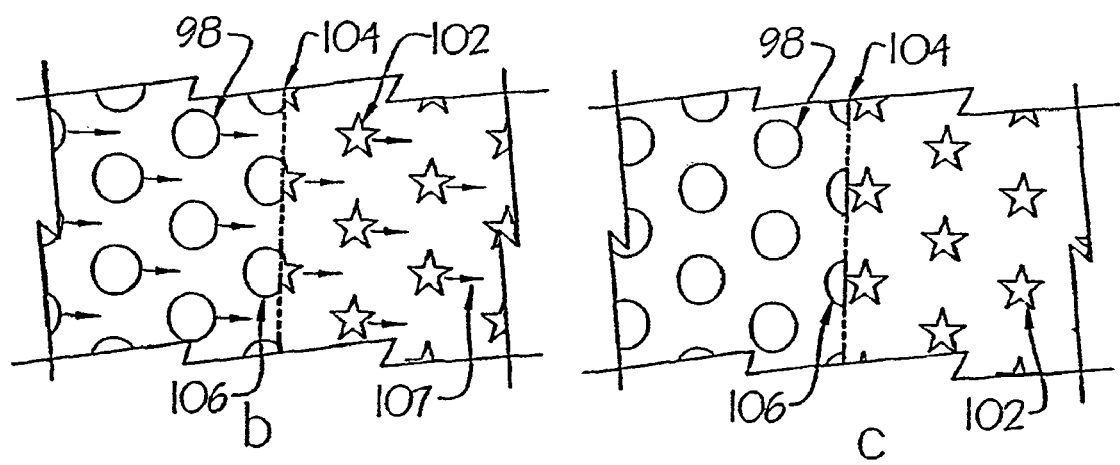
Figs. 6a–c

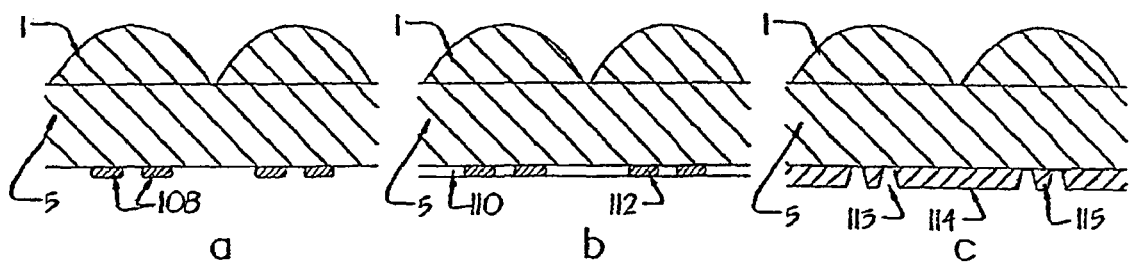
Figs. 7a-c
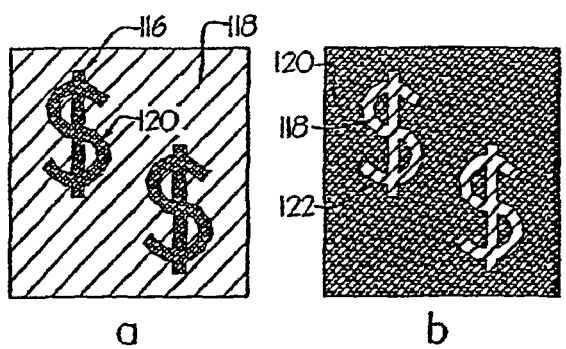
Figs. 8a-b

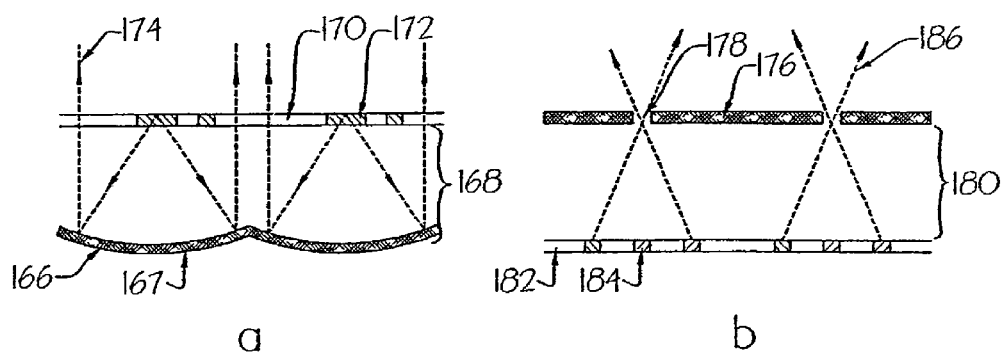
Figs. 11a-b
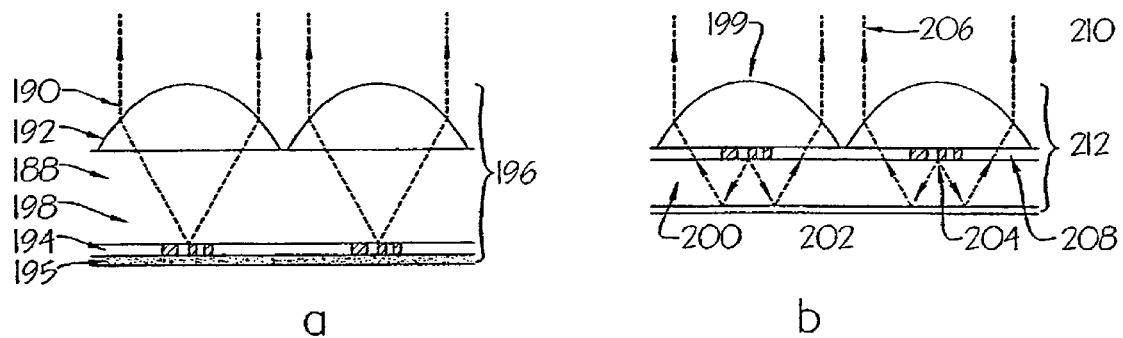
Figs. 12a-b

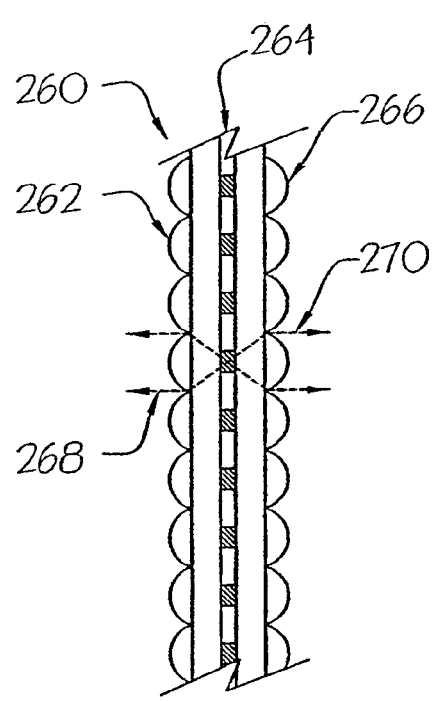
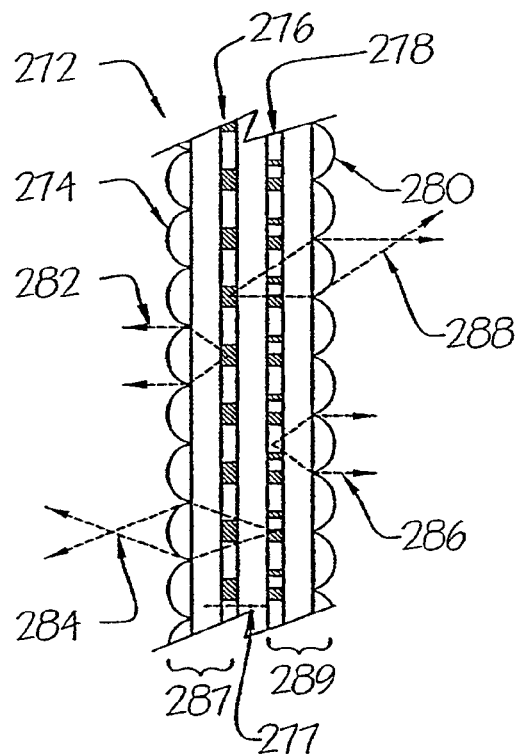
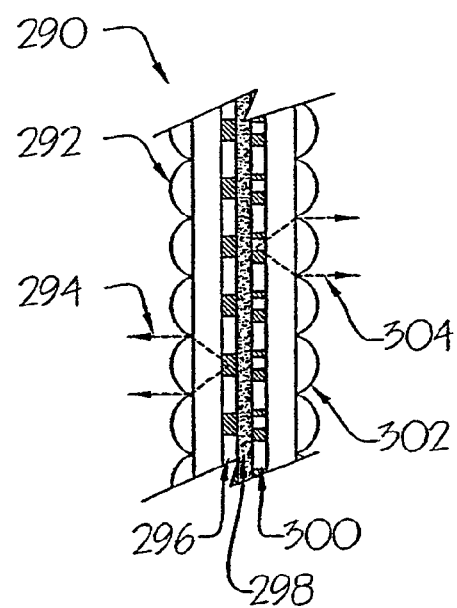
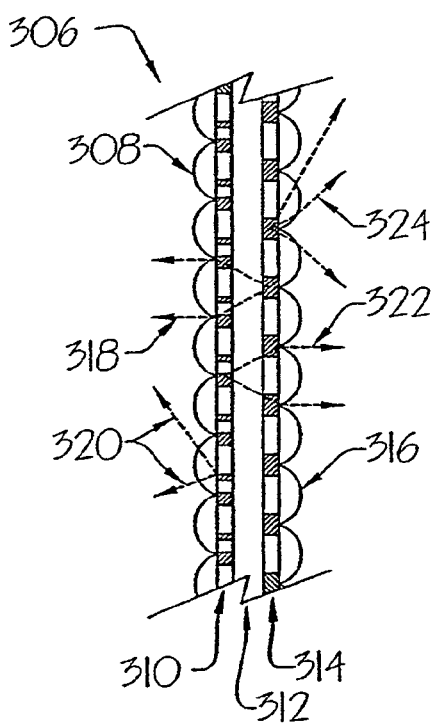
Figs. 15a–d

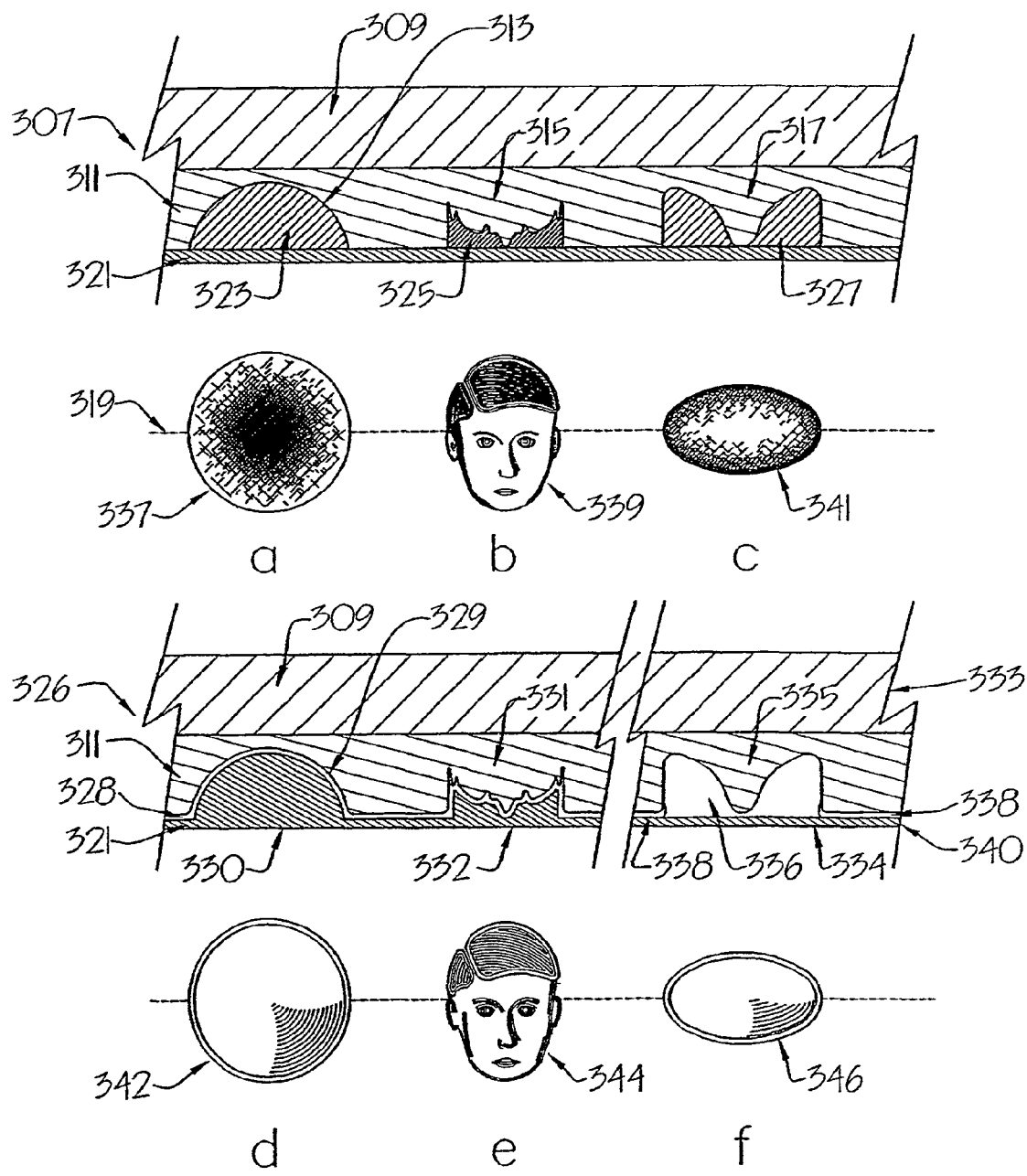
Figs. 16a-f

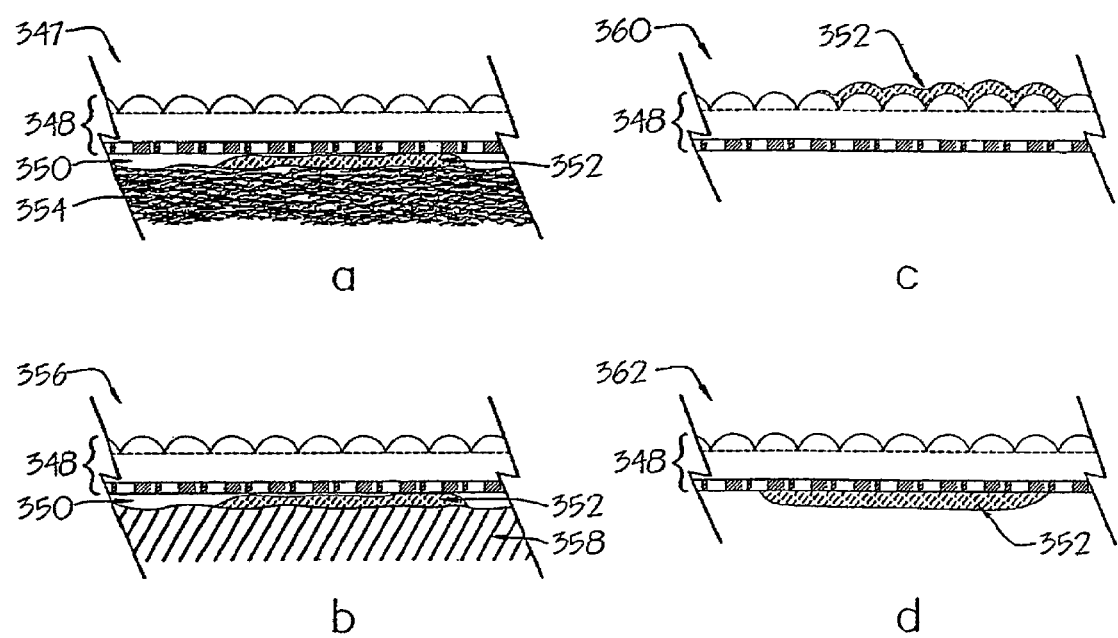
Figs. 17a-d

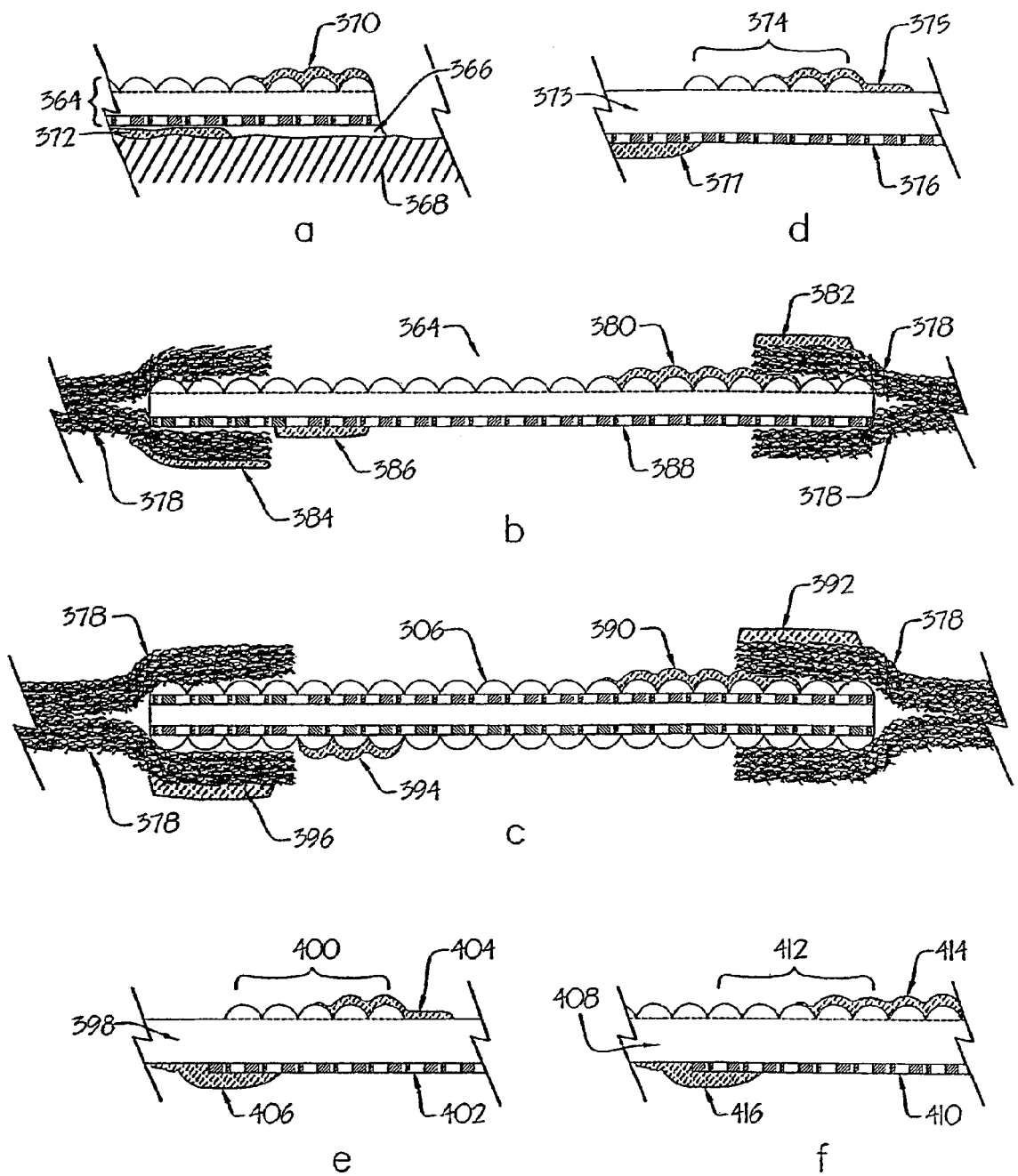
Figs. 18a-f

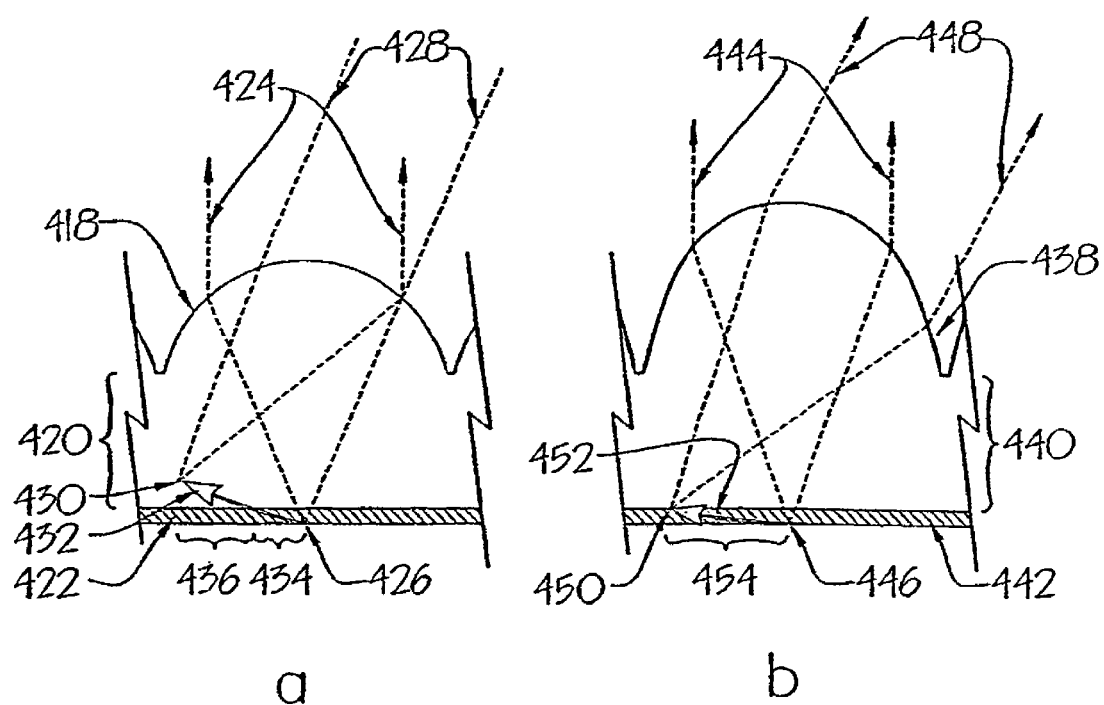
Figs. 19a-b

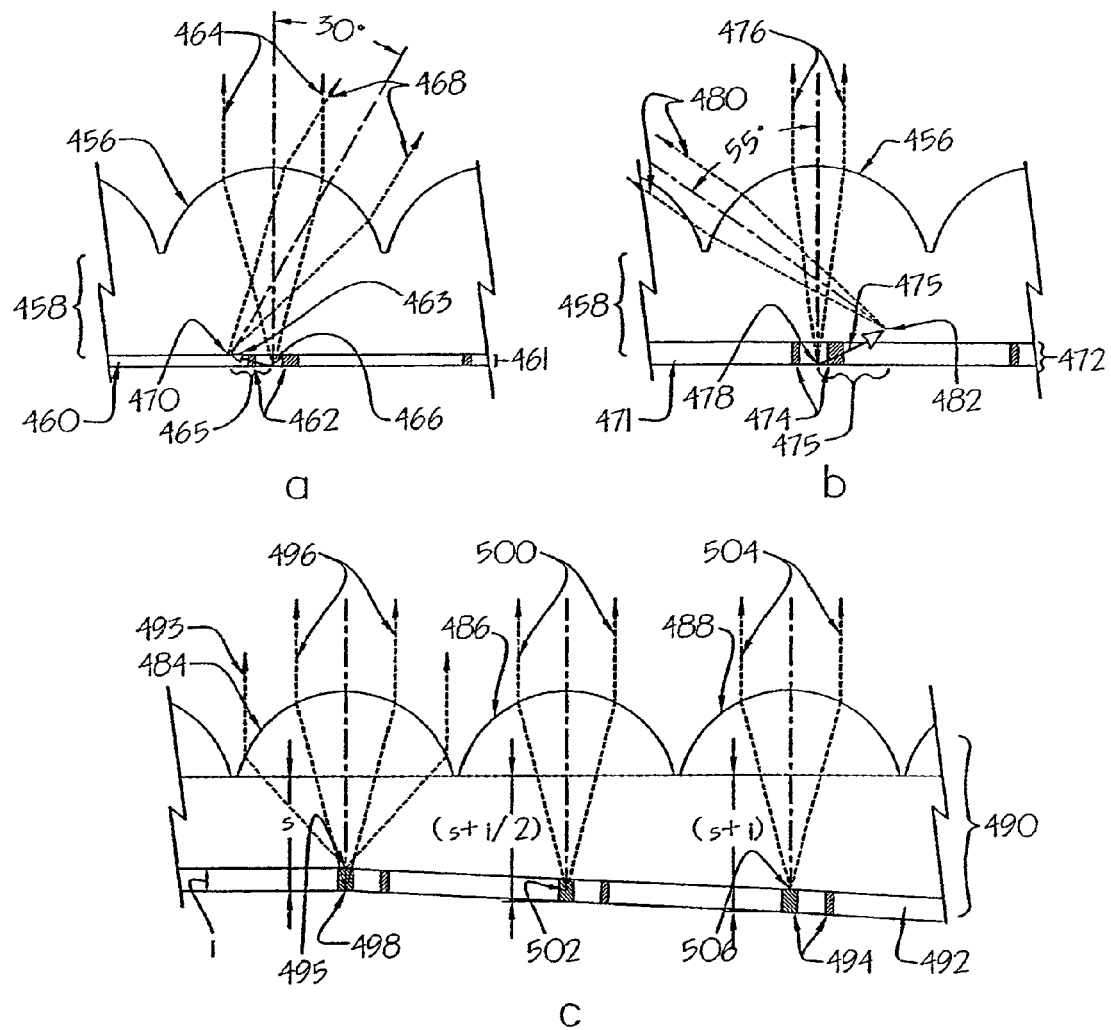
Figs. 20a-c

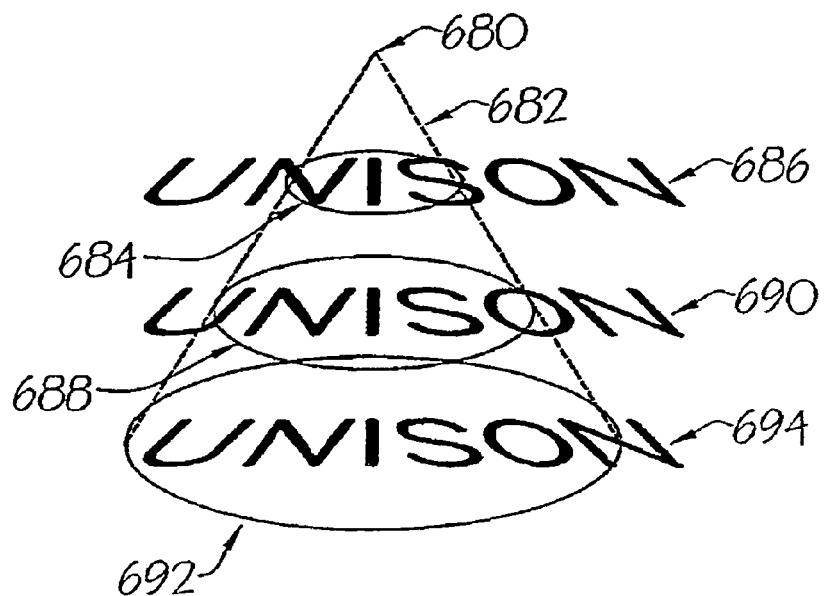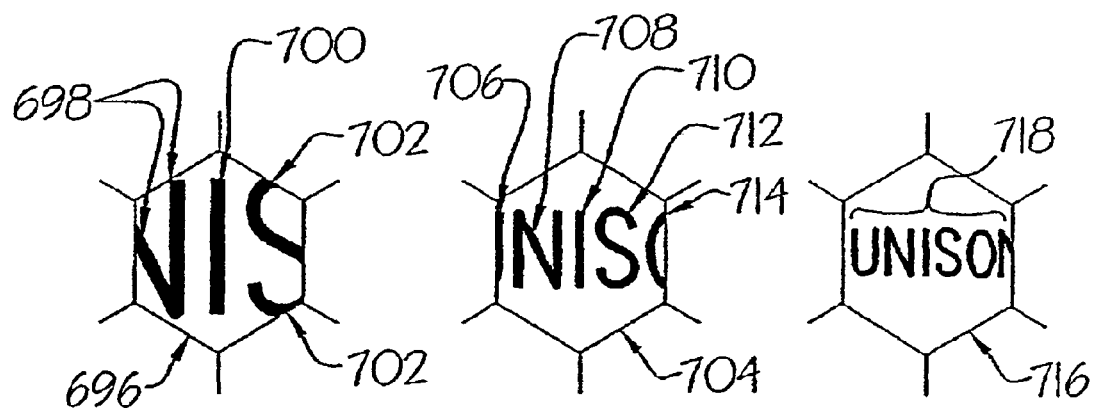
Fig. 27

MICRO-OPTIC SECURITY AND IMAGE PRESENTATION SYSTEM PRESENTING A SYNTHETICALLY MAGNIFIED IMAGE THAT APPEARS TO LIE ABOVE A GIVEN PLANE

CROSS-REFERENCE TO RELATED APPLICATIONS

This application is a divisional of U.S. patent application Ser. No. 11/932,642, filed Oct. 31, 2007, which is a divisional of U.S. Utility patent application Ser. No. 10/995,859, filed Nov. 22, 2004 (now U.S. Pat. No. 7,333,268), and claims benefit of and priority to U.S. Provisional Patent Application Ser. No. 60/524,281, filed on Nov. 21, 2003, U.S. Provisional Patent Application Ser. No. 60/538,392, filed on Jan. 22, 2004, and U.S. Provisional Patent Application Ser. No. 60/627,234, filed on Nov. 12, 2004, and where permissible, each of which is incorporated by reference in their entirety.

FIELD OF THE INVENTION

The present invention relates to a synthetic magnification micro-optic system that in an exemplary embodiment is formed as a polymer film. The unusual optical effects provided by the various embodiments of the disclosure can be used as a security device for overt and covert authentication of currency, documents, and products as well as visual enhancement of products, packaging, printed material, and consumer goods.

BACKGROUND

Various optical materials have been employed to provide authentication of currency and documents, to identify and distinguish authentic products from counterfeit products, and to provide visual enhancement of manufactured articles and packaging. Examples include holographic displays, and other image systems involving lenticular structures and arrays of spherical micro-lenses. Holographic displays have become prevalent for use with credit cards, drivers' licenses, and clothing tags.

An example of a lenticular structure for document security is disclosed in U.S. Pat. No. 4,892,336 to Kaule, et al. directed to a security thread for embedding within a document to provide anti-falsification measures. The security thread is transparent having a printed pattern on one side, on the opposite side, a lenticular lens structure coordinated with the printed pattern. The lenticular lens structure is described as comprised of a plurality of parallel cylinder lenses, or alternatively spherical or honeycomb lenses.

U.S. Pat. No. 5,712,731 to Drinkwater, et al. discloses a security device that includes an array of micro-images coupled with an array of substantially spherical micro-lenses. The lenses may also be astigmatic lenses. The lenses are each typically 50-250 µm and with a focal length of typically 200 µm.

These approaches all suffer from similar drawbacks. They result in a relatively thick structure that is not particularly suitable for use with document authentication. Their use of cylindrical or spherical lenses provides a narrow field of view resulting in fuzzy images and requiring exact and difficult alignment of the focal point of the lenses with the associated images. Additionally, they have not proven particularly effective as security or anti-counterfeiting measures.

In view of these and other deficiencies, a need exists in the industry for secure and visually unique optical materials that can facilitate overt authentication of currency, documents, manufactured articles, and products and for optical materials that provide visual enhancement of manufactured articles, products, and packaging.

SUMMARY

The present disclosure relates to a film material that utilizes a regular two-dimensional array of non-cylindrical lenses to enlarge micro-images, called icons herein, and to form a synthetically magnified image through the united performance of a multiplicity of individual lens/icon image systems. The synthetically magnified images and the background surrounding them can be either colorless or colored, and either or both the images and the background surrounding them can be transparent, translucent, pigmented, fluorescent, phosphorescent, display optically variable color, metallized, or substantially retroreflective. The material displaying colored images on a transparent or tinted background is particularly well suited for use in combination with underlying printed information. When a piece of such material is applied over printed information both the printed information and the images are seen at the same time in spatial or dynamic motion relationship to each other. Material of this kind can also be overprinted, i.e. have print applied to the uppermost (lens) surface of the material. Alternatively, the material displaying colored images (of any color, including white and black) on a translucent or substantially opaque background of different color is particularly well suited for stand-alone use or with overprinted information, not in combination with underlying printed information.

The magnitude of the synthetic magnification achieved can be controlled by the selection of a number of factors, including the degree of 'skew' between the axes of symmetry of the lens array and the axes of symmetry of the icon array. Regular periodic arrays possess axes of symmetry that define lines that the pattern could be reflected around without changing the basic geometry of the pattern, that in the ideal of arrays are infinite in extent. A square array, for example, can be reflected around any diagonal of any square without changing the relative orientation of the array: if the sides of the squares are aligned with the x and y axes of the plane, then the sides of the squares will still be aligned with those axes after reflection, with the assumption that all sides are identical and indistinguishable.

Instead of mirroring the square array the array can be rotated through an angle equal to the angle between the axes of symmetry of the same type. In the case of a square array the array can be rotated through an angle of 90 degrees, the angle between diagonals, to arrive at an array orientation which is indistinguishable from the original array. Similarly, an array of regular hexagons can be mirrored or rotated about a number of axes of symmetry, including the "diagonals" of the hexagon (the lines connecting opposite vertices) or "midpoint divisors" (lines that connect between the center points of faces on opposite sides of the hexagon). The angle between the axes of symmetry of either type is sixty degrees) (60°) results in an array orientation that is indistinguishable from the original orientation.

If a lens array and an icon array are initially arranged with their planar dimensions defining their respective x-y plane, one of the axes of symmetry being chosen to represent the x axis of the first array, the corresponding type of axis of symmetry (for example, diagonal axis of symmetry) being chosen to represent the x axis of the second array, with the two arrays separated by a substantially uniform distance in the z axis direction, then the arrays are said to have zero skew if the x axes of the arrays appear to be parallel to each other when the arrays are viewed along the z axis direction. In the case of hexagonal arrays, rotation of one array through an angle of 60 degrees, or multiples thereof, puts the arrays in alignment again, so there is no skew, just as there is no skew for a rotation of 90 degrees, or multiples thereof, in the case of square arrays. Any angular misalignment between the x axes that is different from these "zero skew rotations" is called the skew. A small skew, such as 0.06 degree, can create a large magnification, in excess of 1,000×, and a large skew, such as 20 degrees produces a small magnification, potentially as small as 1×. Other factors, such as the relative scales of the two arrays and the F# of the lens, can affect both the magnification of the synthetic image as well as its rotation, orthoparallactic movement, and apparent visual depth.

There are a number of distinct visual effects that can be provided by the present material (subsequently referred to as "Unison" for the material in general, or by the names "Unison Motion", "Unison Deep", "Unison SuperDeep", "Unison Float", "Unison SuperFloat", "Unison Levitate", "Unison Morph", and "Unison 3-D" for Unison material presenting those respective effects), and their various embodiments producing each of these effects, generally described as follows:

Unison Motion presents images that show orthoparallactic movement (OPM)—when the material is tilted the images move in a direction of tilt that appears to be perpendicular to the direction anticipated by normal parallax. Unison Deep and SuperDeep present images that appear to rest on a spatial plane that is visually deeper than the thickness of the material. Unison Float and SuperFloat present images that appear to rest on a spatial plane that is a distance above the surface of the material; and Unison Levitate presents images that oscillate from Unison Deep (or SuperDeep) to Unison Float (or SuperFloat) as the material is rotated through a given angle (e.g. 90 degrees), then returning to Unison Deep (or SuperDeep) again as the material is further rotated by the same amount. Unison Morph presents synthetic images that change form, shape, or size as the material is rotated or viewed from different viewpoints. Unison 3-D presents images that show large scale three-dimensional structure, such as an image of a face.

Multiple Unison effects can be combined in one film, such as a film that incorporates multiple Unison Motion image planes that can be different in form, color, movement direction, and magnification. Another film can combine a Unison Deep image plane and a Unison Float image plane, while yet another film can be designed to combine Unison Deep, Unison Motion, and Unison Float layers, in the same color or in different colors, those images having the same or different graphical elements. The color, graphical design, optical effect, magnification, and other visual elements of multiple image planes are largely independent; with few exceptions, planes of these visual elements can be combined in arbitrary ways.

For many currency, document and product security applications it is desirable that the total thickness of the film be less than 50 microns, (also referred to herein as "μ", or "μm"), for example less than about 45 microns, and as a further example in the range of about 10 microns to about 40 microns. This can be accomplished, for example, through the use of focusing elements having an effective base diameter of less than 50 microns, as a further example less than 30 microns, and as yet a further example, from about 10 microns to about 30 microns. As another example, a focusing element having a focal length of less than about 40 microns, and as a further example having a focal length of about 10 to less than about 30 microns, can be used. In a particular example focusing elements having a base diameter of 35 microns and a focal length of 30 microns can be used. An alternate, hybrid refractive/diffractive embodiment, can be made as thin as 8 microns.

The films herein are highly counterfeit resistant because of their complex multi-layer structure and their high aspect-ratio elements that are not amenable to reproduction by commonly available manufacturing systems.

Thus, the present system provides a micro-optic system preferably in the form of a polymer film having a thickness that when viewed by unaided eye(s) in reflective or transmitted light projects one or more images that:
  i. show orthoparallactic movement (Unison Motion);
  ii. appear to lie on a spatial plane deeper than the thickness of the polymer film (Unison Deep and Unison SuperDeep);
  iii. appear to lie on a spatial plane above a surface of the polymer film (Unison Float and Unison SuperFloat);
  iv. oscillate between a spatial plane deeper than the thickness of the polymer film and a spatial plane above a surface of the film as the film is azimuthally rotated (Unison Levitate);
  v. transform from one form, shape, size, color (or some combination of these properties) into a different form, shape, size, or color (or some combination of these properties) (Unison Morph); and/or
  vi. appear to have realistic three-dimensionality (Unison 3-D).

The present disclosure more particularly provides a synthetic magnification micro-optic system and method of making the same comprising:
  (a) one or more optical spacers;
  (b) a micro image comprised of a periodic planar array of a plurality of image icons having an axis of symmetry about at least one of its planar axes, and positioned on or next to the optical spacer; and
  (c) a periodic planar array of image icon focusing elements having an axis of symmetry about at least one of its planar axes, the axis of symmetry being the same planar axis as that of the micro image planar array, each focusing element being either a polygonal base multi-zonal focusing element, a lens providing an enlarged field of view over the width of the associated image icon so that the peripheral edges of the associated image icon do not drop out of view, or an aspheric focusing element having an effective diameter of less than 50 microns.

The system can include one or more of the aforementioned effects. A method is provided by which said effects can be selectively included within the system.

The present disclosure further provides a security device suitable for at least partial incorporation in or on, and for use on or in association with, a security document, label, tear tape, tamper indicating device, sealing device, or other authentication or security device, which comprises at least one micro-optic system, as defined above. More particularly the present disclosure provides a document security device and method of making the same comprising:
  (a) one or more optical spacers;
  (b) a micro image comprised of a periodic planar array of a plurality of image icons having an axis of symmetry about at least one of its planar axes, and positioned on or next to the optical spacer; and
  (c) a periodic planar array of image icon focusing elements having an axis of symmetry about at least one of its planar axes, the axis of symmetry being the same planar axis as that of the micro image planar array, each focusing element being either a polygonal base multi-zonal focusing element, a lens providing an enlarged field of view over the width of the associated image icon so that the peripheral edges of the associated image icon do not drop out of view, or an aspheric focusing element having an effective diameter of less than 50 microns.

Additionally, the present disclosure provides a visual enhancement device which comprises at least one micro-optic system, as defined above and having the above described effects, for visual enhancement of clothing, skin products, documents, printed matter, manufactured goods, packaging, point of purchase displays, publications, advertising devices, sporting goods, financial documents and transaction cards, and all other goods.

Also provided is a security document or label having at least one security device, as defined above, at least partially embedded therein and/or mounted thereon.

Other features and advantages of the present disclosure will be apparent to one of ordinary skill from the following detailed description and accompanying drawings.

Other systems, devices, methods, features, and advantage will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE FIGURES

Many aspects of the disclosure can be better understood with reference to the drawings. The components in the drawings are not necessarily to scale, emphasis instead being placed upon clearly illustrating the principles of the present disclosure. Moreover, in the drawings, like reference numerals designate corresponding parts throughout the several views.

FIG. 1b is an isometric cutaway view of the embodiment of FIG. 1a.

FIGS. 2 b-c illustrate the visual effects of the Deep and Float embodiments of the present system.

FIGS. 2 d-f illustrate the visual effects obtained by rotation of a Levitate embodiment of the present system.

FIGS. 3 a-i are plan views showing various embodiments and fill-factors of different patterns of symmetric two dimensional arrays of lenses of the present system.

FIG. 4 is a graph illustrating different combinations of Deep, Unison, Float, and Levitate embodiment effects produced by variation of the icon element period/lens period ratio.

FIGS. 5 a-c are plan views illustrating how the synthetic magnification of the icon images can be controlled by the relative angle between the lens array and icon array axes of the present system.

FIGS. 6 a-c are plan views illustrating an embodiment accomplishing a morphing effect of synthetically magnified images of the present system.

FIGS. 7 a-c are cross-sections showing various embodiments of the icon layer of the present system.

FIGS. 8 a-b are plan views illustrating both 'positive' and 'negative' icon element embodiments.

FIGS. 11 a-b are cross-section views showing reflective optics and pinhole optics embodiments of the present system.

FIGS. 12 a-b are cross-section views comparing the structures of an all-refractive material embodiment with a hybrid refractive/reflective material embodiment.

FIGS. 15 a-d are cross-section views showing various embodiments of two-sided systems.

FIGS. 16 a-f are cross-section views and corresponding plan views illustrating three different methods for creating grayscale or tonal icon element patterns and subsequent synthetically magnified images by the present system.

FIGS. 17 a-d are cross-section views showing the use of the present system in conjunction with printed information.

FIGS. 18 a-f are cross-section views illustrating the application of the present system to, or incorporation into, various substrates and in combination with printed information.

FIGS. 19 a-b are cross-section views comparing the in-focus field of view of a spherical lens with that of a flat field aspheric lens when each are incorporated into the present system.

FIGS. 20 a-c are cross-section views illustrating two benefits of utility which result from the use of a thick icon layer in the present system.

FIG. 27 illustrates the method for designing icon images for the three-dimensional embodiment of FIG. 26.

DETAILED DESCRIPTION OF THE EMBODIMENTS

Reference is now made in detail to the description of the embodiments as illustrated in the figures. While several embodiments are described in connection with these figures, there is no intent to limit the invention to the embodiment or embodiments disclosed herein. On the contrary, the intent is to cover all alternatives, modifications, and equivalents.

Figure 1A:
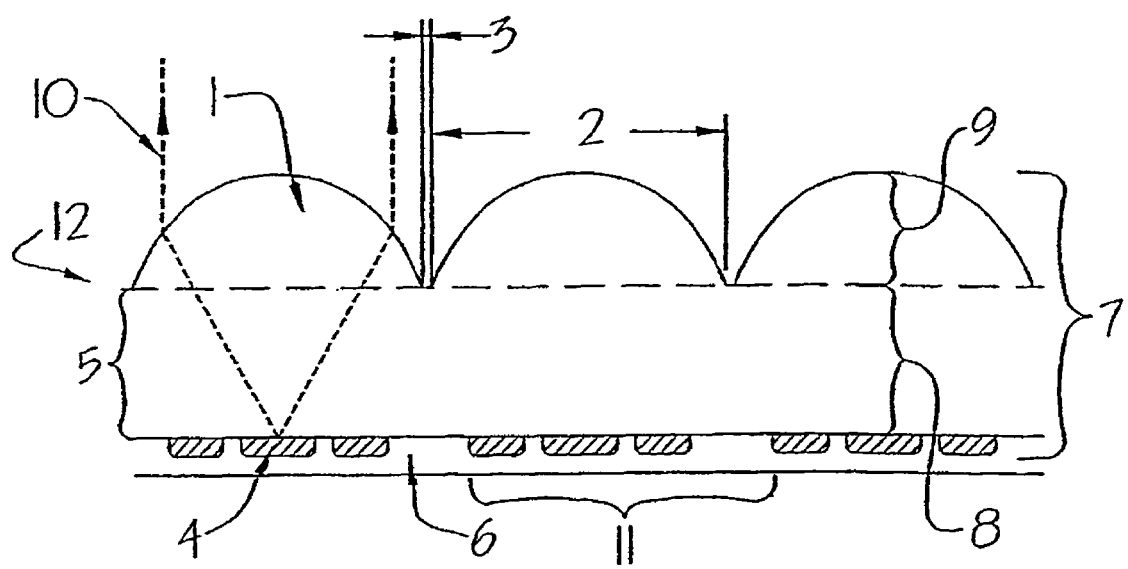
FIG. 1a is a cross-section of a micro-optic system exemplifying one embodiment of the present disclosure providing orthoparallactic movement of the images of the system.

FIG. 1a illustrates one embodiment of the present micro-optic system 12 providing orthoparallactic movement of the images of the system.

The system 12 micro-lenses 1 that have at least two substantially equal axes of symmetry and that are arranged in a two-dimensional periodic array. Lens diameter 2 is preferably less than 50μ and the interstitial space between lenses 3 is preferably 5μ or less. (We use the terms "μ" and "μm" interchangeably to mean the same measurement). Micro-lens 1 focuses an image of icon element 4 and projects this image 10 toward a viewer. The system is commonly used in situations having normal levels of ambient lighting, so the illumination of the icon images arises from reflected or transmitted ambient light. Icon element 4 is one element of a periodic array of icon elements having periods and dimensions substantially similar to those of the lens array including lens 1. Between the lens 1 and the icon element 4 is an optical spacer 5, which may be contiguous with the lens 1 material or may optionally be a separate substrate 8—in this embodiment the lenses 9 are separate from the substrate. The icon elements 4 may be optionally protected by a sealing layer 6, preferably of a polymer material. Sealing layer 6 may be transparent, translucent, tinted, pigmented, opaque, metallic, magnetic, optically variable, or any combination of these that provide desirable optical effects and/or additional functionality for security and authentication purposes, including support of automated currency authentication, verification, tracking, counting and detection systems, that rely on optical effects, electrical conductivity or electrical capacitance, magnetic field detection.

The total thickness 7 of the system is typically less than 50μ; the actual thickness depends on the F# of the lenses 1 and the diameter of the lenses 2, and the thickness of additional security feature or visual effect layers. The repeat period 11 of the icon elements 4 is substantially identical to the repeat period of the lenses 1; the "scale ratio", the ratio of the repeat period of the icons to the repeat period of the lenses, is used to create many different visual effects. Axially symmetric values of the scale ratio substantially equal to 1.0000 result in Unison Motion orthoparallactic effects when the symmetry axes of the lenses and the icons are misaligned, axially symmetric values of the scale ratio less than 1.0000 result in Unison Deep and Unison SuperDeep effects when the symmetry axes of the lenses and the icons are substantially aligned, and axially symmetric values of the scale ratio greater than 1.0000 result in Unison Float and Unison Super-Float effects when the symmetry axes of the lenses and the icons are substantially aligned. Axially asymmetric values of the scale ratio, such as 0.995 in the X direction and 1.005 in the Y direction, result in Unison Levitate effects.

Unison Morph effects can be obtained by scale distortions of either or both the lens repeat period and the icon repeat period, or by incorporating spatially varying information into the icon pattern. Unison 3-D effects are also created by incorporating spatially varying information into the icon pattern, but in this embodiment the information represents different viewpoints of a three dimensional object as seen from specific locations substantially corresponding to the locations of the icons.

Figure 1B:
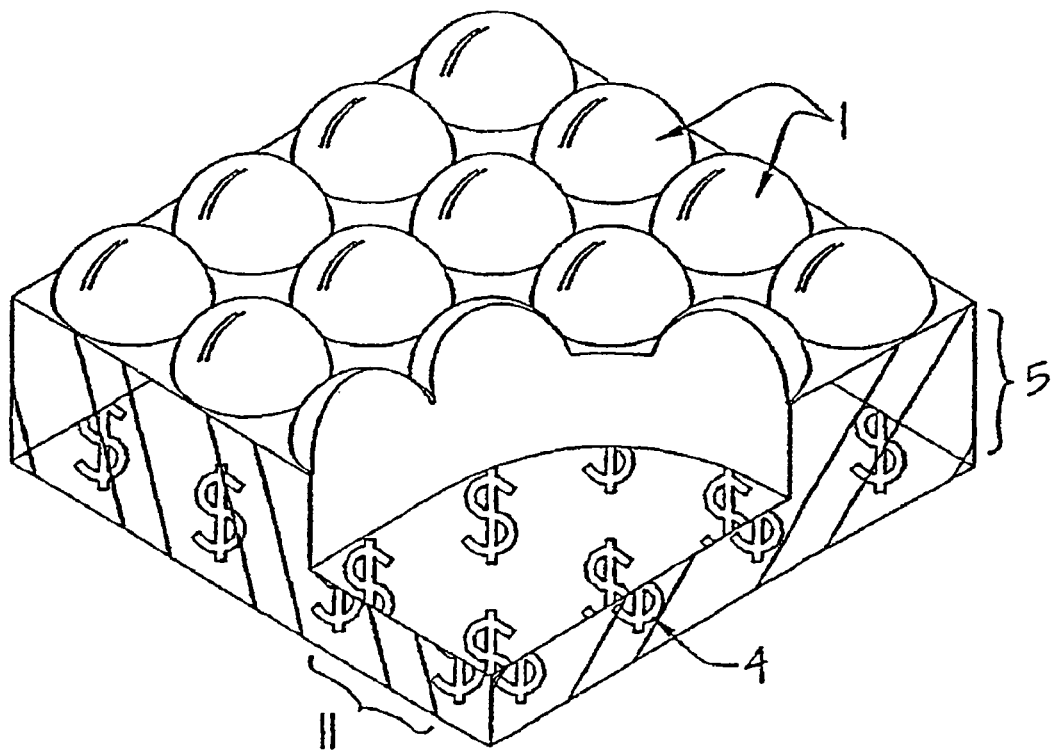

FIG. 1b presents an isometric view of the present system, as depicted in cross-section in FIG. 1a, having square array patterns of lenses 1 and icons 4 of repeat period 11 and optical spacer thickness 5 (FIG. 1a is not specific to a square array pattern, but is a representative cross-section of all regular periodic array patterns). The icon elements 4 are shown as "$" images, clearly seen in the cut-away section at the front. While there is substantially a one-to-one correspondence between lenses 1 and icon elements 4, the axes of symmetry of the lens array will not, in general, be exactly aligned with the axes of symmetry of the icon array.

In the case of the Unison (orthoparallactic motion) material embodiment of FIGS. 1a-b with a scale ratio of 1.0000, when the lens 1 axes and icon elements 4 axes are substantially aligned, the resulting synthetic images of the icon elements (in this example, a giant "$") "blow-up" and are magnified by a factor that theoretically approaches infinity. Slight angular misalignment of the lens 1 axes and icon elements 4 axes reduces the magnification factor of the synthetic images of the icon elements and causes the magnified synthetic images to rotate.

The synthetic magnification factor of Unison Deep, Unison Float, and Unison Levitate embodiments depends on the angular alignment of the lens 1 axes and the icon elements 4 axes as well as the scale ratio of the system. When the scale ratio is not equal to 1.0000 the maximum magnification obtained from substantial alignment of these axes is equal to the absolute value of 1/(1.0000−(scale ratio)). Thus a Unison Deep material having a scale ratio of 0.995 would exhibit a maximum magnification of |1/(1.000−0.995)|=200×. Similarly, a Unison Float material having a scale ratio of 1.005 would also exhibit a maximum magnification of |1/(1.000−1.005)|=200×. In a manner similar to the Unison Motion material embodiment, slight angular misalignment of the lens 1 axes and icon elements 4 axes of the Unison Deep, Unison Float, and Unison Levitate embodiments reduces the magnification factor of the synthetic images of the icon elements and causes the magnified synthetic images to rotate.

The synthetic image produced by a Unison Deep or Super-Deep icon pattern is upright with respect to the orientation of the Unison Deep or SuperDeep icon pattern, while the synthetic image produced by a Unison Float or SuperFloat icon pattern is upside down, rotated one hundred and eighty degrees) (180°) with respect to the orientation of the Unison Float or Super Float icon pattern.

Figure 2A:
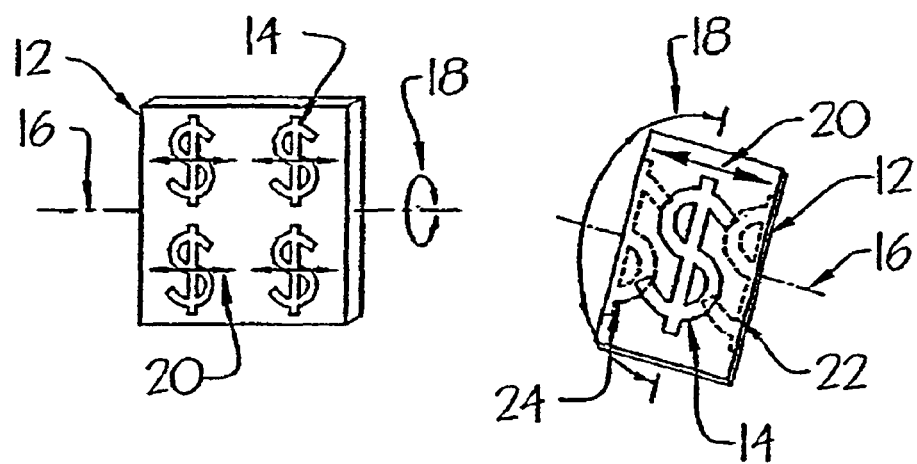
FIG. 2a illustrates an orthoparallactic synthetic image motion effect of the embodiment of FIGS. 1 a-b.

FIG. 2a schematically depicts the counter-intuitive orthoparallactic image motion effects seen in the Unison Motion embodiment. The left side of FIG. 2a depicts a piece of Unison Motion material 12 in plan view being oscillated 18 about horizontal axis 16. If the synthetically magnified image 14 moved according to parallax, it would appear to be displaced up and down (as shown in FIG. 2a) as the material 12 was oscillated around the horizontal axis 16. Such apparent parallactic motion would be typical of real objects, conventional print, and holographic images. Instead of exhibiting parallactic motion, synthetically magnified image 14 shows orthoparallactic motion 20—motion which is perpendicular to the normally expected parallactic motion direction. The right side of FIG. 2a depicts a perspective view of a piece of material 12 exhibiting the orthoparallactic motion of a single synthetically magnified image 14 as it is oscillated 18 about horizontal rotational axis 16. The dotted outline 22 shows the position of the synthetically magnified image 14 after it has moved to the right by orthoparallaxis and the dotted outline 24 shows the position of the synthetically magnified image 14 after it has moved to the left by orthoparallaxis.

The visual effects of the Unison Deep and Unison Float embodiments are isometrically depicted in FIGS. 2 b,c. In FIG. 2b, a piece of Unison Deep material 26 presents synthetically magnified images 28 that stereoscopically appear to lie beneath the plane of the Unison Deep material 26 when viewed by the eyes of the observer 30. In FIG. 2c, a piece of Unison Float material 32 presents synthetically magnified images 34 that stereoscopically appear to lie above the plane of the Unison Float material 34 when viewed by the eyes of the observer 30. The Unison Deep and Unison Float effects are visible from all azimuthal viewing positions and over a wide range of elevation positions, from vertical elevation (such that the line of sight from the eyes of the observer 30 to the Unison Deep material 26 or Unison Float material 32 is perpendicular to the surface of the materials) down to a shallow elevation angle which is typically less than 45 degrees. The visibility of the Unison Deep and Unison Float effects over a wide range of viewing angles and orientations provides a simple and convenient method of differentiating Unison Deep and Unison Float materials from simulations utilizing cylindrical lenticular optics or holography.

The Unison Levitate embodiment effect is illustrated in FIGS. 2 d-f by isometric views showing the stereoscopically perceived depth position of a synthetically magnified image 38 in three different azimuthal rotations of the Unison Levitate material 36 and the corresponding plan view of the Unison Levitate material 36 and synthetically magnified image 38 as seen by the eyes of the observer 30. FIG. 2d depicts the synthetically magnified image 38 (hereafter referred to as 'the image') as stereoscopically appearing to lie in a plane beneath the Unison Levitate material 36 when said material is oriented as shown in the plan view. The heavy dark line in the plan view serves as an azimuthal orientation reference 37 for the sake of explanation. Note that in FIG. 2d the orientation reference 37 is aligned in a vertical direction and the image 38 is aligned in a horizontal direction. The image 38 appears in the Unison Deep position because the scale ratio is less than 1.000 along a first axis of the Unison Levitate material 36 that is aligned substantially parallel to a line connecting the pupils of the observer's two eyes (this will be hereafter called the 'stereoscopic scale ratio'). The stereoscopic scale ratio of the Unison Levitate material 36 is greater than 1.000 along a second axis perpendicular to this first axis, thereby producing a Unison Float effect of the image 38 when the second axis is aligned substantially parallel to a line connecting the pupils of the observer's eyes, as shown in FIG. 2f. Note that the orientation reference 37 is in a horizontal position in this figure. FIG. 2e depicts an intermediate azimuthal orientation of the Unison Levitate material 36 that produces a Unison Motion orthoparallactic image effect because the stereoscopic scale ratio in this azimuthal orientation is substantially 1.000.

The visual effect of a Unison Levitate image 38 moving from beneath the Unison Levitate material 36 (FIG. 2d) up to the level of the Unison Levitate material 36 (FIG. 2e) and further up above the level of the Unison Levitate material 36 (FIG. 2f) as the material is azimuthally rotated can be enhanced by combining the Unison Levitate material 36 with conventionally printed information. The unchanging stereoscopic depth of the conventional print serves as a reference plane to better perceive the stereoscopic depth movement of the images 38.

When a Unison material is illuminated by a strongly directional light source such as a 'point' light source (ex: a spotlight or an LED flashlight) or a collimated source (ex: sunlight), "shadow images" of the icons may be seen. These shadow images are unusual in many ways. While the synthetic image presented by Unison does not move as the direction of illumination is moved, the shadow images produced do move. Furthermore, while the Unison synthetic images may lie in different visual planes than the plane of the material, the shadow images always lie in the plane of the material. The color of the shadow image is the color of the icon. So black icons create black shadow images, green icons create green shadow images, and white icons create white shadow images.

The movement of the shadow image as the angle of illumination moves is tied to the specific depth or motion Unison effect in a way that parallels the visual effect present in the synthetic image. Thus the movement of a shadow image as the angle of the light is altered parallels the movement that the synthetic image shows when the angle of view is altered. In particular:

Motion shadow images move orthoparallactically as the light source is moved.

Deep shadow images move in the same direction as the light source.

Float shadow images move opposite to the direction of the light source.

Levitate shadow images move in directions that are a combination of the above:

Levitate Deep shadow images move in the same direction as the light in the left-right direction, but opposite from the direction of the light in the up-down direction; Levitate Float shadow images move opposite to the light in the left right direction but in the same direction as the light in the up-down direction; Levitate Motion shadow images show orthoparallactic motion with respect to the light movement.

Unison Morph shadow images show morphing effects as the light source is moved.

Additional unusual shadow image effects are seen when a diverging point light source, such as an LED light, is moved toward and away from a Unison film. When the light source is further away its diverging rays more closely approximate collimated light, and the shadow images produced by Deep, SuperDeep, Float, or SuperFloat Unison synthetic images appear approximately the same size as the synthetic images. When the light is brought closer to the surface the shadow images of Deep and SuperDeep materials shrink because the illumination is strongly divergent, while the shadow images of Float and SuperFloat materials expand. Illuminating these materials with converging illumination causes Deep and SuperDeep shadow images to enlarge to a size greater than the synthetic images, while Float and SuperFloat shadow images shrink.

The shadow images of Unison motion material do not change scale significantly as the convergence or divergence of illumination is changed, rather, the shadow images rotate about the center of illumination. Unison Levitate shadow images shrink in one direction and enlarge in the perpendicular direction when the convergence or divergence of the illumination is changed. Unison Morph shadow images change in ways specific to the particular Morph pattern as the convergence or divergence of the illumination is changed.

All of these shadow image effects can be used as additional authentication methods for Unison materials utilized for security, anti-counterfeiting, brand protection applications, and other similar applications.

FIGS. 3 *a-i* are plan views showing various embodiments and fill-factors of different patterns of symmetric two-dimensional arrays of micro-lenses. FIGS. 3*a*, *d* and *g* depict micro-lenses 46, 52, and 60, respectively, that are arranged in regular hexagonal array pattern 40. (The dashed array pattern lines 40, 42, and 44 indicate the symmetry of the pattern of lenses but do not necessarily represent any physical element of the lens array.) The lenses of FIG. 3*a* have substantially circular base geometry 46, the lenses of FIG. 3*g* have substantially hexagonal base geometries 60, and the lenses of FIG. 3*d* have intermediate base geometries which are rounded-off hexagons 52. A similar progression of lens geometries applies to the square array 42 of lenses 48, 54, and 62, wherein these lenses have base geometries which range from substantially circular 48, to rounded-off square 54, to substantially square 62, as seen in FIGS. 3*b*, *e*, and *h*. Correspondingly, the equilateral triangular array 44 holds lenses having base geometries that range from substantially circular 50, to rounded-off triangle 58, to substantially triangular 64, as seen in FIGS. 3*c*, *f* and *i*.

The lens patterns of FIGS. 3 *a-i* are representative of lenses that can be used for the present system. The interstitial space between the lenses does not directly contribute to the synthetic magnification of the images. A material created using one of these lens patterns will also include an array of icon elements that is arranged in the same geometry and at approximately the same scale, allowing for differences in scale utilized to produce Unison Motion, Unison Deep, Unison Float, and Unison Levitate effects. If the interstitial space is large, such as is shown in FIG. 3*c*, the lenses are said to have a low fill-factor and the contrast between the image and the background will be reduced by light scattered from icon elements. If the interstitial spaces are small the lenses are said to have a high fill-factor and the contrast between the image and the background will be high, providing the lenses themselves have good focal properties and icon elements are in the lenses' focal planes. It is generally easier to form high optical quality micro-lenses with a circular or nearly circular base than with a square or triangular base. A good balance of lens performance and minimizing of interstitial space is shown in FIG. 3*d*; a hexagonal array of lenses having base geometries that are rounded hexagons.

Lenses having a low F# are particularly suitable for use in the present system. By low F# we mean an F# equivalent to 4 or less, and in particular for Unison Motion approximately 2 or lower. Low F# lenses have high curvature and a correspondingly large sag, or center thickness, as a proportion of their diameter. A typical Unison lens, with an F# of 0.8, has a hexagonal base 28 microns wide and a center thickness of 10.9 microns. A typical Drinkwater lens, with a diameter of 50 microns and a focal length of 200 microns, has an F# of 4 and a center thickness of 3.1 microns. If scaled to the same base size, the Unison lens has a sag almost six times larger than the Drinkwater lens.

We have discovered that polygonal base multi-zonal lenses, for example hexagonal base multi-zonal lenses, have important and unexpected advantages over circular base spherical lenses. As explained above, hexagonal base multi-zonal lenses significantly improve manufacturability by virtue of their stress-relieving geometry, but there are additional unexpected optical benefits obtained through the use of hexagonal base multi-zonal lenses.

We refer to these lenses as multi-zonal because they possess three optical zones that each provide a different and unique benefit to the subject invention. The three zones are the central zone (constituting approximately half of the area of the lens), the side zones, and the corner zones. These polygonal lenses have an effective diameter that is the diameter of a circle drawn inside the corner zones around the central zone and including the side zones.

Figure 30:
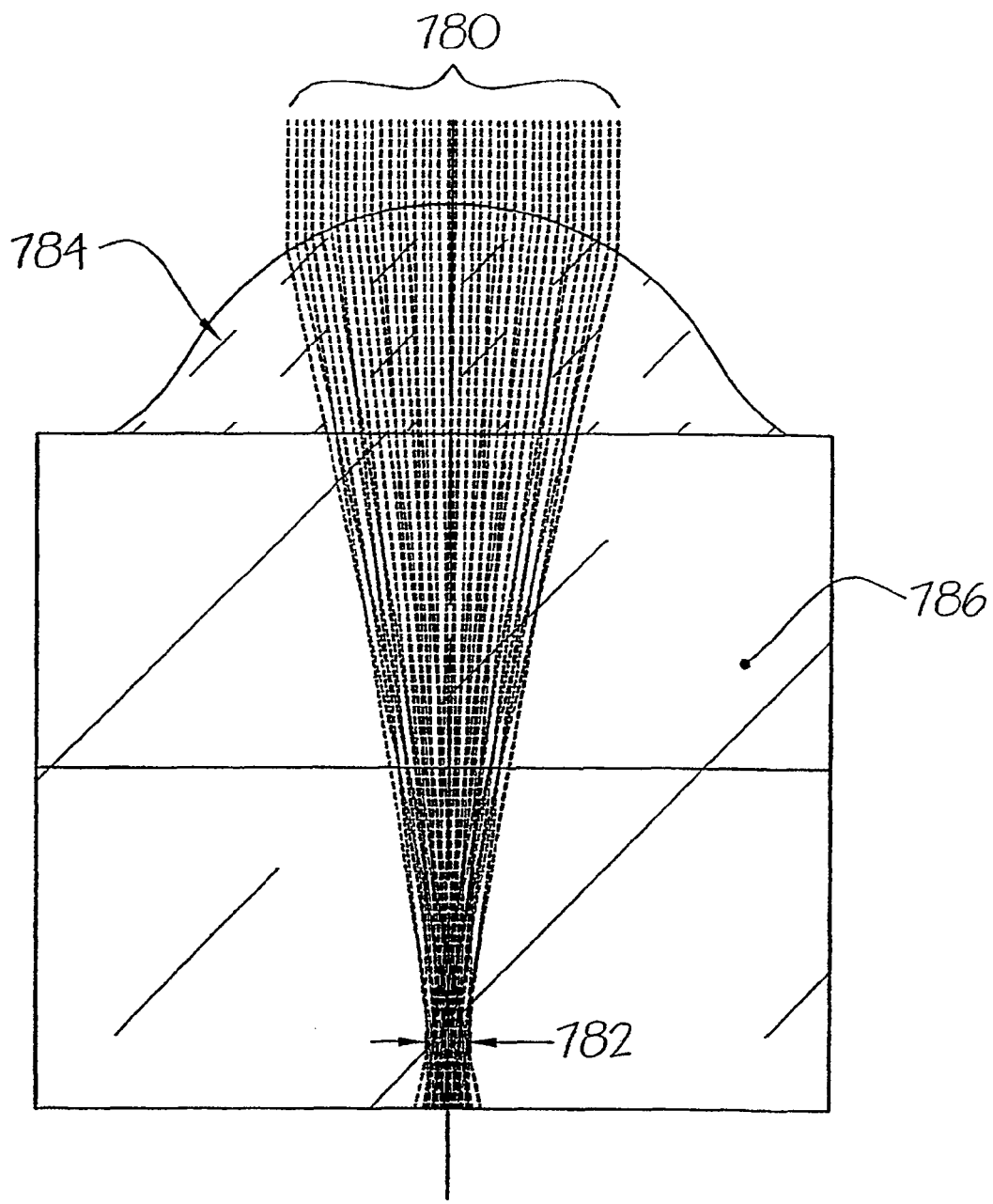
FIG. 30 illustrates the central zone focal properties of an exemplary hexagonal base multi-zonal lens having an effective diameter of 28 microns.
Figure 31:
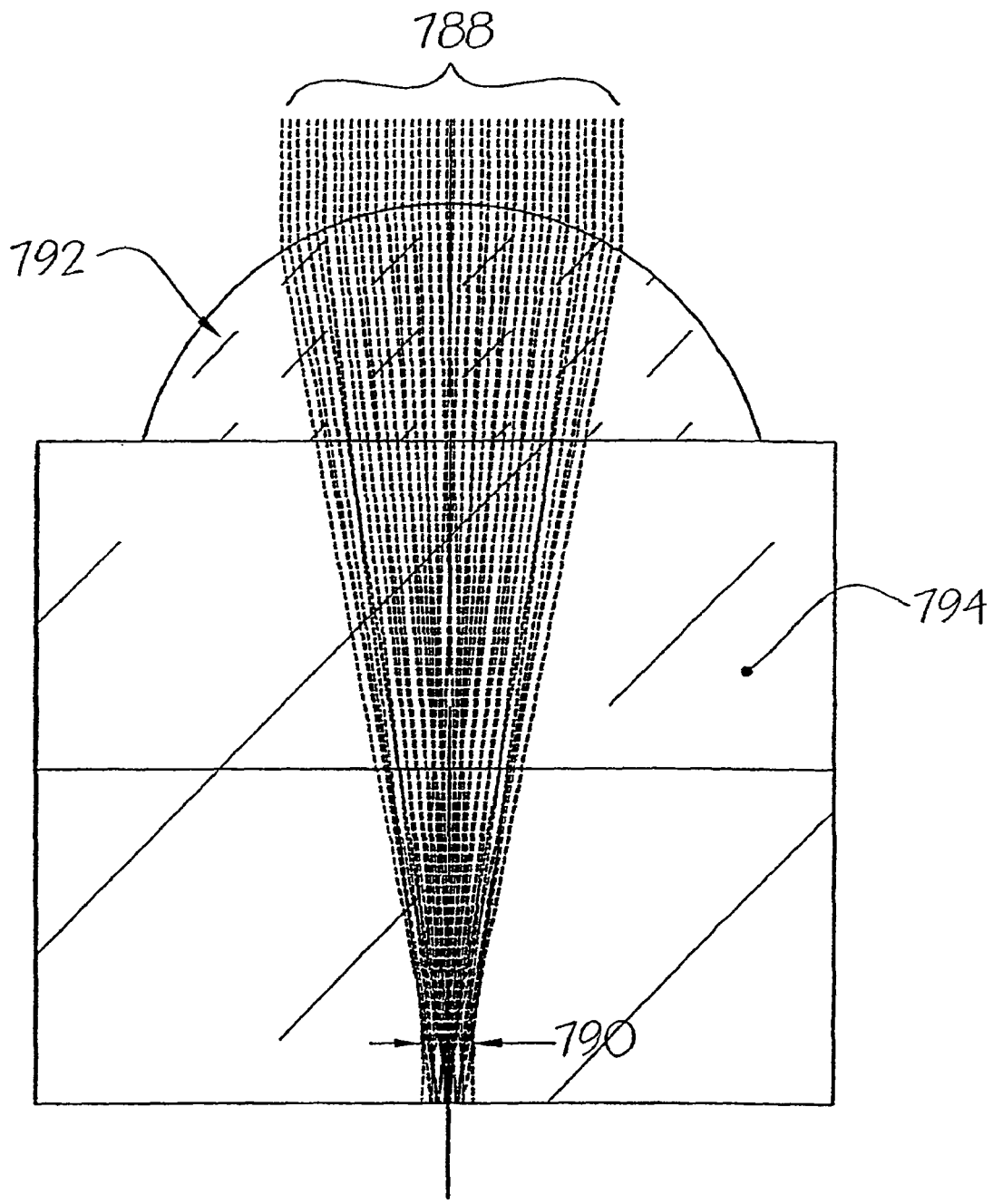
FIG. 31 illustrates the central zone focal properties of a spherical lens having a diameter of 28 microns.

The central zone of the hexagonal base multi-zonal lens of the subject invention has an aspheric form (for example, having the form defined by [y=(5.1316E)×4−(0.01679)×3+(0.124931)×+11.24824] for a 28 micron diameter lens with a nominal 28 micron focal length) that brings light to a focus at least as well as a spherical surface having the same diameter and focal length. FIG. 30 illustrates the central zone 780 focal properties 782 of a nominal 28 micron diameter hexagonal base multi-zonal lens 784 with a nominal 28 micron focal length in a polymer substrate 786 (lens and substrate n=1.51) and FIG. 31 illustrates the central zone 788 focal properties 790 of a 28 micron diameter spherical lens 792 with a nominal 30 micron focal length in a polymer substrate 794 (lens and substrate n=1.51). Comparison of these two figures clearly demonstrates that the hexagonal base multi-zonal lens 784 of the subject disclosure performs at least as well as the spherical lens 792. The central zone 780 of the hexagonal base multi-zonal lens 784 provides high image resolution and shallow depth of field from a wide variety of viewing angles.

Figure 32:
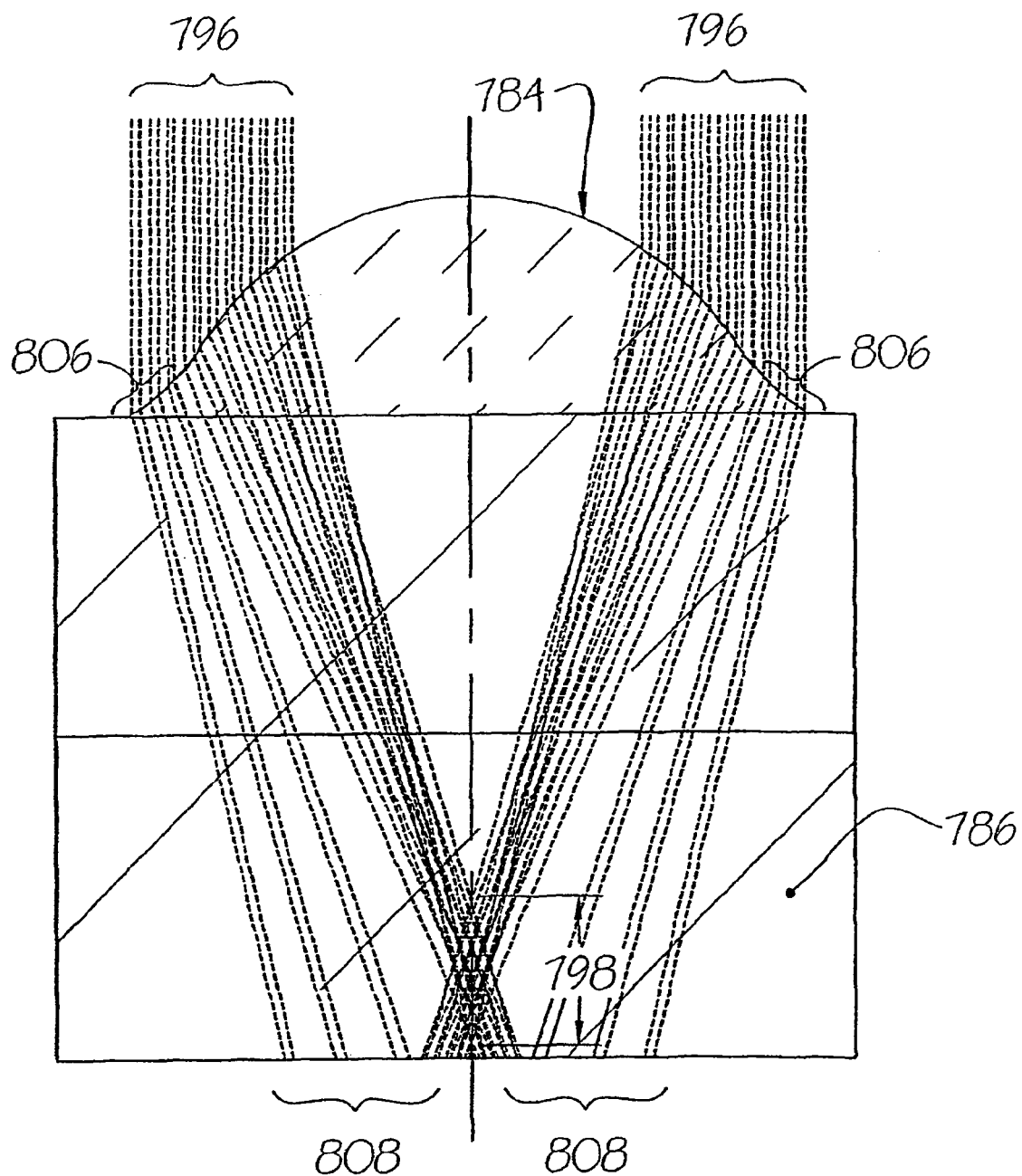
FIG. 32 illustrates the performance of the side zones of the hexagonal lens of FIG. 30.
Figure 33:
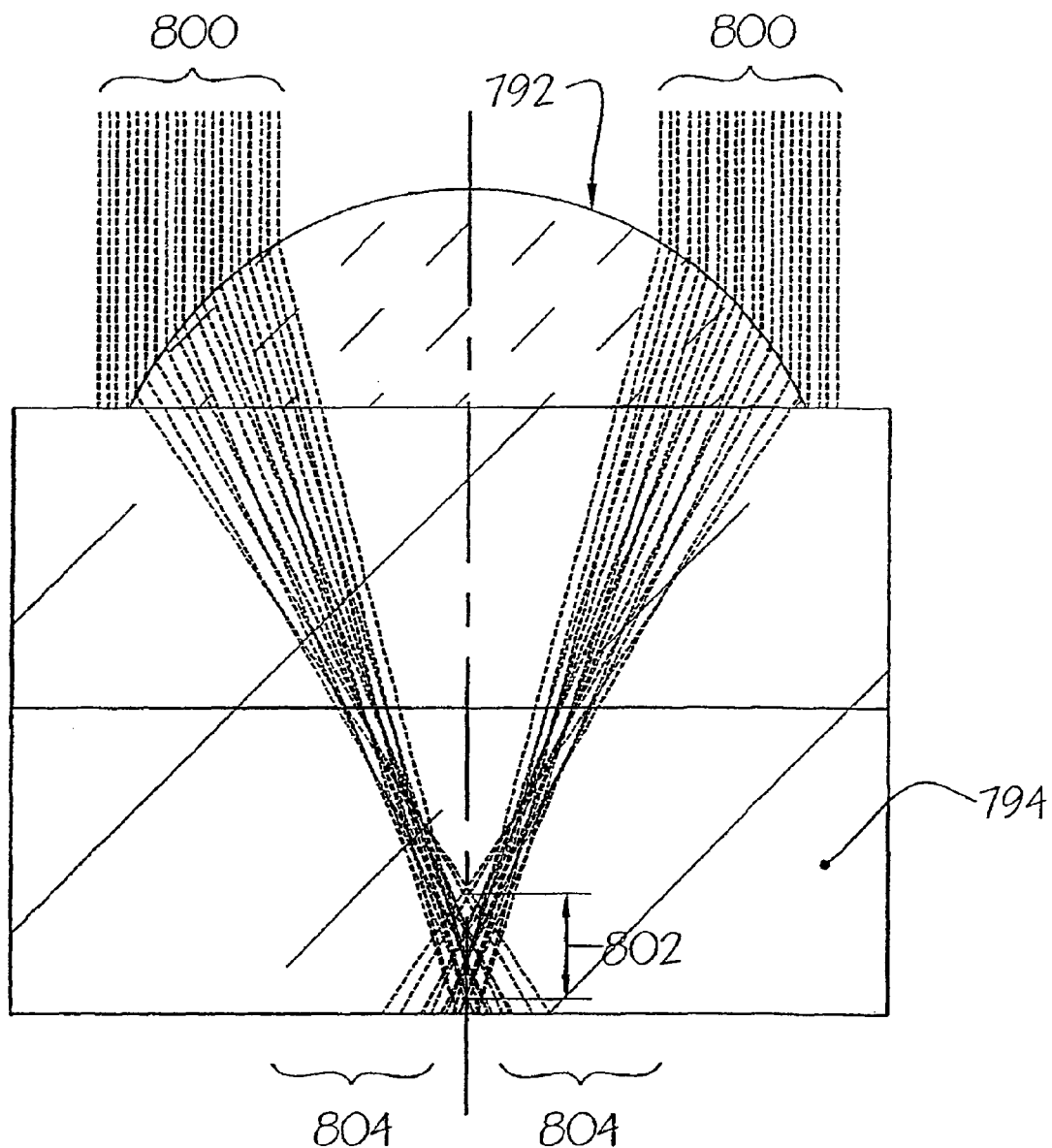
FIG. 33 illustrates the performance of the outer zones of the spherical lens of FIG. 31.

Each of the six side zones 796 of the hexagonal base multi-zonal lens 784 of the subject invention have focal lengths that depend on the location with the zone in a complex way, but the effect is to cause the focus of the side zones 796 to be spread over a range of values 798 spanning approximately +/−10 percent of the central zone focus, as illustrated in FIG. 32. This vertical blurring 798 of the focal point effectively increases the depth of field of the lens in these zones 796, and provides a benefit that is equivalent to having a flat-field lens. The performance of the outer zones 800 of spherical lens 792 can be seen in FIG. 33. The vertical blurring of the focal point 802 is significantly less for the spherical lens 792 than it is for the hexagonal base multi-zonal lens 784.

This is particularly important for off-normal viewing: the increased depth of field, and effectively flatter field, mitigates the abrupt image defocus that can occur with a spherical lens when its curved focal surface separates from the icon plane. Consequently, a Unison material using hexagonal base multi-zonal lenses displays synthetic images that fade from focus more softly at higher viewing angles than the equivalent Unison material using spherical lenses. This is desirable because it increases the effective viewing angle of the material and therefore increases its usefulness as a security device or an image presentation device.

The corner zones 806 of the hexagonal base multi-zonal lens 784 of FIG. 32 possess diverging focal properties that provide the unexpected benefit of scattering 808 ambient illumination onto the icon plane and thereby reducing the sensitivity of the Unison material to illumination conditions. The spherical lens 792 of FIG. 33 does not scatter the ambient illumination over as wide an area (as seen by the absence of rays scattered into the icon plane regions 804), so Unison materials made using spherical lenses have greater synthetic image brightness variations when viewed from a variety of angles than Unison materials made using hexagonal base multi-zonal lenses.

The benefit obtained from the exemplary hexagonal base multi-zonal lenses is further magnified because hexagonal base multi-zonal lenses have a higher fill factor (ability to cover the plane) than spherical lenses. The interstitial space between spherical lenses provides virtually no scattering of ambient light, while this non-scattering area is much smaller in the case of hexagonal base multi-zonal lenses.

Thus it is seen that even though the focal properties of a hexagonal base multi-zonal lens are inferior to those of a spherical lens as evaluated by conventional optical standards, in the context of the subject invention hexagonal base multizonal lenses provide unexpected benefits and advantages over spherical lenses.

Either type of lens can benefit from the addition of scattering microstructures or scattering materials introduced into, or incorporated into, the lens interstitial spaces to enhance the scattering of ambient illumination onto the icon plane. Furthermore, the lens interstitial spaces can be filled with a material that will form a small radius meniscus, with either converging or diverging focal properties, to direct ambient illumination onto the icon plane. These methods may be combined, for example, by incorporating light scattering particles into a lens interstitial meniscus fill material. Alternatively, the lens interstitial zones can be originally manufactured with suitably scattering lens interstitial zones.

A spherical lens having these proportions is very difficult to manufacture because the high contact angle between the surface of the film and the edge of the lens acts as a stress concentrator for the forces applied to separate the lens from the tool during manufacture. These high stresses tend to cause the adhesion of the lens to the film to fail and to failure of removal of the lens from the tool. Furthermore, the optical performance of a low F# spherical lens is progressively compromised for radial zones away from the center of the lens: low F# spherical lenses do not focus well except near their central zone.

Hexagonal base lenses have an unexpected and significant benefit over lenses that have a more substantially circular base: hexagonal lenses release from their tools with lower peeling force than the optically equivalent lenses with substantially circular bases. Hexagonal lenses have a shape that blends from substantially axially symmetric near their center to hexagonally symmetric, with corners that act as stress concentrators, at their bases. The stress concentrations caused by the sharp base corners reduce the overall peeling force required to separate the lenses from their molds during manufacturing. The magnitude of this effect is substantial—the peeling forces can be reduced during manufacturing by a factor of two or more for hexagonal base lenses as compared to substantially circular base lenses.

The image contrast of the material can be enhanced by filling the lens interstitial spaces with a light absorbing (dark colored) opaque pigmented material, effectively forming a mask for the lenses. This eliminates the contrast reduction that arises from light scattered from the icon layer through the lens interstitial spaces. An additional effect of this interstitial fill is that the overall image becomes darker because incoming ambient illumination is blocked from passing through the interstitial spaces to the icon plane. The image clarity produced by lenses having aberrant focusing at their periphery can also be improved by an opaque pigmented interstitial fill, providing that this fill occludes the aberrant peripheral lens zone.

A different effect can be obtained by filling the lens interstitial spaces with a white or light colored material, or a material color matched to a substrate to be used with the Unison material. If the light colored lens interstitial fill is dense enough and the icon plane incorporates a strong contrast between the icon elements and the background, the Unison synthetic image will be substantially invisible when viewed with reflected light, yet will be distinctly visible when viewed in transmitted light from the lens side, but not visible when viewed from the icon side. This provides the novel security effect of having a one-way transmission image that is visible only in transmitted light and visible only from one side.

Fluorescing materials can be utilized in a lens interstitial coating instead of, or in addition to, visible light pigments to provide additional means of authentication.

FIG. 4 graphs the effects of changing the stereoscopic scale ratio, SSR (the icon element repeat period/the lens array repeat period), along an axis of the present material. Zones of the system having an SSR greater than 1.0000 will produce Unison Float and SuperFloat effects, zones having an SSR of substantially 1.0000 will produce Unison Motion orthoparallactic motion (OPM) effects, and zones having an SSR less than 1.0000 will produce Unison Deep and Unison SuperDeep effects. All of these effects can be produced and transitioned from one to another in a variety of ways along an axis of system film. This figure illustrates one of an infinite variety of such combinations. The dashed line 66 indicates the SSR value corresponding substantially to 1.0000, the dividing line between Unison Deep and Unison SuperDeep and Unison Float and Unison SuperFloat, and the SSR value which demonstrates OPM. In zone 68 the SSR of the Unison material is 0.995, creating a Unison Deep effect.

Adjacent to this is zone 70 in which the SSR is ramped from 0.995 up to 1.005, producing a spatial transition from a Unison Deep to a Unison Float effect. The SSR in the next zone 72 is 1.005 creating a Unison Float effect. The next zone 74 creates a smooth transition down from a Unison Float effect to a Unison Deep effect. Zone 76 proceeds stepwise up from a Unison Deep effect, to OPM, to a Unison Float effect, and zone 78 steps it back down to OPM. The variations in repeat period needed to accomplish these effects are generally most easily implemented in the icon element layer. In addition to varying the SSR in each zone, it may be desirable to vary the rotational angle of each zone of the arrays, preferably within the icon element array, to keep the synthetically magnified images substantially similar in size.

The easiest way to interpret this graph is to see it as a cross-section of the stereoscopic depth that will be perceived across this axis of a piece of system material. It is therefore possible to create a stereoscopically sculpted field of images, a contoured visual surface, by local control of the SSR and optionally by corresponding local control of the array rotational angle. This stereoscopically sculpted surface can be used to represent an unlimited range of shapes, including human faces. A pattern of icon elements that create the effect of a stereoscopically sculpted grid, or periodic dots, can be a particularly effective way to visually display a complex surface.

FIGS. 5 *a-c* are plan views depicting the effect of rotating one array pattern with respect to the other in the production of material of the present system. FIG. 5*a* shows a lens array 80 having a regular periodic array spacing 82, without substantial change in the angle of the array axes. FIG. 5*b* shows an icon element array 84 with a progressively changing array axis orientation angle 86. If the lens array 80 is combined with the icon element array 84 by translating the lens array over the icon array, as drawn, then the approximate visual effect that results is shown in FIG. 5*c*. In FIG. 5*c* the material 88 created by combining lens array 80 and icon array 84 creates a pattern of synthetically magnified images 89, 90, 91 that vary in scale and rotation across the material. Towards the upper edge of the material 88 image 89 is large and shows a small rotation. Image 90, toward the upper middle section of material 88 is smaller and is rotated through a significant angle with respect to image 89. The different scales and rotations between images 89 and 91 are the result of the differences in the angular misalignment of the lens pattern 82 and the icon element pattern 86.

FIGS. 6 a-c illustrate a method for causing one synthetically magnified OPM image 98 to morph into another synthetically magnified image 102 as the first image moves across a boundary 104 in the icon element patterns 92 and 94. Icon element pattern 92 bears circle-shaped icon elements 98, shown in the magnified inset 96. Icon element pattern 94 bears star-shaped icon elements 102, shown in the magnified inset 100. Icon element patterns 92 and 94 are not separate objects, but are joined at their boundary 104. When the material is assembled using this combined pattern of icon elements the resulting OPM images will show the morphing effects depicted in FIGS. 6b and c. FIG. 6b shows OPM circle images 98 moving to the right 107 across the boundary 104 and emerging from the boundary as star images 102 also moving to the right. Image 106 is in transition, part circle and part star, as it crosses the boundary. FIG. 6c of the figure shows the images after they have moved further to the right: image 98 is now closer to the boundary 104 and image 106 has almost completely crossed the boundary to complete its morphing from circle to star. The morphing effect can be accomplished in a less abrupt manner by creating a transition zone from one icon element pattern to the other, instead of having a hard boundary 104. In the transition zone the icons would gradually change from circle to star through a series of stages. The smoothness of the visual morphing of the resulting OPM images will depend on the number of stages used for the transition. The range of graphical possibilities is endless. For example: the transition zone could be designed to make the circle appear to shrink while sharp star points protruded up through it, or alternatively the sides of the circle could appear to dent inward to create a stubby star that progressively became sharper until it reached its final design.

FIGS. 7 a-c are cross-sections of materials of the present system that illustrate alternative embodiments of the icon elements. FIG. 7a depicts a material having lenses 1 separated from icon elements 108 by optical spacer 5. Icon elements 108 are formed by patterns of colorless, colored, tinted, or dyed material applied to the lower surface of optical spacer 5. Any of the multitude of common printing methods, such as ink jet, laserjet, letterpress, flexo, gravure, and intaglio, can be used to deposit icon elements 108 of this kind so long as the print resolution is fine enough.

FIG. 7b depicts a similar material system with a different embodiment of icon elements 112. In this embodiment the icon elements are formed from pigments, dyes, or particles embedded in a supporting material 110. Examples of this embodiment of icon elements 112 in supporting material 110 include: silver particles in gelatin, as a photographic emulsion, pigmented or dyed ink absorbed into an ink receptor coating, dye sublimation transfer into a dye receptor coating, and photochromic or thermochromic images in an imaging film.

FIG. 7c depicts a microstructure approach to forming icon elements 114. This method has the benefit of almost unlimited spatial resolution. The icon elements 114 can be formed from the voids in the microstructure 113 or the solid regions 115, singly or in combination. The voids 113 can optionally be filled or coated with another material such as evaporated metal material, having a different refractive index, or dyed or pigmented material.

FIGS. 8 a, b depict positive and negative embodiments of icon elements. FIG. 8a shows positive icon elements 116 that are colored, dyed, or pigmented 120 against a transparent background 118. FIG. 8b shows negative icon elements 122 that are transparent 118 against a colored, dyed, or pigmented background 120. A material of the present system may optionally incorporate both positive and negative icon elements. This method of creating positive and negative icon elements is particularly well adapted to the microstructure icon elements 114 of FIG. 7c.

Figure 9:
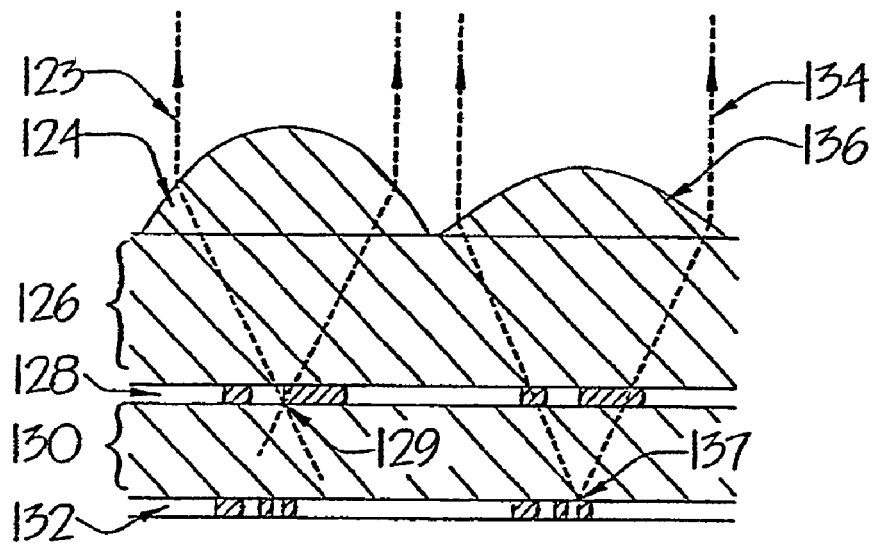
FIG. 9 is a cross-section view illustrating an embodiment of a multi-level material for creating regions of a synthetically magnified image having different properties.

FIG. 9 shows a cross-section of one embodiment of a pixel-zone material of the present system. This embodiment includes zones with lenses 124 having a short focus and other zones with lenses having a long focus 136. The short focus lenses 124 project images 123 of icon elements 129 in icon plane 128 disposed at the focal plane of lenses 124. The long focus lenses 136 project images 134 of icon elements 137 in icon plane 132 disposed at the focal plane of lenses 136. Optical separator 126 separates short focus lenses 124 from their associated icon plane 128. Long focus lenses 136 are separated from their associated icon plane 132 by the sum of the thicknesses of optical separator 126, icon plane 128, and second optical separator 130. Icon elements 137 in the second icon plane 132 are outside the depth of focus of short focus lenses 124 and therefore do not form distinct synthetically magnified images in the short focus lens zones. In a similar manner, icon elements 129 are too close to long focus lenses 136 to form distinct synthetically magnified images. Accordingly, zones of material bearing short focus lenses 124 will display images 123 of the icon elements 129, while zones of material bearing long focus lenses 136 will display images 134 of icon elements 137. The images 123 and 134 that are projected can differ in design, color, OPM direction, synthetic magnification factor, and effect, including the Deep, Unison, Float, and Levitate effects described above.

Figure 10:
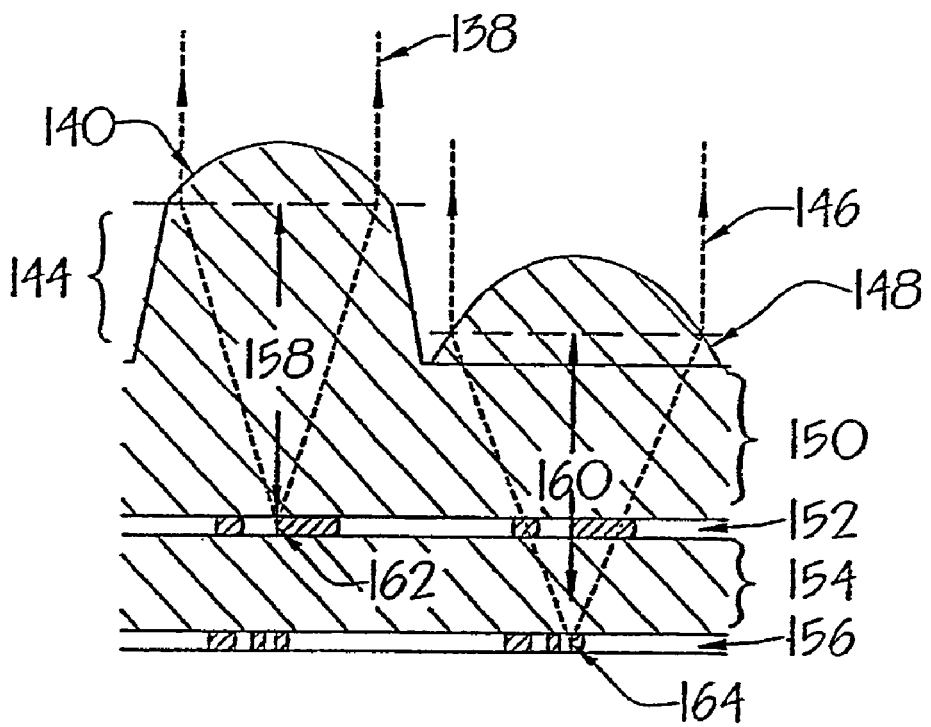
FIG. 10 is a cross-section view illustrating another embodiment of a multi-level material for creating regions of a synthetically magnified image having different properties.

FIG. 10 is a cross-section of an alternate embodiment of a pixel-zone material of the present system. This embodiment includes zones with lenses 140 elevated by a lens support mesa 144 above the bases of the non-elevated lenses 148. The focal length of the elevated lenses 140 is the distance 158, placing the focus of these lenses in the first icon plane 152. The focal length of the non-elevated lenses 148 is the distance 160, placing the focus of these lenses in the second icon plane 156. These two focal lengths, 158 and 160, may be chosen to be similar or dissimilar. The elevated lenses 140 project images 138 of icon elements 162 in icon plane 152 disposed at the focal plane of lenses 140. The non-elevated lenses 148 project images 146 of icon elements 164 in icon plane 156 disposed at the focal plane of lenses 148. The elevated lenses 140 are separated from their associated icon elements 162 by the sum of the thickness of the lens support mesa 144 and the optical separation 150. The non-elevated lenses 148 are separated from their associated icon elements 164 by the sum of the thickness of the optical separation 150, the icon layer 152, and the icon separator 154. Icon elements 164 in the second icon plane 156 are outside the depth of focus of the elevated lenses 140 and therefore do not form distinct synthetically magnified images in the elevated lens zones. In a similar manner, icon elements 152 are too close to non-elevated lenses 148 to form distinct synthetically magnified images. Accordingly, zones of material bearing elevated lenses 140 will display images 138 of the icon elements 162, while zones of material bearing non-elevated lenses 136 will display images 146 of icon elements 156. The images 138 and 146 that are projected can differ in design, color, OPM direction, synthetic magnification factor, and effect, including Deep, Unison, Float, and Levitate effects.

FIGS. 11 a, b are cross-sections illustrating non-refractive embodiments of the present system. FIG. 11a illustrates an embodiment that utilizes a focusing reflector 166 instead of a refractive lens to project images 174 of icon elements 172. The icon layer 170 lies between the viewer's eyes and the focusing optics. Focusing reflectors 166 can be metallized 167 to obtain high focusing efficiency. The icon layer 170 is maintained at a distance equal to the focal length of the reflectors by optical separator 168. FIG. 11 b discloses a pinhole optics embodiment of this material. Opaque upper layer 176, preferably black in color for contrast enhancement, is pierced by apertures 178. Optical separator element 180 controls the field of view of the system. Icon elements 184 in icon layer 182 are imaged through apertures 178 in a manner similar to the pinhole optics of a pinhole camera. Because of the small amount of light passed through the apertures, this embodiment is most effective when it is back-illuminated, with light passing through the icon plane 182 first, then through the apertures 178. Effects of each of the above-described embodiments, OPM, Deep, Float, and Levitate, can be created using either the reflective system design or the pinhole optics system design.

FIGS. 12 a, b are cross-sections comparing the structures of an all-refractive material 188 with a hybrid refractive/reflective material 199. FIG. 12a depicts an exemplary structure, with micro-lenses 192 separated from the icon plane 194 by optical separator 198. Optional sealing layer 195 contributes to the total refractive system thickness 196. Lenses 192 project icon images 190 toward the viewer (not shown). Hybrid refractive/reflective material 199 includes micro-lenses 210 with icon plane 208 directly beneath them. Optical spacer 200 separates the lenses 210 and the icon plane 208 from reflective layer 202. Reflective layer 202 can be metallized, such as by evaporated or sputtered aluminum, gold, rhodium, chromium, osmium, depleted uranium or silver, by chemically deposited silver, or by multi-layer interference films. Light scattered from icon layer 208 reflects from reflective layer 202, passes through icon layer 208 and into lenses 210 which project images 206 toward the viewer (not shown). Both of these figures are drawn to approximately the same scale: by visual comparison it can be seen that the total system thickness 212 of the hybrid refractive/reflective system 199 is about half the total system thickness 196 of the all-refractive system 188. Exemplary dimensions for equivalent systems are 29µ total refractive system 188 thickness 196 and 17µ for total hybrid refractive/reflective system 199 thickness 212. The thickness of a refractive/reflective system can be further reduced by scaling. Thus, a hybrid system having lenses 15µ in diameter can be made with a total thickness of about 8µ. Effects of each of the above described embodiments, OPM, Deep, Float, Levitate, Morph, and 3-D can be created using the hybrid refractive/diffractive design.

Figure 13:
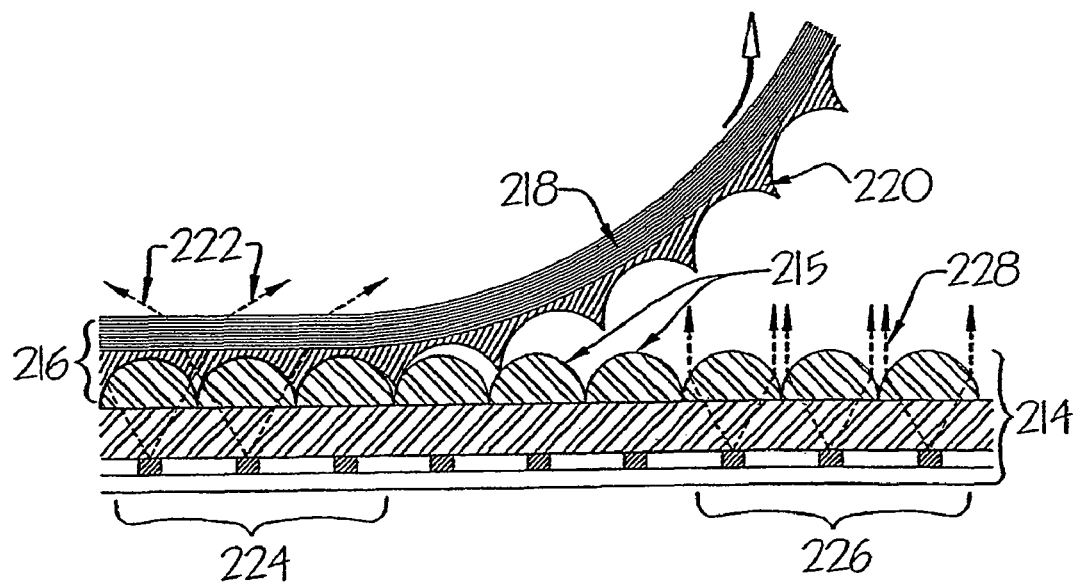
FIG. 13 is a cross-section view showing a 'peel-to-reveal' tamper-indicating material embodiment.

FIG. 13 is a cross-section showing a 'peel-to-reveal' tamper-indicating material embodiment of the present system. This embodiment does not display an image until it is tampered with. The untampered structure is shown in region 224, where a refractive system 214 is optically buried under a top layer 216 consisting of an optional substrate 218 and a peelable layer 220 which is conformal to the lenses 215. Peelable layer 220 effectively forms negative lens structures 220 that fit over positive lenses 215 and negate their optical power. Lenses 215 cannot form images of the icon layer in the untampered region, and the light scattered 222 from the icon plane is unfocused. Top layer 216 may include an optional film substrate 218. Tampering, shown in region 226, causes the release of top layer 216 from the refractive system 214, exposing the lenses 215 so that they can form images 228. Effects of each of the above described embodiments, OPM, Deep, Float, and Levitate, can be included in a tamper indicating 'peel-to-reveal' system of the type of FIG. 13.

Figure 14:
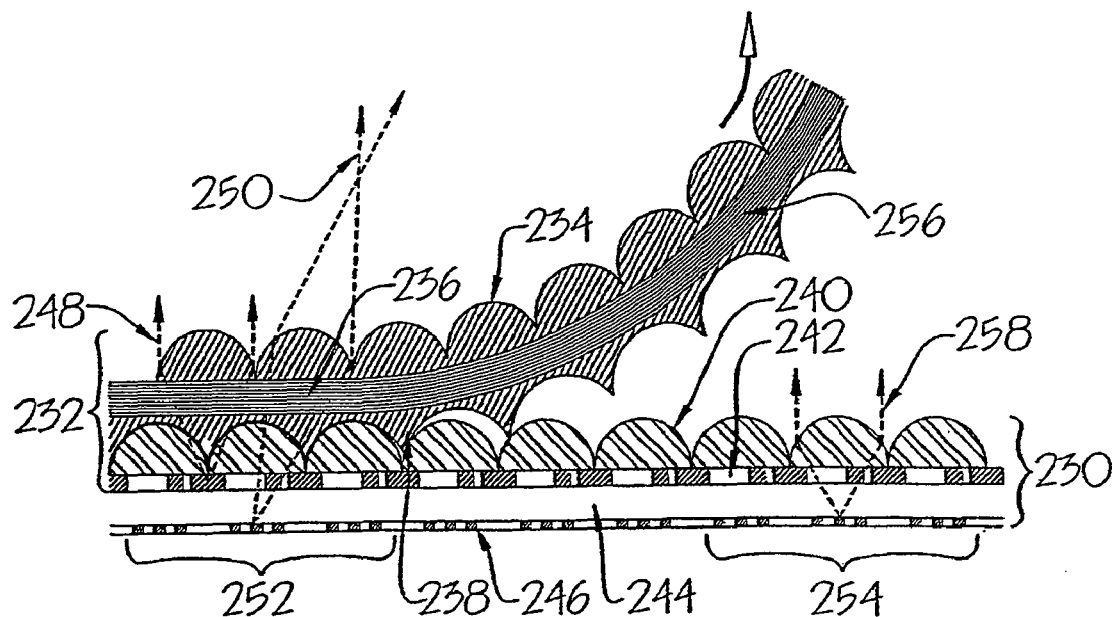
FIG. 14 is a cross-section view illustrating a 'peel-to-change' tamper-indicating material embodiment.

FIG. 14 is a cross-section illustrating a 'peel-to-change' tamper-indicating material embodiment of the present system. This embodiment displays a first image 248 of a first icon plane 242 prior to tampering 252, then displays a second image 258 at region 254 after it has been tampered with. The untampered structure is shown in region 252, where two refractive systems, 232 and 230, are stacked. The first icon plane 242 is located beneath the lenses 240 of the second system. Prior to tampering in region 252 the first, or upper, system 232 presents images of the first icon plane 242. The second icon plane 246 is too far outside the depth of focus of lenses 234 to form distinct images. The first lenses 234 are separated from the second lenses 240 by an optional substrate 236 and a peelable layer 238 which is conformal to the second lenses 240. Peelable layer 232 effectively forms negative lens structures 238 that fit over positive lenses 240 and negate their optical power. Top layer 232 may include optional film substrate 236. Tampering results in the peeling 256 of the top layer 232, shown in region 254, from the second refractive system 230, exposing the second lenses 240 so that they can form images 258 of the second icon layer 246. Second lenses 240 do not form images of the first icon layer 242 because the icon layer is too close to the lenses 240.

This embodiment of a tamper indicating material is well suited to application as a tape or label applied to an article. Tampering releases the top layer 232, leaving the second system 230 attached to the article. Prior to tampering, this embodiment presents a first image 248. After tampering 254 the second system 230, still attached to the article, presents a second image 258 while the peeled layer 256 presents no image at all. Effects of each of the above described embodiments, OPM, Deep, Float, and Levitate, can be included in either the first system 232 or the second system 230.

Note that an alternative embodiment accomplishing a similar effect to that of FIG. 14 is to have two separate systems laminated to each other. In this embodiment when the upper layer is peeled it takes the first icon plane and its image(s) with it, revealing the second system and its image(s).

FIGS. 15 a-d are cross-sections showing various two-sided embodiments of the present system. FIG. 15a depicts a two-sided material 260 that includes a single icon plane 264 that is imaged 268 by lenses 262 on one side and imaged 270 by a second set of lenses 266 on the opposite side. The image 268 seen from the left side (as drawn) is the mirror image of the image 270 seen from the right side. Icon plane 264 may contain icon elements that are symbols or images which appear similar in mirror image, or icon elements which appear different in mirror image, or combinations of icon elements wherein a portion of the icon elements are correct-reading when viewed from one side and the other icon elements are correct-reading when viewed from the other side. Effects of each of the above described embodiments, OPM, Deep, Float, and Levitate, can be displayed from either side of a two-sided material according to this embodiment.

FIG. 15b illustrates another two-sided embodiment 272 having two icon planes 276 and 278 that are imaged, 282 and 286 respectively, by two sets of lenses, 274 and 280 respectively. This embodiment is essentially two separate systems, 287 and 289, such as illustrated in FIG. 1a, that have been joined together with an icon layer spacer 277 in between them. The thickness of this icon layer spacer 277 will determine the degree that the 'wrong' icon layer is imaged 284 and 288 by a set of lenses. For example, if the thickness of icon layer spacer 277 is zero, such that icon layers 276 and 278 are in contact, then both icon layers will be imaged by both sets of lenses 274 and 280. In another example, if the thickness of icon layer spacer 277 is substantially larger than the depth of focus of lenses 274 and 280, then the 'wrong' icon layers will not be imaged by the lenses 274 and 280. In yet another example, if the depth of focus of one set of lenses 274 is large, but the depth of focus of the other set of lenses is small (because the lenses 274 and 280 have different F#'s), then both icon planes 276 and 278 will be imaged 282 through lenses 274 but only one icon plane 278 will be imaged through lenses 280, so a material of this type would show two images from one side but only one of those images, mirrored, from the opposite side. Effects of each of the above described embodiments, OPM, Deep, Float, and Levitate, can be displayed from either side of a two-sided material according to this embodiment, and the projected images 282 and 286 can be of the same or different colors.

FIG. 15c shows yet another two-sided material 290 having a pigmented icon layer spacer 298 that blocks the lenses on one side of the material from seeing the 'wrong' set of icons. Lenses 292 image 294 icon layer 296 but cannot image icon layer 300 because of the presence of pigmented icon layer 298. Similarly, lenses 302 image 304 icon layer 300, but cannot image icon layer 296 because of the presence of pigmented icon layer 298. Effects of each of the above described embodiments, OPM, Deep, Float, and Levitate, can be displayed from either side of a two-sided material according to this embodiment, and the projected images 294 and 304 can be of the same or different colors.

FIG. 15d discloses a further two-sided material 306 embodiment having lenses 308 that image 318 icon layer 314 and lenses 316 on the opposite side that image 322 icon layer 310. Icon layer 310 is close to, or substantially in contact with, the bases of lenses 308 and icon layer 314 is close to, or substantially in contact with, the bases of lenses 316. Icons 310 are too close to lenses 308 to form an image, so their light scatters 320 instead of focusing. Icons 314 are too close to lenses 316 to form an image, so their light scatters 324 instead of focusing. Effects of each of the above described embodiments, OPM, Deep, Float, and Levitate, can be displayed from either side of a two-sided material according to this embodiment, and the projected images 318 and 322 can be of the same or different colors.

FIGS. 16 a-f are cross-sections and corresponding plan views illustrating three different methods for creating grayscale or tonal icon element patterns and subsequent synthetically magnified images with the present system. FIGS. 16 a-c are cross-section details of the icon side of a material 307, including part of optical separator 309 and a transparent micro structured icon layer 311. The icon elements are formed as bas-relief surfaces 313, 315, 317 that are then filled with a pigmented or dyed material 323, 325, 327 respectively. The underside of the icon layer may be optionally sealed by a sealing layer 321 that can be transparent, tinted, colored, dyed, or pigmented, or opaque. The bas-relief micro structures of icon elements 313, 315, and 317 provide thickness variations in the dyed or pigmented fill material, 323, 325, and 327 respectively, that create variations in the optical density of the icon element as seen in plan view. The plan views corresponding to icon elements 323, 325, and 327 are plan views 337, 339, and 341. The use of this method to create grayscale or tonal synthetically magnified images is not limited to the specifics of the examples disclosed here, but may be generally applied to create an unlimited variety of grayscale images.

FIG. 16a includes icon element 313, dyed or pigmented icon element fill 323, and corresponding plan view 337. The cross section view of the icon plane at the top of this figure can only show one cutting plane through the icon elements. The location of the cutting plane is indicated by the dashed line 319 through the plane views 337, 339, and 341. Accordingly, the cross-section of icon element 313 is one plane through a substantially hemispherical-shaped icon element. By suitably limiting the overall dye or pigment density of the fill 323, thickness variations of the dyed or pigmented fill 323 create a tonal, or grayscale, optical density variations represented in the plan view 337. An array of icon elements of this type can be synthetically magnified within the present material system to produce images that show equivalent grayscale variations.

FIG. 16b includes icon element 315, dyed or pigmented icon element fill 325, and corresponding plan view 339. Plan view 339 shows that the icon element 315 is a bas-relief representation of a face. The tonal variations in an image of a face are complex, as shown by the complex thickness variations 325 in the cross-section view. As disclosed with regard to icon element 313, an array of icon elements of this type, as shown by 315, 325, and 339, can be synthetically magnified within the present material system to produce images that show equivalent grayscale variations representing, in this example, the image of a face.

FIG. 16c includes icon element 317, dyed or pigmented fill 327, and corresponding plan view 341. In a manner similar to the discussion of FIGS. 16 a, b, above, the bas-relief shape of this icon element structure produces a tonal variation in the appearance of the dyed and pigmented fill 327 and in the synthetically magnified image produced by the present material system. Icon element 317 illustrates a method for creating a bright center in a rounded surface, as compared to the effect of icon element 313 which creates a dark center in a rounded surface.

FIGS. 16 d, e disclose another embodiment 326 of transparent bas-relief micro structured icon layer 311 including icon elements 329 and 331 that are coated with a high refractive index material 328. The icon layer 311 can be sealed with an optional sealing layer 321 that fills the icon elements 329 and 331, 330 and 332, respectively. The high refractive index layer 328 enhances the visibility of sloping surfaces by creating reflections from them by total internal reflection. Plan views 342 and 344 present representative images of the appearance of icon elements 329 and 331 and their synthetically magnified images. This high refractive index coating embodiment provides a kind of edge-enhancement effect without adding pigment or dye to make the icons and their images visible.

FIG. 16f discloses yet another embodiment 333 of transparent bas-relief micro structured icon 335 utilizing an air, gas, or liquid volume 336 to provide visual definition for this phase interface 334 microstructure. Optional sealing layer 340 may be added with or without optional adhesive 338 to entrap the air, gas, or liquid volume 336. The visual effect of a phase interface icon element is similar to that of a high refractive index coated icon element 329 and 331.

FIGS. 17 a-d are cross-sections showing the use of the present system as a laminating film in conjunction with printed information, such as may be utilized in the manufacture of I.D. cards and driver's licenses, wherein the material 348 (consisting of the coordinated micro-array of lenses and images described above) covers a substantial proportion of the surface. FIG. 17a depicts an embodiment of Unison used as a laminate over print 347. Material 348 having at least some optical transparency in the icon layer is laminated to fibrous substrate 354, such as paper or paper substitute, with lamination adhesive 350, covering or partly covering print element 352 that had previously been applied to the fibrous substrate 354. Because the material 348 is at least partially transparent, the print element 352 can be seen through it and the effect of this combination is to provide the dynamic image effect of the present system in combination with the static print.

FIG. 17b shows an embodiment of the system material used as a laminate over a print element 352 applied to a nonfibrous substrate 358, such as a polymer film. As in FIG. 17a, material 348 having at least some optical transparency in the icon layer is laminated to nonfibrous substrate 358, such as polymer, metal, glass, or ceramic substitute, with lamination adhesive 350, covering or partly covering print element 352 that had previously been applied to the nonfibrous substrate 354. Because the material 348 is at least partially transparent, the print element 352 can be seen through it and the effect of this combination is to provide the dynamic image effect in combination with the static print.

FIG. 17c depicts the use of a print element directly on the lens side of material 360. In this embodiment material 348 has print element 352 directly applied to the upper lens surface. This embodiment does not require that the material be at least partly transparent: the print element 352 lies on top of the material and the dynamic image effects can be seen around the print element. In this embodiment the material 348 is used as the substrate for the final product, such as currency, ID cards, and other articles requiring authentication or providing authentication to another article.

FIG. 17d depicts the use of a print element directly on the icon side of an at-least partially transparent material 362. Print element 352 is applied directly to the icon layer or sealing layer of an at-least partially transparent system material 348. Because the system material 348 is at least partially transparent, the print element 352 can be seen through it and the effect of this combination is to provide the dynamic image effect in combination with the static print. In this embodiment the system material 348 is used as the substrate for the final product, such as currency, ID cards, and other articles requiring authentication or providing authentication to another article.

Each of the embodiments of FIGS. 17 a-d can be used singly or in combination. Thus, for example, a system material 348 can be both overprinted (FIG. 17c) and backside printed (FIG. 17d), then optionally laminated over print on a substrate (FIGS. 17 a, b). Combinations such as these can further increase the counterfeiting, simulation, and tampering resistance of the material of the present system.

FIGS. 18 a-f are cross-sections illustrating the application of the present system to, or incorporation into, various substrates and in combination with printed information. The embodiments of FIGS. 18 a-f differ from those of FIGS. 17 a-d in that the former figures disclose system material 348 that covers most or all of an article, whereas the present figures disclose embodiments wherein the system material or its optical effect do not substantially cover a whole surface, but rather cover only a portion of a surface. FIG. 18a depicts a piece of at-least partially transparent system material 364 adhered to a fibrous or non-fibrous substrate 368 with adhesive element 366. Optional print element 370 has been directly applied to the upper, lens, surface of material 364. Print element 370 may be part of a larger pattern that extends beyond the piece of material 364. The piece of material 364 is optionally laminated over print element 372 that was applied to the fibrous or non-fibrous substrate prior to the application of the material 364.

FIG. 18b illustrates an embodiment of single-sided system material 364 incorporated into an non-optical substrate 378 as a window, wherein at least some of the edges of the system material 364 are captured, covered, or enclosed by the non-optical substrate 378. Print elements 380 may be optionally applied on top of the system material lens surface and these print elements may be aligned with, or correspond to, print elements 382 applied to the non-optical substrate 378 in the area adjacent to print element 380. Similarly, print elements 384 can be applied to the opposite side of the non-optical substrate aligned with, or corresponding to, print elements 386 applied to the icon or sealing layer 388 of the system material 364. The effect of a window of this kind will be to present distinct images when the material is viewed from the lens side and no images when viewed from the icon side, providing a one-way image effect.

FIG. 18c shows a similar embodiment to that of FIG. 18b, except that the system material 306 is double-sided material 306 (or other double-sided embodiment described above). Print elements 390, 392, 394, and 396 substantially correspond in function to print elements 380, 382, 384, 386, previously described. The effect of a material window of this kind will be to present different distinct images when the material is viewed from opposite sides. For example, a window incorporated into a currency paper could display the numerical denomination of the bill, such as "10" when viewed from the face side of the bill, but when viewed from the back side of the bill the Unison window could display different information, such as "USA", that may be in the same color as the first image or a different color.

FIG. 18d illustrates a transparent substrate 373 acting as the optical spacer for a material formed by a zone of lenses 374 of limited extent and an icon layer 376 extending substantially beyond the periphery of the zone of lenses 374. In this embodiment the present effects will only be visible in that zone that includes both lenses and icons (corresponding to lens zone 374 in this figure). Both the lenses 374 and the adjacent substrate may optionally be printed 375, and print elements may also be applied to the icon layer 376 or to an optional sealing layer covering the icons (not indicated in this figure—see FIG. 1). Multiple lens zones can be used on an article after the manner of this embodiment; wherever a lens zone is placed the Unison effects will be seen; the size, rotation, stereoscopic depth position, and OPM properties of the images can be different for each lens zone. This embodiment is well suited for application to ID cards, credit cards, drivers' licenses, and similar applications.

FIG. 18e shows an embodiment that is similar to that of FIG. 18d, except that the icon plane 402 does not extend substantially beyond the extent of the lens zone 400. Optical spacer 398 separates the lenses 400 from the icons 402. Print elements 404 and 406 correspond to print elements 375 and 377 in FIG. 18d. Multiple zones 400 can be used on an article after the manner of this embodiment; each zone can have separate effects. This embodiment is well suited for application to ID cards, credit cards, drivers' licenses, and similar applications.

FIG. 18f depicts an embodiment that is similar to FIG. 18d except that the present embodiment incorporates optical spacer 408 that separates lenses 413 from icon plane 410. Lenses 413 extend substantially beyond the periphery of the icon zone 412. Print elements 414 and 416 correspond to print elements 375 and 377 in FIG. 18d. Multiple lens zones can be used on an article after the manner of this embodiment; wherever a lens zone is placed the present effects will be seen; the size, rotation, stereoscopic depth position, and OPM properties of the images can be different for each lens zone. This embodiment is well suited for application to ID cards, credit cards, drivers' licenses, and similar applications.

FIGS. 19 a, b illustrate cross-sectional views comparing the in-focus field of view of a spherical lens with that of a flat field aspheric lens when each are incorporated into a structure of the type described above. FIG. 19a illustrates a substantially spherical lens as applied in a system as described above. Substantially spherical lens 418 is separated from icon plane 422 by optical spacer 420. Image 424 projected out perpendicular to the surface of the material originates at focal point 426 within the icon layer 422. The image 424 is in sharp focus because the focal point 426 is within the icon layer 422. When the lens is viewed from an oblique angle, then image 428 is blurry and out of focus because the corresponding focal point 430 is no longer in the icon plane, but is above it a substantial distance. Arrow 432 shows the field curvature of this lens, equivalent to the sweep of the focal point from 426 to 430. The focal point is within the icon plane throughout the zone 434, then moves outside of the icon plane in zone 436. Lenses which are well suited to application in coordination with a plane of printed images or icons typically have a low F#, typically less than 1, resulting in a very shallow depth of focus—higher F# lenses can be used effectively with Deep and Float effects, but cause proportionate vertical binocular disparity with effects described herein when used with Unison Motion effects. As soon as the lower limit of the depth of focus moves outside of the icon plane the image clarity degrades rapidly. From this figure it can be seen that the field curvature of a substantially spherical lens limits the field of view of the image: the image is distinct only within the in-focus zone 434, rapidly going out of focus for more oblique viewing angles. Substantially spherical lenses are not flat-field lenses, and the field curvature of these lenses is amplified for low F# lenses.

FIG. 19b illustrates an aspheric lens as applied to the present system. As an aspheric lens, its curvature is not approximated by a sphere. Aspheric lens 438 is separated from icon layer 442 by optical spacer 440. Aspheric lens 438 projects image 444 of icon plane 442 normal to the plane of the material. The image originates at focal point 446. The focal length of aspheric lens 438 lies within the icon plane 442 for a wide range of viewing angles, from normal 444 to oblique 448, because it has a flat-field 452. The focal length of the lens varies according to the angle of view through it. The focal length is shortest for normal viewing 444 and increases as the viewing angle becomes more oblique. At the oblique viewing angle 448 the focal point 450 is still within the thickness of the icon plane, and the oblique image is therefore still in focus for this oblique viewing angle 448. The in-focus zone 454 is much larger for the aspheric lens 438 than the in-focus zone 434 of the substantially spherical lens 418. The aspheric lens 438 thus provides an enlarged field of view over the width of the associated image icon so that the peripheral edges of the associated image icon do not drop out of view compared to that of the spherical lens 418. Aspheric lenses are preferred for the present system because of the larger field of view they provide and the resulting increase in visibility of the associated images.

FIGS. 20 a-c are cross-sections illustrating two benefits of utility which result from the use of a thick icon layer. These benefits apply whether the lens 456 used to view them is substantially spherical 418 or aspheric 438, but the benefits are greatest in combination with aspheric lenses 438. FIG. 20a illustrates a thin icon layer 460 system material including lenses 456 separated from icon layer 460 by optical spacer 458. Icon elements 462 are thin 461 in comparison to the field curvature of the lens 463, limiting the in-focus zone to a small angle, the angle between the image projected in the normal direction 464 and the highest oblique angle image 468 that has a focal point 470 within the icon layer 460. The greatest field of view is obtained by designing the normal image focus 466 to lie at the bottom of the icon plane, thereby maximizing the oblique field of view angle, limited by the point at which the focal point 470 lies at the top of the icon plane. The field of view of the system in FIG. 20a is limited to 30 degrees.

FIG. 20b illustrates the benefits obtained from the incorporation of an icon plane 471 that is thick 472 in comparison to the field curvature of lens 456. Lenses 456 are separated from thick icon elements 474 by optical spacer 458. Thick icon elements 474 remain in focus 475 over a larger field of view, 55 degrees, than the thin icon elements 462 of FIG. 20a. The normal image 476 projected through lenses 456 from focal point 478 is in clear focus, and the focus remains clear while the angle of view increases all the way up to 55 degrees, where oblique image 480 focal point 482 lies at the top of the thick icon plane 471. The increased field if view is greatest for a flat-field lens, such as the aspheric lens 438 of FIG. 19b.

FIG. 20c illustrates yet another advantage of a thick icon plane 492; reducing the sensitivity of the present system material to variations in thickness S that may result from manufacturing variations. Lens 484 is spaced a distance S from the bottom surface of icon layer of thickness i. Lens 484 projects image 496 from focal point 498 disposed at the bottom of icon layer 492. This figure is drawn to demonstrate that variations in the optical space S between the lenses and the icon layer can vary over a range equal to the thickness of the icon layer i without loss of image 496, 500, 504 focus. At lens 486 the optical spacer thickness is about (S+i/2) and the focal point 502 of image 500 is still within the thickness i of icon layer 492. At lens 488 the thickness of the optical spacer has increased to (S+i) 490 and the focal point 506 of image 504 lies at the top of thick icon element 494. The optical spacer thickness can therefore vary over a range corresponding to the thickness of the icon layer i: a thin icon layer therefore provides a small tolerance for optical spacer thickness variations and a thick icon layer provides a larger tolerance for optical spacer thickness variations.

An additional benefit is provided by a thick icon layer 492. Imperfect lenses, such as substantially spherical lenses, may have a shorter focal length 493 towards their edges than at their center 496. This is one aspect of the common spherical aberration defect of substantially spherical lenses. A thick icon layer provides an icon element that can be clearly focused over a range of focal lengths, 498 to 495, thereby improving the overall clarity and contrast of an image produced by a lens 484 having focal length variations.

Figure 21A:
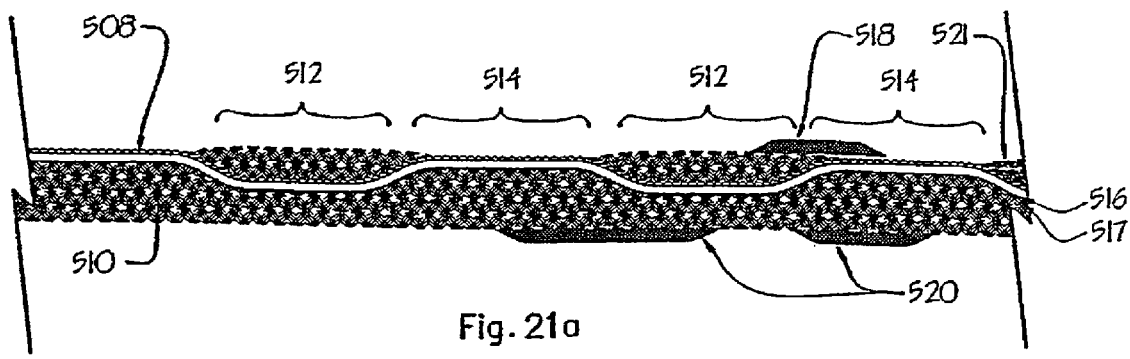
FIG. 21 is a plan view that shows the application of the present system to currency as a "windowed" security thread.
Figure 21B:
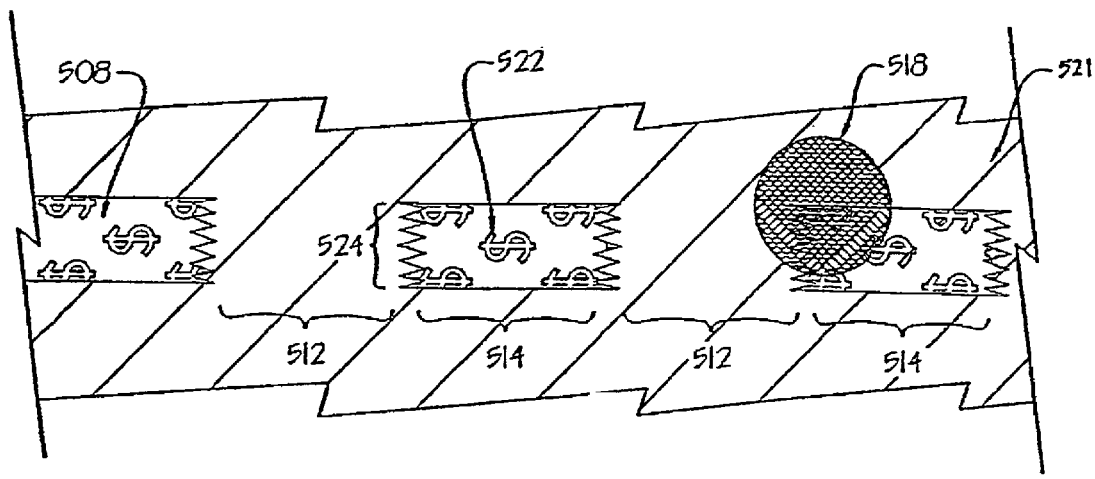

FIG. 21 is a plan view that shows the application of the present system to currency and other security documents as a 'windowed' security thread. FIG. 21 shows a windowed thread structure including system material 508 that has been slit into a ribbon, referred to as a "thread", that is typically in the range of 0.5 mm to 10 mm in width. Thread 508 is incorporated into the fibrous document substrate 510 and provides windowed zones 514. The thread 508 may optionally incorporate a pigmented, dyed, filled, or coated sealing layer 516 to increase image contrast and/or to provide additional security and authentication features, such as electrical conductivity, magnetic properties, nuclear magnetic resonance detection and authentication, or to hide the material from view in reflected illumination when viewed from the back side of the substrate (the side opposite the side presenting the Unison synthetic images and an adhesive layer 517 to strengthen the bond between the thread 508 and the fibrous substrate 510. The thread 508 is maintained in an orientation to keep the lenses uppermost so that the image effects are visible in the windowed zones 514. Both the fibrous substrate 510 and the thread may be overprinted by print elements 518 and the fibrous substrate may be printed 520 on its opposite face.

FIG. 21 illustrates that thread 508 and its image effects 522 are only visible from the upper surface 521 of the substrate 510 in the windowed zones 514. Thread 508 is covered by fibrous substrate material at the inside zones 512 and the image effects 522 are not substantially visible in these zones.

Figure 22:
FIG. 22 illustrates the orthoparallactic motion embodiment of the present system of images in connection with a "windowed" security thread.

OPM effects are particularly dramatic when incorporated into thread 508. (See FIG. 22) As the fibrous substrate 510 is tilted in various directions the OPM image can be made to scan across the width 524 of the thread, producing a startling and dramatic visual effect. This scanning feature of an OPM image makes it possible to present image 522 which is larger than the width of the thread 508. The user examining the document containing a windowed thread 508 can then tilt the document to scan the whole image across the thread, scrolling it like a marquee sign. The effects of the Deep, Float, and Levitate embodiments can also be used to advantage in a windowed thread format.

The thread 508 may be at least partially incorporated in security papers during manufacture by techniques commonly employed in the paper-making industry. For example, thread 508 may be pressed within wet papers while the fibers are unconsolidated and pliable, as taught by U.S. Pat. No. 4,534, 398 which is incorporated herein by reference.

The windowed thread of the present system is particularly well suited for application to currency. A typical total thickness for the thread material is in the range of 22μ to 34μ, while the total thickness of currency paper may range as high as 88μ. It is possible to incorporate a windowed security thread of the present system into currency paper without substantially altering the total thickness of the paper by locally reducing the thickness of the paper by an amount equivalent to the thickness of the thread.

In an exemplary embodiment, thread 508 comprises:
(a) one or more optical spacers;
(b) one or more optionally periodic planar arrays of micro-images or icons positioned within, on, or next to an optical spacer; and
(c) one or more optionally periodic planar arrays of non-cylindrical micro lenses positioned on or next to either an optical spacer or a planar icon array, with each micro-lens having a base diameter of less than 50 microns.

In another embodiment, the micro-images or icons constitute filled voids or recesses that are formed on a surface of the one or more optical spacers, while the non-cylindrical micro-lenses are aspheric micro-lenses, with each aspheric micro-lens having a base diameter ranging from about 15 to about 35 microns. At least one pigmented sealing or obscuring layer 516 may be positioned on the planar array(s) of micro-images or icons for increasing contrast and thus visual acuity of the icons and also for masking the presence of thread 508 when the thread is at least partially embedded in a security document.

In yet another embodiment of the present invention, thread 508 comprises:
(a) an optical spacer having opposing upper and lower planar surfaces;
(b) a periodic array of micro-images or icons comprising filled recesses formed on the lower planar surface of the optical spacer;
(c) a periodic array of non-cylindrical, flat field, aspheric or polygonal base multi-zonal micro-lenses positioned on the upper planar surface of the optical spacer, wherein each micro-lens have a base diameter ranging from about 20 to about 30 microns; and
(d) a pigmented sealing or obscuring layer 516 positioned on the icon array.

The optical spacer(s) may be formed using one or more essentially colorless polymers including, but not limited to, polyester, polypropylene, polyethylene, polyethylene terephthalate, polyvinylidene chloride, and the like. In an exemplary embodiment, the optical spacer(s) is formed using polyester or polyethylene terephthalate and has a thickness ranging from about 8 to about 25 microns.

The icon and micro-lens arrays can be formed using substantially transparent or clear radiation curable material including, but not limited to acrylics, polyesters, epoxies, urethanes and the like. Preferably, the arrays are formed using acrylated urethane which is available from Lord Chemicals under the product designation U107.

The icon recesses formed on the lower planar surface of the optical spacer each measures from about 0.5 to about 8 microns in depth and typically 30 microns in micro-image or icon width. The recesses can be filled with any suitable material such as pigmented resins, inks, dyes, metals, or magnetic materials. In an exemplary embodiment, the recesses are filled with a pigmented resin comprising a sub-micron pigment which is available from Sun Chemical Corporation under the product designation Spectra Pac.

The pigmented sealing or obscuring layer 516 can be formed using one or more of a variety of opacifying coatings or inks including, but not limited to, pigmented coatings comprising a pigment, such as titanium dioxide, dispersed within a binder or carrier of curable polymeric material. Preferably, the sealing or obscuring layer 516 is formed using radiation curable polymers and has a thickness ranging from about 0.5 to about 3 microns.

Thread 508, which is described above, may be prepared in accordance with the following method:
(a) applying a substantially transparent or clear radiation curable resin to the upper and lower surfaces of the optical spacer;
(b) forming a micro-lens array on the upper surface and an icon array in the form of recesses on the lower surface of the optical spacer;
(c) curing the substantially transparent or clear resin using a source of radiation;
(d) filling the icon array recesses with a pigmented resin or ink;
(e) removing excess resin or ink from the lower surface of the optical spacer; and
(f) applying a pigmented sealing or obscuring coating or layer to the lower surface of the optical spacer.

In many cases, it is desirable that security threads used in currency and in other high value financial and identification documents be detected and authenticated by high-speed non-contact sensors, such as capacitance sensors, magnetic field sensors, optical transmission and opacity sensors, fluorescence, and/or nuclear magnetic resonance.

Incorporation of fluorescent materials into the lens, substrate, icon matrix, or icon fill elements of a Unison film can enable covert or forensic authentication of the Unison material by observation of the presence and spectral characteristics of the fluorescence. A fluorescing Unison film can be designed to have its fluorescent properties visible from both sides of the material or from only one side of the material. Without an optical isolation layer in the material beneath the icon layer, the fluorescence of any part of a Unison material will be visible from either of its sides. Incorporation of an optical isolation layer makes it possible to separate the visibility of the fluorescence from its two sides. Thus a Unison material incorporating an optical isolation layer beneath the icon plane may be designed to exhibit fluorescence in a number of different ways: fluorescent color A visible from the lens side, no fluorescence visible from the optical isolation layer side, fluorescent color A or B visible from the optical isolation layer side but not from the lens side, and fluorescent color A visible from the lens side and fluorescent color A or B visible from the optical isolation layer side. The uniqueness provided by the variety of fluorescent signatures possible can be used to further enhance the security of the Unison material. The optical isolation layer can be a layer of pigmented or dyed material, a layer of metal, or a combination of pigmented layers and metal layers, that absorbs or reflects the fluorescent emission from one side of the material and prevents it from being seen from the other side.

Icons formed from shaped voids and their inverse, icons formed from shaped posts, are particularly enabling for adding machine-readable authentication features to a Unison material security thread for currency and other high value documents. The icon matrix, the icon fill, and any number of back coats (sealing coats) can all, separately and/or in all combinations, incorporate non-fluorescing pigments, non-fluorescing dyes, fluorescing pigments, fluorescing dyes, metal particles, magnetic particles, nuclear magnetic resonance signature materials, lasing particles, organic LED materials, optically variable materials, evaporated metal, thin film interference materials, liquid crystal polymers, optical upconversion and downconversion materials, dichroic materials, optically active materials (possessing optical rotary power), optically polarizing materials, and other allied materials.

In some circumstances, such as when a dark or colored coating (such as a magnetic material or conductive layer) has been added to a Unison material or when the color of the icon plane is objectionable when seen through the back side of a substrate, it may be desirable to mask or hide the appearance of an embedded, partially embedded, or windowed Unison material security thread from one side of a paper substrate as seen in reflected light, while the thread is visible from the opposite side of the substrate. Other types of currency security threads commonly incorporate a metal layer, typically aluminum, to reflect light that filters through the surface substrate, thereby providing similar brightness to the surrounding substrate. Aluminum or other color neutral reflecting metal can be used in similar manner to mask the appearance of a Unison thread from the back side of a paper substrate by applying the metal layer on the back surface of the Unison material and then optionally sealing it in place. A pigmented layer can be utilized for the same purpose, that of hiding or obscuring the visibility of the security thread from the "back" side of the document, in place of a metallized layer, or in conjunction with it. The pigmented layer can be of any color, including white, but the most effective color is one that matches the color and intensity of the light internally scattered within, and outside of, the fibrous substrate.

The addition of a metallized layer to a Unison material can be accomplished in a number of ways, including direct metallization of the icon or sealing layer of the Unison material by evaporation, sputtering, chemical deposition, or other suitable means, or lamination of the icon or sealing layer of the Unison material to the metallized surface of a second polymer film. It is common practice to create currency security threads by metallizing a film, pattern demetallizing this film to leave narrow 'ribbons' of metallized area, laminating the metallized surface to a second polymer film, then slitting the laminated material such that the metal ribbons are isolated from the edges of the slit threads by the laminating adhesive, thereby protecting the metal from chemical attack at the edges of the thread. This method can also be applied in the case of the subject invention: the Unison material can simply replace the second laminating film. Thus a Unison material can be augmented by the addition of patterned or unpatterned metallized layers.

Synthetic images can be designed as binary patterns, having one color (or absence of color) defining the icons and a different color (or absence of color) defining the background; in this case each icon zone includes a complete single-tone image that utilizes image 'pixels' that are either full on or full off. More sophisticated synthetic images can be produced by providing tonal variations of the selected icon color. The synthetic image tonal variation can be created by controlling the density of the color in each icon image or by effectively 'half-toning' the synthetic image by including or excluding design elements in selected groups of icons.

The first method, controlling the density of the color in each icon image, may be accomplished by controlling the optical density of the material creating the microprinted icon image. One convenient method to do this utilizes the filled void icon embodiment, already described previously.

Figure 23:
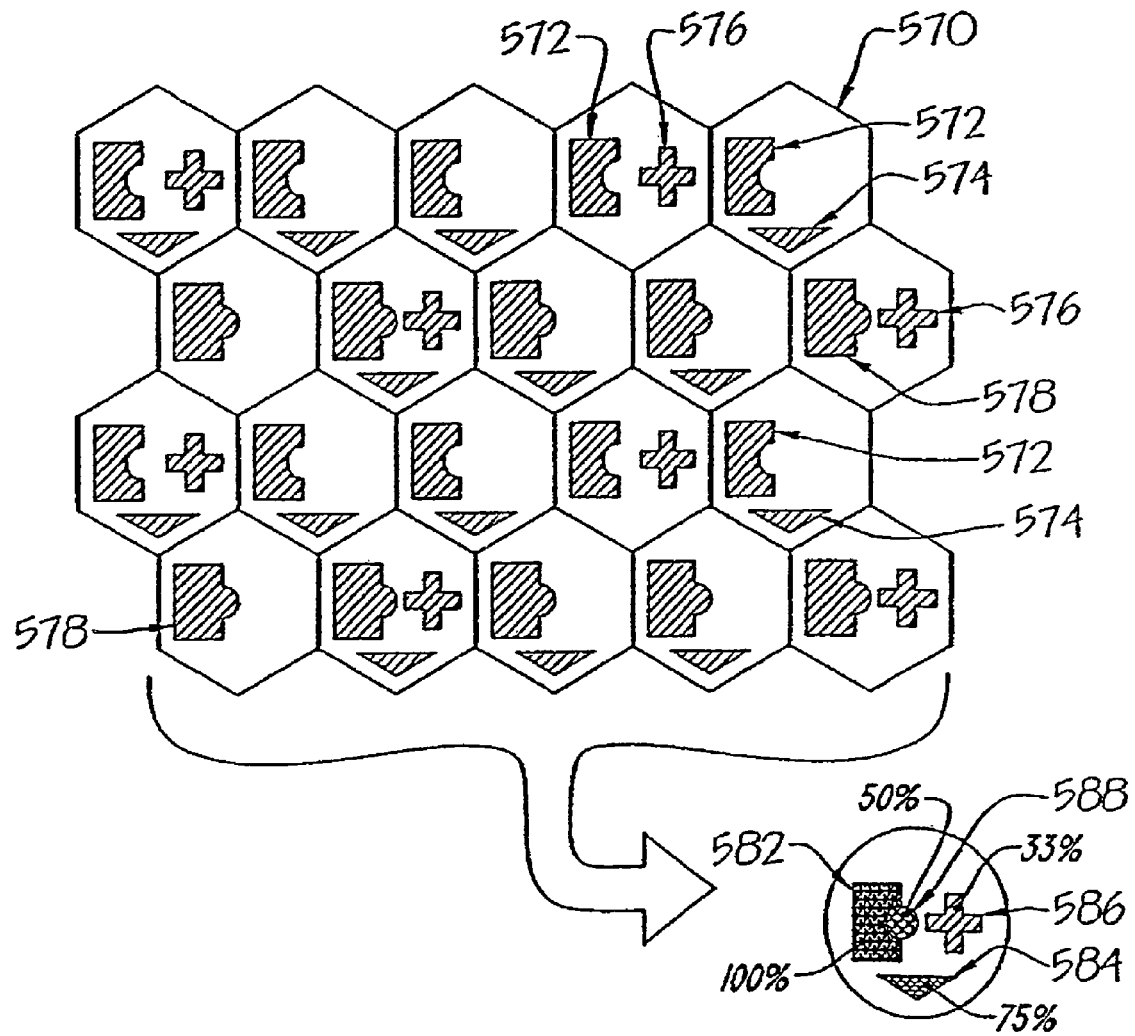
FIG. 23 illustrates half-toning a synthetic image of the present system.

The second method, 'half-toning' the synthetic image by including or excluding design elements in selected groups of icons, illustrated in FIG. 23, accomplished by including image design elements in a proportion of icon zones that is equal to the color density desired. FIG. 23 illustrates this with an example using a hexagonal repeat pattern for the icon zones 570 that would be coordinated with a similar hexagonal repeat pattern of lenses. Each of the icon zones 570 does not contain identical information. All of the icon image elements, 572, 574, 576, and 578 are present at substantially the same color density. Icon image elements 572 and 574 are present in some of the icon zones and different icon image elements are present in other icon zones. Some icon zones contain the single icon image element 570. Specifically, the icon image element 572 is present in half of the icon zones, icon image element 574 is present in three-fourths of the icon zones, icon image element 578 is present in half of the icon zones, and icon image element 576 is present in one-third of the icon zones. The information present in each icon zone determines whether its associated lens will show the color of the icon image pattern or the color of the icon image background from a particular viewing orientation. Either image elements 572 or 578 will be visible in all of the lenses associated with this icon pattern, but the synthetic image 580 space of icon image element 572 overlaps the synthetic image space of icon image element 578. This means that the overlap zone 582 of the synthetic images of icons 572 and 578 will appear at 100% color density, because every lens will project icon image color in this zone. The non-overlapping part of these two synthetic images, 588, is only visible in 50% of the lenses, so it appears at 50% color density. The synthetic image 586 of icon element 576 is visible in only one third of the lenses, so it appears at 33.3 . . . % density. The synthetic image 584 of icon image element 576 correspondingly appears at 75% color density. It is clear within the scope of this teaching that a tremendous range of tonal variations can be obtained in the synthetic image through selective omission of icon image elements in selected percentages of icon zones. For greatest effectiveness the distributions of the icon image elements across the icon image zones should be relatively uniform.

Figure 24A:
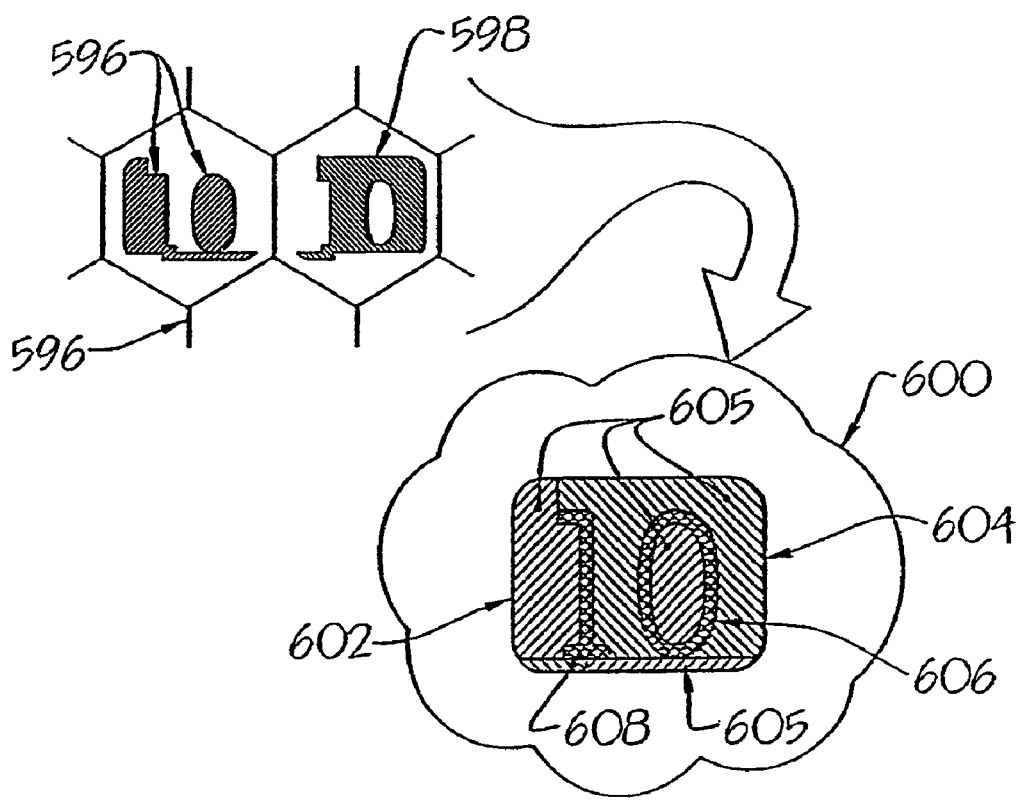
FIG. 24a illustrates use of the present system to create combined synthetic images that are smaller in dimension than the smallest feature of the individual synthetic images.

A related icon image design method, illustrated in FIG. 24a, can be used to create combined synthetic image elements that are smaller in dimension than the smallest feature of the individual synthetic image elements. This is possible in the common circumstance where the smallest feature size of an icon image is larger than the placement accuracy of the feature. Thus an icon image may have minimum features on the order of two microns in dimension, but those features may be placed accurately on any point on a grid of 0.25 micron spacing. In this case the smallest feature of the icon image is eight times larger than the placement accuracy of that feature. As with the previous diagram this method is illustrated using a hexagonal icon pattern 594, but it applies equally well to any other usable pattern symmetry. In similar fashion to the method of FIG. 23, this method relies on the use of different information in at least one icon zone. In the example of FIG. 24a two different icon patterns, 596 and 598, are each present in half of the icon zones (for clarity only one of each pattern is shown in this figure). These icon images produce a composite synthetic image 600 that incorporates synthetic image 602 created by icon image elements 596, and synthetic image 604, created by icon elements 598. The two synthetic images, 602 and 604, are designed to have overlapped areas, 606 and 608, that appear to have 100% color density while the non-overlapped areas 605 have 50% color density. The minimum dimension of the overlapped areas in the composite synthetic image may be as small as the synthetic magnification-scaled positioning accuracy of the icon image elements, and therefore may be smaller than the minimum feature size of the two constituent synthetic images that are designed to overlap in a small region. In the example of FIG. 23, the overlap regions are used to create the characters for the number "10" with narrower lines than would otherwise be possible.

Figure 24B:
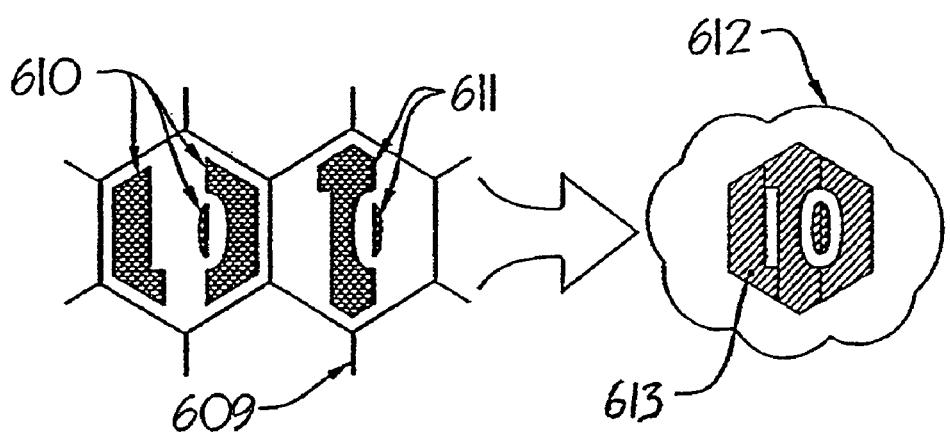
FIG. 24b illustrates use of the present system to create narrow patterns of gaps between icon image elements.

This method can also be used to create narrow patterns of gaps between icon image elements, as shown in FIG. 24b. Hexagonal icon zones 609 could be square or any other suitable shape to make a space-filling array, but hexagonal is preferred. In this example, half the icon patterns are the icon elements 610, and half of them are the icon elements 611. Ideally these two patterns would be relatively uniformly distributed among the icon zones. All of the elements of these patterns are depicted as being of substantially equal and uniform color density. In isolation these two patterns do not clearly suggest the form of the final image, and this can be used as a security element—the image is not obvious until it is formed by the overlying lens array. One instance of the synthetic image 612 formed by the combination of the synthetic image of icon elements 610 with the synthetic image of icon elements 611 is shown, whereby the gaps that remain between the separate synthetic images form the numeral "10". In this case, two synthetic images are combined to form the final synthetic image, so the colored parts of this image 613 show 50% color density. This method is not limited by the details of this example: three icons could have been used instead of two, the gaps defining the desired element in the composite synthetic images can have variable widths and unlimited shape variety, and this method can be combined with either the methods of FIG. 23, 24a, b or 25, or an other icon image design method we have taught.

Figure 25:
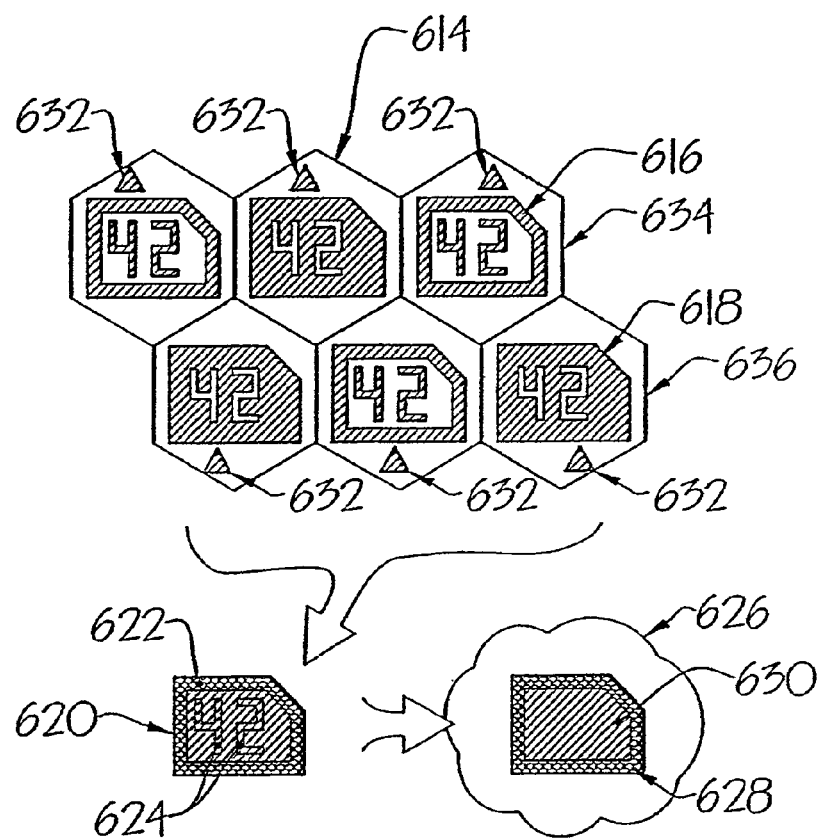
FIG. 25 illustrates incorporation of covert, hidden information into icon images of the present system.

Covert, hidden information can be incorporated into the icon images that cannot be seen in the resulting synthetic images. Having such covert information hidden in the icon images can be used, for example, for covert authentication of an object. Two methods for accomplishing this are illustrated by FIG. 25. The first method is illustrated by the use of matched icon images 616 and 618. Icon image 616 shows a solid border pattern and the number "42" contained inside of the border. Icon image 618 shows a solid shape with the number "42" as a graphical hole in that shape. In this example, the perimeter shapes of icon images 616 and 618 are substantially identical and their relative position within their respective icon zones, 634 and 636, are also substantially identical. When a composite synthetic image 620 is created from these icon images, the border of the composite synthetic image 622 will show 100% color density because all icon images have a pattern in that corresponding area, so there is full overlap in the synthetic images created from icon images 616 and 618. The color density of the interior 624 of the composite synthetic image 620 will be 50%, since the image of the space surrounding the "42" comes from icon images 618 that only fill half the icon zones, and the image of the colored "42" comes from icon images 616 that also fill half the icon zones. Consequently, there is no tonal differentiation between the "42" and its background, so the observed composite synthetic image 626 will show an image having a 100% color density border 628 and a 50% color density interior 630. The "42" covertly present in all of the icon images 616 and 618 is thereby "neutralized" and will not be seen in the observed composite synthetic image 626.

A second method for incorporating covert information into icon images is illustrated by triangles 632 in FIG. 25. Triangles 632 may be randomly placed within the icon zones (not shown in this figure) or they can be placed in an array or other pattern that does not substantially match the period of the icon zones 634, 632. Synthetic images are created from a multiplicity of regularly arrayed icon images that are imaged by a corresponding regular array of micro-lenses. Patterns in the icon plane that do not substantially correspond to the period of the micro-lens array will not form complete synthetic images. The pattern of triangles 632 therefore will not create a coherent synthetic image and will not be visible in the observed synthetic image 626. This method is not limited to simple geometric designs, such as triangles 632: other covert information, such as alpha-numeric information, bar codes, data bits, and large-scale patterns can be incorporated into the icon plane with this method.

Figure 26:
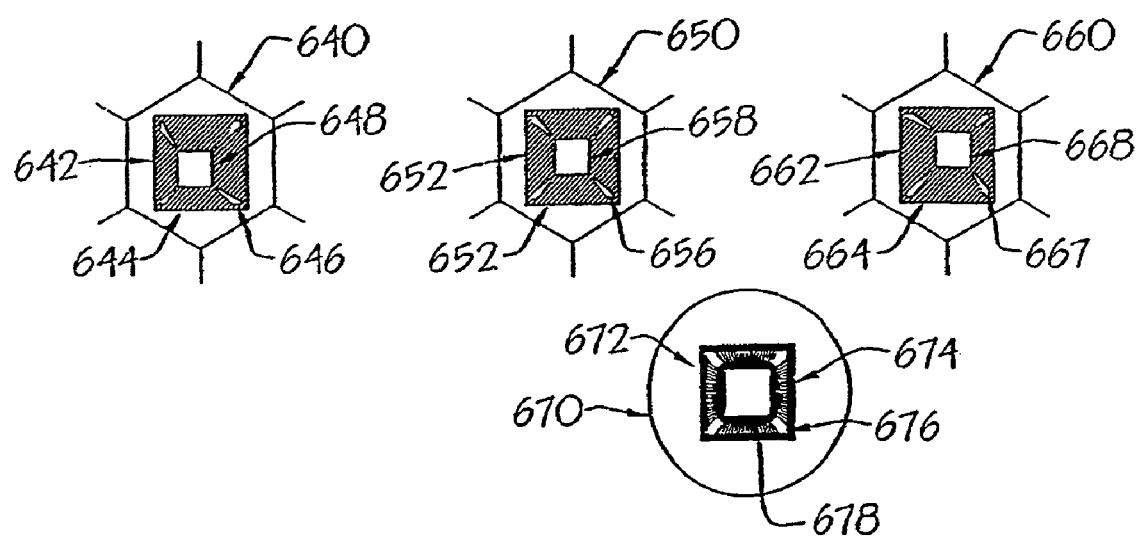
FIG. 26 illustrates creating fully three-dimensional images with the present system.

FIG. 26 illustrates a general approach to creating fully three dimensional integral images in a Unison material (Unison 3-D). A single icon zone 640 contains icon image 642 that represents a scale-distorted view of an object to be displayed in 3-D as seen from the vantage point of that icon zone 640. In this case the icon image 642 is designed to form a synthetic image 670 of a hollow cube 674. Icon image 642 has a foreground frame 644 that represents the nearest side 674 of hollow cube 672, tapered gap patterns 646 that represent the corners 676 of the hollow cube 672, and a background frame 648 that represents the farthest side 678 of the hollow cube 672. It can be seen that the relative proportions of the foreground frame 644 and the background frame 648 in the icon image 642 do not correspond to the proportions of the nearest side 674 and the farthest side 678 of the synthetic image hollow cube 672. The reason for the difference in scale is that images that are to appear further from the plane of the Unison material experience greater magnification, so their size in the icon image must be reduced in order to provide the correct scale upon magnification to form the synthetic image 672.

At a different location on the Unison 3-D material we find icon zone 650 that includes a different icon image 652. As with icon image 642, icon image 652 represents a scale-distorted view of the synthetic image 672 as seen from the different vantage point of this icon zone 650. The relative scaling of foreground frame 654 and background frame 658 are similar to the corresponding elements of icon image 642 (although this will not be true, in general), but the position of the background frame 658 has shifted, along with the size and orientation of the corner patterns 656. Icon zone 660 is located a further distance away on the Unison 3-D material and it presents yet another scale-distorted icon image 662, including icon image 662 with foreground frame 664, tapered gap patterns 667, and background frame 668.

In general, the icon image in each icon zone in a Unison 3-D material will be slightly different from its nearby neighbors and may be significantly different from its distant neighbors. It can be seen that icon image 652 represents a transitional stage between icon images 642 and 662. In general, each icon image in a Unison 3-D material may be unique, but each will represent a transitional stage between the icon images to either side of it.

Synthetic image 670 is formed from a multiplicity of icon images like icon images 640, 650, and 660 as synthetically imaged through an associated lens array. The synthetic image of the hollow cube 674 shows the effects of the different synthetic magnification factors that result from the effective repeat periods of the different elements of each of the icon images. Let us assume that the hollow cube image 674 is intended to be viewed as a SuperDeep image. In this case if icon zone 640 was disposed some distance to the lower left of icon zone 650, and icon zone 660 was disposed some distance to the upper right of icon zone 650, it can be seen that the effective period of the foreground frames 644, 654, and 664 will be less than that of the background frames 648, 658, and 668, thereby causing the closest face 676 of the cube (corresponding to the foreground frames 644, 654, and 664) to lie closer to the plane of the Unison material and the farthest face 678 of the cube to lie deeper and further from the plane of the Unison material, and to be magnified by a greater factor. The corner elements 646, 656, and 667 coordinate with both the foreground and background elements to create the effect of smoothly changing depth between them.

The method of designing icon images for Unison 3-D is more fully described in FIG. 27. This figure isolates the method for a single image projector 680. As previously described, a single image projector includes a lens, an optical spacer, and an icon image; the icon image having substantially the same dimensions as the repeat period of the lens (allowing for the small differences in scale that create the Unison visual effects). The field of view for the lens and its associated icon is shown as the cone 682: this also corresponds to an inversion of the focal cone of the lens, so the proportions of the field of view cone 682 are determined by the F# of the lens. Although the figure shows this cone as having a circular base, the base shape will actually be the same as the shape of an icon zone, such as a hexagon.

In this example we wish to create a Unison 3-D synthetic image that incorporates three copies of the word "UNISON", 686, 690 and 694, at the same visual size at three different SuperDeep image planes 684, 690, and 692. The diameter of the image planes 684, 688, and 692 expands with the field of view cone: in other words, as the depth of image increases, area covered by the field of view cone increases. Thus the field of view at the shallowest depth plane 684 only encompasses portions of "NIS" of the word UNISON, while the middle depth plane 688 encompasses all of "NIS" and portions of "U" and "O" and the deepest depth plane 692 encompasses almost all of "UNISON", lacking only part of the final "N".

The information they presented (UNISONs 686, 690, and 694) by each of these synthetic image planes 684, 688, and 692, must ultimately be incorporated into a single icon image in image projector 680. This is accomplished by capturing the information in the field of view cone 686 at each depth plane 684, 688, and 692, then scaling the resulting icon image patterns to the same dimensions. Icon image 696 represents the field of view of UNISON image 686 as seen at depth plane 684, icon image 704 represents the field of view of UNISON image 690 as seen at depth plane 688, and icon image 716 represents the field of view of UNISON image 694 as seen at depth plane 692.

Within icon image 696 icon image elements 698 originate from a portion of the first "N" of UNISON image 686, icon image element 700 originates from a portion of the "I" of UNISON image 686, and icon image elements 702 originate from portions of the "S" of UNISON image 686. Within icon image 704 icon image element 706 originates from a portion of the "U" of UNISON image 690, icon image element 708 originates from the first "N" of UNISON image 690, icon image element 710 originates from the "S" of UNISON image 690, and icon image element 714 originates from a portion of the "O" of UNISON image 690. Note that although the synthetic images 686, 690, and 694 are presented at similar scale, icon image 704 for the middle depth plane 688 presents its UNISON letters at a smaller scale than those of icon image 696. This accounts for the higher synthetic magnification that icon image 704 will experience (when synthetically combined with a multiplicity of surrounding icon images for the same depth plane). In similar manner, icon image 716 incorporates icon image elements 718 that originate from the UNISON image 694 and the UNISON letters incorporated in its icon image are at a further reduced scale.

Figure 28:
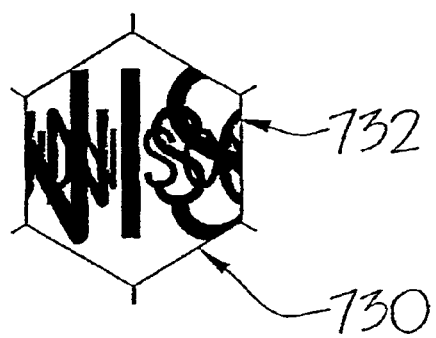
FIG. 28 illustrates the icon image resulting from the method of FIG. 27.

The final icon image for this image projector is created by combining these three icon images 696, 704, and 716 into a single icon image 730, shown in FIG. 28. The combined icon elements 732 incorporate all of the graphical and depth information necessary for the image projector 680 to make its contribution to the synthetic image formed from a multiplicity of image projectors, each incorporating the specific icon image information that results from the intersection of its own field of view cone, centered on the image projector, with the levels and elements of the synthetic image to be produced. Since each image projector is displaced by at least one lens repeat period from every other image projector, each image projector will carry different information resulting from the intersection of its field of view cone with the synthetic image space.

Each of the icon images required to present a chosen 3-D image can be computed from knowledge of the three-dimensional digital model of the synthetic image, desired depth position and depth span to be presented in the synthetic image, the lens repeat period, the lens field of view, and the ultimate graphical resolution of the icon images. This latter factor puts an upper limit on the level of detail that can be presented at each depth plane. Since depth planes that lie further from the plane of the Unison material carry a larger amount of information (because of the increased field of view) the graphical resolution limit of the icons has the greatest impact on the resolution of these synthetic image depth planes.

Figure 29:
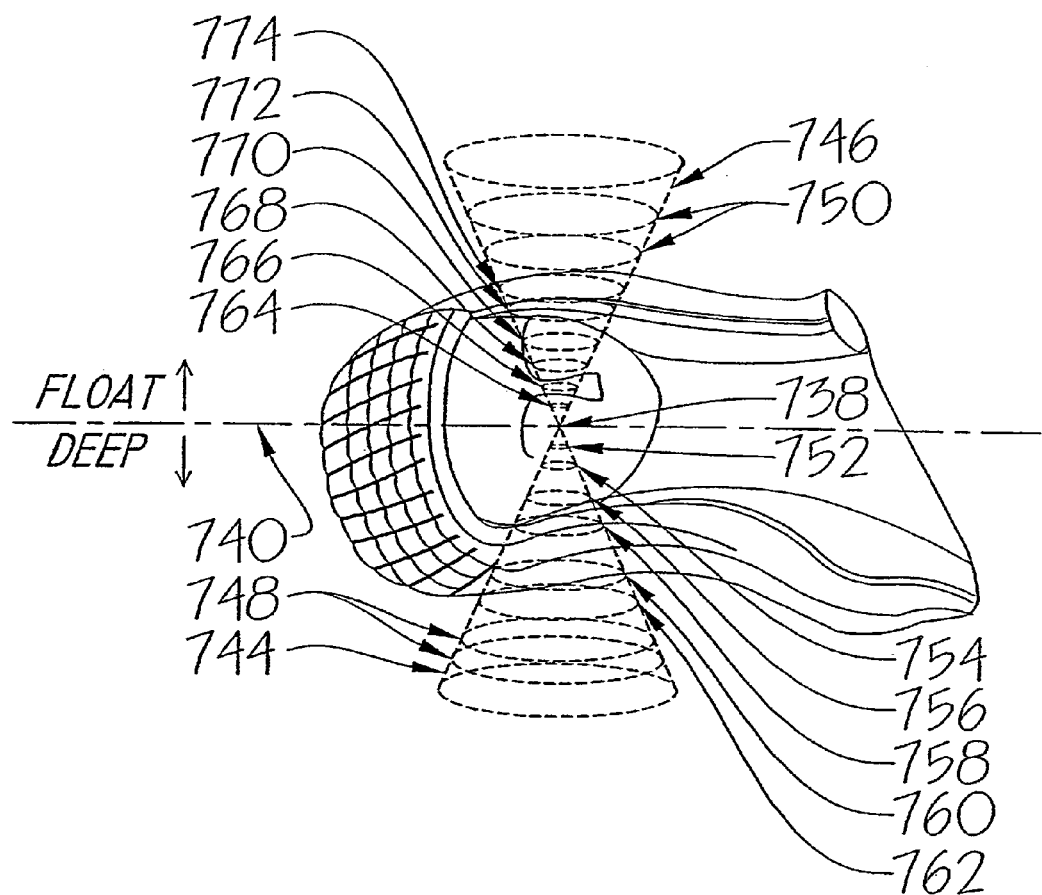
FIG. 29 illustrates how the method of FIG. 27 can be applied to a complex three-dimensional synthetic image.

FIG. 29 illustrates how the method of FIG. 27 can be applied to a complex three-dimensional synthetic image, such as an image of the priceless ice-age carved mammoth ivory artifact, the Lady of Brassempouy 742. Individual image projector 738, incorporating at least a lens, an optical spacing element, and an icon image (not shown in this figure), lies in the plane 740 of a Unison material that separate the float synthetic image space from the deep synthetic image space. In this example the synthetic image space spans the Unison material such that a portion of the image lies in the float synthetic image space and a portion lies in the deep synthetic image space. The image projector 738 has a substantially conical field of view that extends both into the deep synthetic image space 744 and into the float synthetic image space 746. A chosen number of deep image planes are selected, 748 and 752-762, at whatever spacing is required to obtain the deep synthetic image space resolution desired. Similarly, a chosen number of float image planes are selected, 750 and 764-774, at whatever spacing is required to obtain the float synthetic image space resolution desired. Some of these planes, such as deep planes 748 and float planes 750 will extend beyond the synthetic image and will not contribute to the final information in the icon image. For clarity, the number of image planes shown in FIG. 29 is limited to a small number but the actual number of image planes selected may be high, such as 50 or 100 planes, or more, to obtain the desired synthetic image depth resolution.

The method of FIGS. 27 and 28 is then applied to obtain the icon image at each depth plane by determining the shape of the intersection of the surface of the object 742 with the selected depth plane 756-774. The resulting separate icon images are scaled to the final size of the combined icon image. All of the float icon images are first rotated 180 degrees (because they undergo that rotation again when they are projected, thereby returning them to their correct orientation in the synthetic image) then they are combined with the deep icon images to form the final icon image for this image projector 738. This process is repeated for each of the positions of the image projectors to obtain the complete pattern of icon images required to form the full synthetic image 742.

The resolution of the synthetic image depends on the resolution of the optical projectors and the graphical resolution of the icon images. We have obtained icon image graphical resolutions, less than 0.1 micron, that exceed the theoretical optical resolution limit of magnifying optics (0.2 micron). A typical icon image is created with a resolution of 0.25 micron.

Unison materials can be manufactured by sheet or web processing utilizing tools that separately incorporate the lens and icon microstructures. Both the lens tools and the icon tools are originated using photomasks and photoresist methods.

Lens tools are initially designed as semiconductor-type masks, typically black chrome on glass. Masks having sufficient resolution can be created by photoreduction, electron beam writing, or laser writing. A typical mask for a lens tool will incorporate a repeating pattern of opaque hexagons at a chosen period such as 30 microns, with clear lines separating the hexagons that are less than 2 microns wide. This mask is then used to expose photoresist on a glass plate using a conventional semiconductor UV exposure system. The thickness of the resist is selected to obtain the desired sag of the lens. For example, a thickness of 5 microns of AZ 4620 positive photoresist is coated onto a glass plate by suitable means, such as by spin coating, dip coating, meniscus coating, or spraying, to form lenses having a nominal 30 micron repeat and a nominal 35 micron focal length. The photoresist is exposed with the mask pattern, and developed down to the glass in a conventional manner, then dried and degassed at 100° C. for 30 minutes. The lenses are formed by thermal reflow according to standard methods that are known in the art. The resulting photoresist micro-lenses are coated with a conductive metal, such as gold or silver, and a negative nickel tool is created by electroforming.

Icon tools are created in a similar manner. An icon pattern is typically designed with the aid of CAD software and this design is transmitted to a semiconductor mask manufacturer. This mask is used in similar manner to the lens mask, except the thickness of the resist to be exposed is typically in the range of 0.5 micron to 8 microns, depending on the optical density of the desired synthetic image. The photoresist is exposed with the mask pattern, developed down to glass in a conventional manner, coated with a conductive metal, and a negative nickel tool is created by electroforming. According the choice of original mask design and in the choice of resist type used (positive or negative), the icons can be created in the form of voids in the resist pattern or they can be created in the form of "mesas" or posts in the resist pattern, or both.

Unison materials can be manufactured from a variety of materials and a multiplicity of methods that are known in the art of micro-optic and microstructure replication, including extrusion embossing, radiation cured casting, soft embossing, and injection molding, reaction injection molding, and reaction casting. An exemplary method of manufacture is to form the icons as voids in a radiation cured liquid polymer that is cast against a base film, such as 75 gage adhesion-promoted PET film, then to form the lenses from radiation cured polymer on the opposite face of the base film in correct alignment or skew with respect to the icons, then to fill the icon voids with a submicron particle pigmented coloring material by gravure-like doctor blading against the film surface, solidify the fill by suitable means (ex: solvent removal, radiation curing, or chemical reaction), and finally apply an optional sealing layer that may be either clear, dyed, pigmented, or incorporate covert security materials.

The manufacture of Unison Motion material requires that the icon tool and the lens tool incorporate a chosen degree of misalignment of the axes of symmetry of the two arrays. This misalignment of the icon and lens patterns axes of symmetry controls the synthetic image size and synthetic image rotation in the produced material. It is often desirable to provide the synthetic images substantially aligned with either the web direction or the cross-web direction, and in these cases the total angular misalignment of the icons and the lenses is divided equally between the lens pattern and the icon pattern. The degree of angular misalignment required is usually quite small. For example, a total angular misalignment on the order of 0.3 degree is suitable to magnify 30 micron icon images to a size of 5.7 mm in a Unison Motion material. In this example, the total angular misalignment is divided equally between the two tools, so each tool is skewed through an angle of 0.15 degree in the same direction for both tools. The skew is in the same direction because the tools form microstructures on opposite faces of a base film, so the skews of the tools add to each other, instead of canceling each other.

Skew can be incorporated into the tools at the time of the original design of the masks by rotating the whole pattern through the desired angle before writing it. Skew can also be mechanically incorporated into a flat nickel tool by cutting it at the appropriate angle with a numerically controlled mill. The skewed tool is then formed into a cylindrical tool using the skew-cut edge to align the tool to the rotational axis of an impression cylinder.

The synthetic magnification micro-optic system herein can be combined with additional features including but not limited to these embodiments as single elements or in various combinations, such as icon fill materials, back coatings, top coatings, both patterned and non-patterned, fill or inclusions in the lens, optical spacer or icon materials, as a laminate or coating. inks and or adhesives including aqueous, solvent or radiation curable, optically transparent, translucent or opaque, pigmented or dyed Indicia in the form of positive or negative material, coatings, or print including but not limited to inks, metals, fluorescent, or magnetic materials, X-ray, infrared, or ultra-violet absorbent or emitting materials, metals both magnetic and non-magnetic including aluminum, nickel, chrome, silver, and gold; magnetic coatings and particles for detection or information storage; fluorescent dye and pigments as coatings and particles; IR fluorescent coatings, fill, dyes or particles; UV fluorescent coatings, fill, dyes or particles; phosphorescent dye and pigments as coatings and particles, planchettes, DNA, RNA or other macro-molecule taggants, dichroic fibers, radioisotopes, print receptive coatings, sizing, or primers, chemically reactive materials, micro-encapsulated ingredients, field affected materials, conductive particles and coatings both metallic and non-metallic, micro-perforated holes, colored threads or fibers, patches of Unison embedded in the surface of a document, label, or materials surface, bonded to paper or polymer as a carrier to adhere to paper during manufacture, fluorescent Dichroic threads or particles, raman scattering coatings or particles, color shifting coatings or particles, Unison laminated to paper, paper board, card board, plastic, ceramic, fabric, or metal substrate, Unison as a thread, patch, label, over wrap, hot stamp foil, or tear tape, holographic, diffractive, diffractive kinegram, isograms, photographic or refractive optical elements, liquid crystal materials, Up Conversion and Down Conversion materials.

The synthetic magnification micro-optic system herein has many fields of use and applications. Examples include:

government and defense applications—whether federal, state or foreign (such as passports, ID cards, driver's licenses, visas, birth certificates, vital records, voter registration cards, voting ballots, social security cards, bonds, food stamps, postage stamps, and tax stamps);

currency—whether federal, state or foreign (such as security threads in paper currency, features in polymer currency, and features on paper currency);

documents (such as titles, deeds, licenses, diplomas, and certificates);

financial and negotiable instruments (such as certified bank checks, corporate checks, personal checks, bank vouchers, stock certificates, travelers' checks, money orders, credit cards, debit cards, ATM cards, affinity cards, prepaid phone cards, and gift cards);

confidential information (such as movie scripts, legal documents, intellectual property, medical records/hospital records, prescription forms/pads, and "secret recipes");

product and brand protection, including fabric & home care (such as laundry detergents, fabric conditioners, dish care, household cleaners, surface coatings, fabric refreshers, bleach, and care for special fabrics);

beauty care (such as hair care, hair color, skin care & cleansing, cosmetics, fragrances, antiperspirants & deodorants, feminine protection pads, tampons and pantiliners);

baby and family care (such as baby diapers, baby and toddler wipes, baby bibs, baby change & bed mats, paper towels, toilet tissue, and facial tissue);

health care (such as oral care, pet health and nutrition, prescription pharmaceuticals, over-the counter pharmaceuticals, drug delivery and personal health care, prescription vitamins and sports and nutritional supplements; prescription and non-prescription eyewear; medical devices and equipment sold to hospitals, medical professionals, and wholesale medical distributors (i.e., bandages, equipment, implantable devices, surgical supplies);

food and beverage packaging;

dry goods packaging;

electronic equipment, parts & components;

apparel and footwear, including sportswear clothing, footwear, licensed and non-licensed upscale, sports and luxury apparel items, fabric;

biotech pharmaceuticals;

aerospace components and parts;

automotive components and parts;

sporting goods;

tobacco products;

software;

compact disks and DVD's;

explosives;

novelty items (such as gift wrap and ribbon);

books and magazines;

school products and office supplies;

business cards;

shipping documentation and packaging;

notebook covers;

book covers;

book marks;

event and transportation tickets;

gambling and gaming applications (such as Lottery tickets, game cards, casino chips and items for use at or with casinos, raffle and sweepstakes);

home furnishing (such as towels, linens, and furniture);

flooring and wallcoverings;

jewelry & watches;

handbags;

art, collectibles and memorabilia;

toys;

displays (such as point of purchase and merchandising displays);

product marking and labeling (such as labels, hangtags, tags, threads, tear strips, over-wraps, securing a tamperproof image applied to a branded product or document for authentication or enhancement, as camouflage, and as asset tracking).

Suitable materials for the embodiments described above include a wide range of polymers. Acrylics, acrylated polyesters, acrylated urethanes, polypropylenes, urethanes, and polyesters have suitable optical and mechanical properties for both the microlenses and the microstructured icon elements. Suitable materials for the optional substrate film include most of the commercially available polymer films, including acrylic, cellophane, Saran, nylon, polycarbonate, polyester, polypropylene, polyethylene, and polyvinyl. Microstructured icon fill materials can include any of the materials listed above as suitable for making microstructured icon elements, as well as solvent based inks and other commonly available pigment or dye vehicles. Dyes or pigments incorporated into these materials should be compatible with the chemical makeup of the vehicle. Pigments must have a particle size that is substantially smaller than the smallest dimensions of any component of an icon element. Optional sealing layer materials can include any of the materials listed above as suitable for making microstructured icon elements, plus many different commercially available paints, inks, overcoats, varnishes, laquers, and clear coats used in the printing and paper and film converting industries. There is no preferred combination of materials—the choice of materials depends on the details of the material geometry, on the optical properties of the system, and on the optical effect that is desired.

Although exemplary embodiments have been shown and described, it will be clear to those of ordinary skill in the art that a number of changes, modifications, or alterations to the invention as described can be made. All such changes, modifications, and alterations should therefore be seen as within the scope of the disclosure.

The invention claimed is:

1. A method of producing a synthetic magnification micro-optic system, comprising:

(a) providing an array of image icons with a substantially regular array spacing between a substantial number of image icons within at least a portion of the image icon array;

(b) providing an array of image icon focusing elements; and (c) disposing the array of image icon focusing elements a substantially uniform distance from the array of image icons such that the image icon focusing elements form at least one synthetically magnified image of at least a portion of the image icons, wherein at least a portion of the image icons are arranged in relation to at least a portion of the focusing elements in a manner such that the at least one synthetically magnified image appears to lie above a given plane, wherein the system has a thickness of less than 50 microns, or image icon focusing elements having an effective base diameter of less than 50 microns, or both.

2. The method of claim 1, wherein the focusing elements are selected from the group of refractive, diffractive, reflective, hybrid refractive/diffractive and hybrid refractive/reflective focusing elements, and non-refractive focusing elements.

3. The method of claim 1, wherein the array of focusing elements includes polygonal base multi-zonal focusing elements.

4. The method of claim 1, wherein the array of focusing elements is arranged in a pattern, the array of focusing elements having at least two lines the pattern can be reflected around, rotated around, or both, without changing the geometry of the pattern.

5. The method of claim 1, wherein the focusing elements provide an enlarged field of view over the width of an associated image icon so that the peripheral edges of the associated image icon do not drop out of view.

6. The method of claim 1, wherein the image icons are formed from patterns of colorless, colored, tinted, or dyed material.

7. The method of claim 1, wherein the array of image icons includes image icons formed as shaped posts on a surface of a substrate, spaces between the shaped posts optionally filled with a material having a different refractive index than the substrate, which material is selected from the group of pigmented resins, inks, dyes, metals, and magnetic materials.

8. The method of claim 1, wherein the image icons are either positive or negative icons in relation to a background on which they appear.

9. The method of claim 1, wherein the image icons are either positive or negative icons in relation to their background and include image icons that are transparent, translucent, pigmented, fluorescent, phosphorescent, metallized, substantially retroreflective, or display optically variable color.

10. The method of claim 1, wherein the image icons are either positive or negative icons in relation to their background and have a background that is transparent, translucent, pigmented, fluorescent, phosphorescent, metallized, substantially retroreflective, or displays optically variable color.

11. The method of claim 1, wherein the image icons are either positive or negative icons in relation to their background and include image icons formed from printing, microstructures, or evaporated metals.

12. The method of claim 1, wherein the image icons are either positive or negative icons in relation to their background and include image icons formed in a photographic emulsion.

13. The method of claim 1, wherein the image icons are either positive or negative icons in relation to their background and include image icons formed using one or more materials selected from the group of optionally fluorescent pigments and dyes, metal or metallized materials, metal particles, magnetic particles, nuclear magnetic resonance signature materials, lasing particles, organic LED materials, optically variable materials, evaporated metals, thin film interference materials, liquid crystal polymers, optical upconversion materials, optical downconversion materials, dichroic materials, optically active materials, optically polarizing materials, and combinations thereof.

14. The method of claim 1, wherein the system is protected by a sealing or obscuring layer, the sealing or obscuring layer being applied to the side of the array of image icons opposite the array of focusing elements, the sealing or obscuring layer having at least a portion that is transparent, translucent, tinted, pigmented, opaque, metallic, magnetic, or optically variable.

15. The method of claim 14, wherein the sealing or obscuring layer includes optical effects.

16. The method of claim 1, which further comprises placing a tamper indicating layer over the array of focusing elements.

17. The method of claim 1, wherein upon illumination of the system the at least one synthetically magnified image appears to have a shadow.

18. The method of claim 1, wherein the at least one synthetically magnified image further appears to transform from one or more of a form, shape, size or color to another of a form, shape, size or color.

19. The method of claim 1, wherein the at least one synthetically magnified image further appears to be three dimensional.

20. The method of claim 1, wherein the at least one synthetically magnified image appears to have one or more additional effects selected from the group of appearing to lie on a spatial plane deeper than the system, appearing to lie on a spatial plane above the system, appearing to move between a spatial plane deeper than the system and a spatial plane above the system upon rotation of the system about an axis that intersects the plane of the system, appearing to move in a direction substantially parallel to an axis of tilt of the system upon tilting the system about an axis substantially parallel to the plane of the system, appearing to transform from one or more of a form, shape, size or color to another of a form, shape, size or color, and appearing to be three dimensional.

21. The method of claim 20, wherein the two or more effects may or may not have the same color or graphical elements.

22. The method of claim 20, wherein the two or more effects appear on different image planes.

23. The method of claim 22, wherein the different image planes are further different in at least one of form, color, movement direction of the effect, or magnification.

24. The method of claim 1, wherein the at least one synthetically magnified image further appears to have at least one of a plurality of patterns, colors or shapes.

25. The method of claim 1, wherein the system further includes a plurality of image icon arrays spaced a plurality of distances from the array of focusing elements, wherein the array of focusing elements includes focusing elements having a plurality of focal lengths corresponding to the various spaced distances of the image icon arrays.

26. The method of claim 1, wherein the array of focusing elements includes aspheric focusing elements, and wherein the array of image icons includes image icons formed as recesses on or in a surface of a substrate, the recesses optionally filled with a material having a different refractive index than the substrate, which material is selected from the group of pigmented resins, inks, dyes, metals, and magnetic materials.

27. The method of claim 1, wherein the array of focusing elements includes focusing elements having an F number selected to reduce vertical binocular disparity.

28. The method of claim 27, wherein the F number is less than 1.

29. The method of claim 1, wherein the array of focusing elements includes focusing elements having a base diameter of 35 microns and a focal length of 30 microns.

30. The method of claim 1, which further comprises placing a surface layer on the array of focusing elements that must be removed for the at least one synthetically magnified image to be viewed.

31. The method of claim 1, which further comprises positioning one or more optical spacers between the array of image icons and the array of focusing elements.

32. The method of claim 31, wherein the one or more optical spacers are formed using one or more essentially colorless polymers.

33. The method of claim 32, wherein the one or more essentially colorless polymers is selected from the group of acrylics, cellophane, polymers made from vinylidene chloride, nylon, polycarbonate, polyester, polypropylene, polyethylene, polyethylene terephthalate, and polyvinyl.

34. The method of claim 1, wherein the array of image icons includes image icons formed as recesses on or in a surface of a substrate, the recesses optionally filled with a material providing a contrast with the substrate.

35. The method of claim 34, wherein the icon recesses have a recess depth ranging from about 0.5 microns to about 8 microns.

36. The method of claim 1, wherein the system comprising the array of image icons and the array of focusing elements has a thickness of less than 50 microns.

37. The method of claim 1, wherein the array of focusing elements includes non-cylindrical focusing elements.

38. The method of claim 1, wherein the array of focusing elements includes aspheric focusing elements.

39. The method of claim 1, wherein the array of focusing elements includes focusing elements having base geometries selected from the group of circular base, substantially circular base, hexagonal base, substantially hexagonal base, square base, substantially square base, triangular base, and substantially triangular base.

40. The method of claim 1, wherein the array of focusing elements includes focusing elements having an F number of less than or equal to 4.

41. The method of claim 37, wherein the array of focusing elements includes focusing elements having an F number of less than or equal to 4.

42. The method of claim 1, wherein the array of focusing elements includes focusing elements having an effective base diameter ranging from about 10 to about 30 microns.

43. The method of claim 1, wherein the array of focusing elements includes focusing elements having an effective base diameter of less than 30 microns.

44. The method of claim 1, wherein the arrays are formed into a system having a total thickness of less than about 45 microns.

45. The method of claim 1, wherein the arrays are formed into a system, which has a total thickness ranging from about 10 to about 40 microns.

46. The method of claim 1, wherein the array of focusing elements includes focusing elements having a focal length of less than about 40 microns.

47. The method of claim 1, wherein the array of focusing elements includes focusing elements having a focal length ranging from about 10 to less than about 30 microns.

48. The method of claim 1, wherein the at least one synthetically magnified image morphs into at least one other synthetically magnified image as the system is rotated or viewed from different viewpoints.

49. The method of claim 1, wherein the array of image icons includes image icons formed from a printing method selected from the group of ink jet, laserjet, letterpress, flexo, gravure, intaglio, and dye sublimation printing methods.

50. The method of claim 1, wherein the array of image icons includes image icons formed as recesses on or in a surface of a substrate, the recesses optionally filled with a material having a different refractive index than the substrate, which material is selected from the group of pigmented resins, inks, dyes, metals, and magnetic materials.

51. The method of claim 1, wherein the method further comprises providing a plurality of arrays of image icons at different depths within the system, the focusing elements having differing focal lengths for focusing at the different depths of the plurality of arrays of image icons.

52. The method of claim 37, wherein a reflective layer is positioned adjacent to a surface of the array of image icons opposite the array of focusing elements.

53. The method of claim 52, wherein the reflective layer is metalized.

54. The method of claim 1, which further comprises placing a tamper indicating material over the array of focusing elements.

55. The method of claim 1, wherein the method further comprises placing a second array of focusing elements to a side of the array of image icons opposite the array of focusing elements.

56. The method of claim 55, which further comprises placing a second array of image icons in between the two arrays of focusing elements.

57. The method of claim 1, which further comprises providing interstitial spaces between the focusing elements, the interstitial spaces optionally being filled.

58. The method of claim 1, wherein the synthetic magnification micro-optic system forms a second synthetically magnified image exhibiting a different optical effect than the at least one synthetically magnified image.

59. The method of claim 58, wherein the optical effect of the second synthetically magnified image is different in one or more of form, color, direction of movement or magnification.

60. The method of claim 1, wherein the array of focusing elements includes focusing elements having an effective base diameter ranging from about 15 microns to about 35 microns and a focal length ranging from about 10 microns to less than about 30 microns.

61. The method of claim 29, wherein the array of focusing elements includes focusing elements having an effective base diameter ranging from about 15 microns to about 35 microns and a focal length ranging from about 10 microns to less than about 30 microns.

62. A method of producing a synthetic magnification micro-optic system, comprising:
   (a) providing an array of image icons, wherein at least a portion of the array of image icons is arranged in a pattern, the array having at least one axis the pattern can be reflected around, rotated around, or both, without changing the geometry of the pattern;
   (b) providing an array of image icon focusing elements, wherein at least a portion of the array of image icon focusing elements is arranged in a pattern, the array having at least one axis the pattern can be reflected around, rotated around, or both, without changing the geometry of the pattern; and
   (c) disposing the array of image icon focusing elements a substantially uniform distance from the array of image icons such that the focusing elements form at least one synthetically magnified image of at least a portion of the image icons, the at least one synthetically magnified image appearing to lie above a given plane, wherein the synthetic magnification micro-optic system is used on or at least partially within paper or polymer currency.

63. The method of claim 1, wherein the array of focusing elements of the synthetic magnification micro-optic system includes focusing elements having an effective base diameter of less than 50 microns.

64. The method of claim 1, wherein the array of focusing elements of the synthetic magnification micro-optic system is spaced less than 50 microns from the array of image icons.

65. A method of producing a synthetic magnification micro-optic system, comprising:
   (a) providing an array of image icons with a substantially regular array spacing between a substantial number of image icons within the image icon array;
   (b) providing an array of image icon focusing elements; and
   (c) disposing the array of image icon focusing elements a substantially uniform distance from the array of image icons such that the image icon focusing elements form at least one synthetically magnified image of at least a portion of the image icons,
   wherein at least a portion of the image icons are arranged in relation to at least a portion of the focusing elements in a manner such that the at least one synthetically magnified image appears to lie above a given plane,
   wherein the system has a thickness of less than 50 microns, or image icon focusing elements having an effective base diameter of less than 50 microns, or both.

66. A method of producing a synthetic magnification micro-optic system, comprising:
   (a) providing an array of image icons with a substantially regular array spacing between a substantial number of image icons within at least a portion of the image icon array, the array spacing measured on, or in the direction of, a chosen axis of the image icon array;
   (b) providing an array of image icon focusing elements with an array spacing between focusing elements within at least a portion of the focusing element array, the array spacing measured on, or in the direction of, an axis of the focusing element array that corresponds to the chosen axis of the image icon array; and
   (c) disposing the array of image icon focusing elements a substantially uniform distance from the array of image icons such that the image icon focusing elements form at least one synthetically magnified image of at least a portion of the image icons,
   wherein the ratio of (i) the array spacing between image icons within at least a portion of the array of image icons to (ii) the array spacing between focusing elements within at least a portion of the array of image icon focusing elements, is greater than 1, the at least one synthetically magnified image appearing to lie above a given plane,
   wherein the synthetic magnification micro-optic system is used on or at least partially within paper or polymer currency.

* * * * *